(12) United States Patent
Eid et al.

(10) Patent No.: US 12,227,412 B2
(45) Date of Patent: Feb. 18, 2025

(54) POROUS ONE-DIMENSIONAL POLYMERIC GRAPHITIC CARBON NITRIDE-BASED NANOSYSTEMS FOR CATALYTIC CONVERSION OF CARBON MONOXIDE AND CARBON DIOXIDE UNDER AMBIENT CONDITIONS

(71) Applicant: QATAR UNIVERSITY, Doha (QA)

(72) Inventors: Kamel Abdelmoniem Mohamed Eid, Sharkia (EG); Aboubakr Moustafa Abdullah, Giza (EG)

(73) Assignee: Qatar University, Doha (QA)

( * ) Notice: Subject to any disclaimer, the term of this patent is extended or adjusted under 35 U.S.C. 154(b) by 1144 days.

(21) Appl. No.: 17/075,582

(22) Filed: Oct. 20, 2020

(65) Prior Publication Data

US 2021/0047183 A1  Feb. 18, 2021

Related U.S. Application Data

(62) Division of application No. 16/846,020, filed on Apr. 10, 2020, now Pat. No. 11,299,395.

(Continued)

(51) Int. Cl.
*C01B 21/06* (2006.01)
*B01D 53/04* (2006.01)
*B01J 27/24* (2006.01)

(52) U.S. Cl.
CPC .......... *C01B 21/0605* (2013.01); *B01D 53/04* (2013.01); *B01J 27/24* (2013.01);
(Continued)

(58) Field of Classification Search
None
See application file for complete search history.

(56) References Cited

U.S. PATENT DOCUMENTS

| 10,170,770 B2 | 1/2019 | Kurungot et al. |
| 2007/0149392 A1* | 6/2007 | Ku .................... B01J 23/83 |
| | | 423/220 |
| 2018/0148565 A1 | 5/2018 | Asif et al. |

FOREIGN PATENT DOCUMENTS

| CN | 101116817 A | 2/2008 |
| CN | 106861737 A | 6/2017 |

(Continued)

OTHER PUBLICATIONS

Wang et al.; Catalysis Communications; 74, 2016.*

(Continued)

*Primary Examiner* — Guinever S Gregorio
(74) *Attorney, Agent, or Firm* — Squire Patton Boggs (US) LLP

(57) ABSTRACT

In some aspects and embodiments, the present application provides a wide range of porous 1-D polymeric graphitic carbon-nitride materials that are atomically doped with binary metals in different morphologies. In some embodiments, the graphitic carbon-nitride materials can be prepared with high mass production from inexpensive and natural abundant precursors. In some embodiments, the materials were used successfully for the oxidation of CO to $CO_2$ under ambient reaction temperature in addition to the reduction of $CO_2$ into hydrocarbons. In some embodiments, the materials can be used for practical and large-scale gas conversion for household or industrial applications.

5 Claims, 39 Drawing Sheets

Related U.S. Application Data

(60) Provisional application No. 62/960,946, filed on Jan. 14, 2020.

(52) U.S. Cl.
CPC .... B01D 2257/504 (2013.01); C01P 2002/01 (2013.01); C01P 2002/10 (2013.01); C01P 2002/52 (2013.01); C01P 2002/85 (2013.01); C01P 2004/03 (2013.01); C01P 2004/04 (2013.01); C01P 2004/16 (2013.01); C01P 2006/12 (2013.01); C01P 2006/16 (2013.01)

(56) References Cited

FOREIGN PATENT DOCUMENTS

| CN | 108686690 A | 10/2018 |
|---|---|---|
| CN | 108823596 A | 11/2018 |
| CN | 111715262 A | 9/2020 |

OTHER PUBLICATIONS

Eid et al.; Precise fabrication of porous one-dimensional gC3N4 nanotubes doped with Pd and Cu atoms for efficient CO oxidation and CO2 reduction; Inorganic Chemistry Communications 107; 2019.*

Chakrabarty et al., "Electron doped $C_2N$ monolayer as efficient noble metal-free catalysts for CO oxidation", Applied Surface Science, 2017, vol. 418, pp. 92-98.

Eid et al., "Data on catalytic CO oxidation and $CO_2$ reduction durability on $gC_3N_4$ nanotubes Co-doped atomically with Pd and Cu", Data in Brief; Sep. 10, 2019, vol. 26; 104495; https://doi.org/10.1016/j.inoche.2019;107460.

Eid et al., "Precise fabrication of porous one-dimensional $gC_3N_4$ nanotubes doped with Pd and Cu atoms for efficient CO oxidation and $CO_2$ reduction", Inorganic Chemistry Communications, 2019, vol. 107, 107460.

Eid et al., "Rational Synthesis of One-dimensional Carbon Nitride-based Nanofibers Atomically Doped with Au/Pd for Efficient Carbon Monoxide Oxidation", Langmuir, 2019, vol. 35, pp. 3421-3431. DOI: 10.1021/acs.langmuir.8b03588.

Eid et al., "Unraveling template-free fabrication of carbon nitride nanorods codoped with Pt and Pd for efficient electrochemical and photoelectrochemical carbon monoxide oxidation at room temperature", Nanoscate, 2019, vol. 11, pp. 1755-11764.

Eid et al., "Rational synthesis of one-dimensional carbon nitride-based nanofibers atomically doped with Au/Pd for efficient carbon monoxide oxidation", International Journal of Hydrogen Energy, 2019, vol. 44, pp. 17943-17953.

Eid et al., "Versatile synthesis of Pd and Cu Co-doped Porous carbon nitride Nanowires for catalytic CO oxidation recation", Catalyst; Sep. 22, 2018, vol. 8(411).

Jiang, et al., "Bimetallic Ag—Cu supported on graphitic carbon nitride nanotubes for improved visible-light photocatalytic hydrogen production", ACS Appl. Material Interfaces 2018; vol. 10, pp. 9468-9477.

Li et al., "Potential of transition metal atoms embedded in buckled monolayer $g-C_3N_4$ as single-atom catalysts", Phys. Chem. Chem. Phys., Oct. 2017, DOI: 10.1039/C7CP05195F.

Nematollahi et al., "A comparative DFT study on CO oxidation reaction over Si-doped $BC_2N$ nanosheet and nanotube", Applied Surface Science, 2018, vol. 439, pp. 934-945.

Nematollahi et al., "The role of healed N-vacancy defective $BC_2N$ sheet and nanotube by NO molecule in oxidation of NO and CO gas molecules", Surface Science, 2018, vol. 672: pp. 39-46.

Shi et al., "Novel CuCo2O4/graphitic carbon nitride nanohybrids: Highly effective catalysts for reducing CO generation and fire hazards of thermoplastic polyurethane nanocomposites", Journal of Hazardous Materials, 2015, vol. 293, pp. 87-96.

Singh et al., "Gold Nanoparticles Supported on Carbon Nitride: Influence of Surface Hydroxyls on Low Temperature Carbon Monoxide Oxidation", ACS Catalysis, 2012, vol. 2(6), pp. 1138-1146. dx.doi.org/10.1021/cs3001094.

Wang et al., "Cobalt Oxide Decorated Flower-Like $g-C_3N_4$ Hybrid Nanomaterials for Carbon Monoxide Oxidation", Surface Review and Letters, 2017, vol. 24, No. 5, 1750058; DOI: 10.1142/S0218625X17500585, 8 pages.

Wang et al., "Confined Catalysis in the $g-C_3N_4$/Pt(111) Interface: Feasible Molecule Intercalation, Tunable Molecule-Metal Interaction, and Enhanced Reaction Activity of CO Oxidation", ACS Appl. Mater. & Interfaces, 2017, vol. 9, pp. 33267-33273.

Wang et al., "Recent advances of Graphitic Carbon Nitride-Based Structures and Applications in Catalyst, Sensing, Imaging, and LED's", Nano-Micro Lett. 2017, vol. 9(47); https://doi.org/10.1007/s40820-017-0148-2.

Wu et al., "Adsorption of $H_2O$, $H_2$, $O_2$, CO, NO, and $CO_2$ on graphene/$g-C_3N_4$ nanocomposite investigated by density functional theory", Applied Surface Science, 2018, vol. 430, pp. 125-136.

Yang et al., "A heterostructured $TiO_2$—$C_3N_4$ support for gold catalysts: a superior preferential oxidation of CO in the presence of H2 under visible light irradiation and without visible light irradiation", Catal. Sci. Technol., 2016, vol. 6, pp. 829-839.

Yang et al., "Effect of mesoporous g-C3 N4 substrate on catalytic oxidation of CO over $CO_3O_4$", Applied Surface Science, 2017, vol. 401, pp. 333-340.

Yang et al., "Effect of the structure of CN/Silica composite support on the catalytic performances of $CO_3O_4$ for CO oxidation", Microporous and Mesoporous Materials, 2018, vol. 255, pp. 36-43.

Zhu et al., "Oxygen activation sites in gold and iron catalysts supported on carbon nitride and activated carbon", Journal of Catalysis, 2010, vol. 274, pp. 207-214.

* cited by examiner

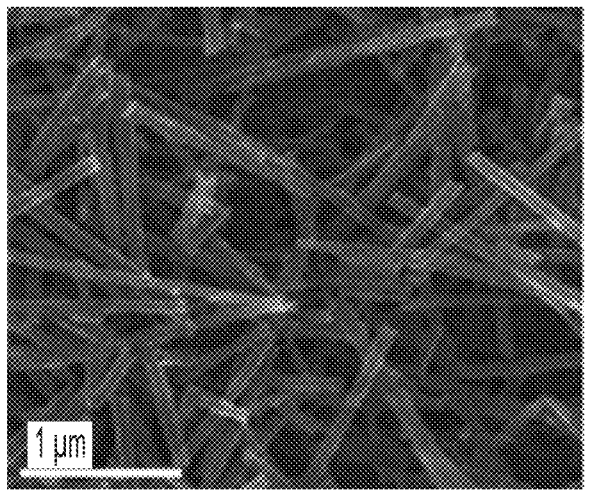
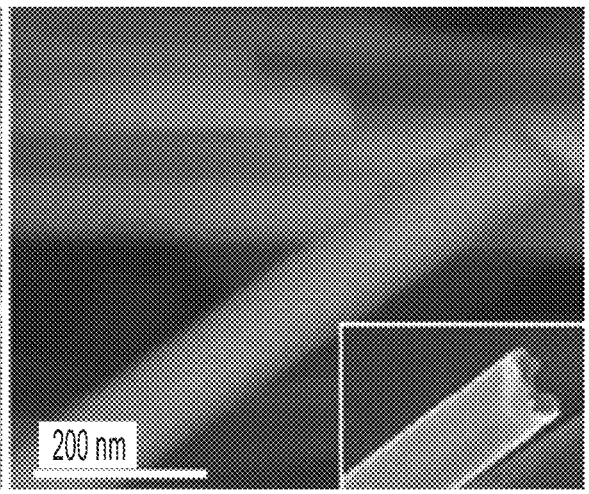
FIG. 3A  FIG. 3B
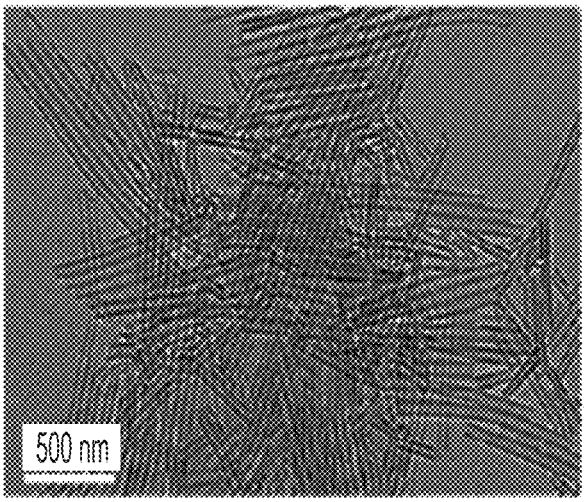
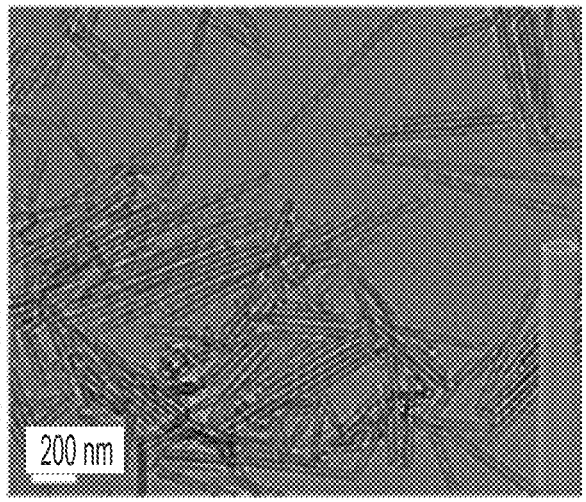
FIG. 3C  FIG. 3D

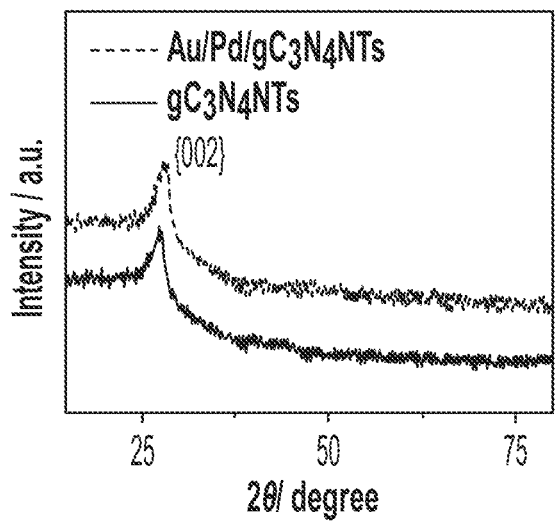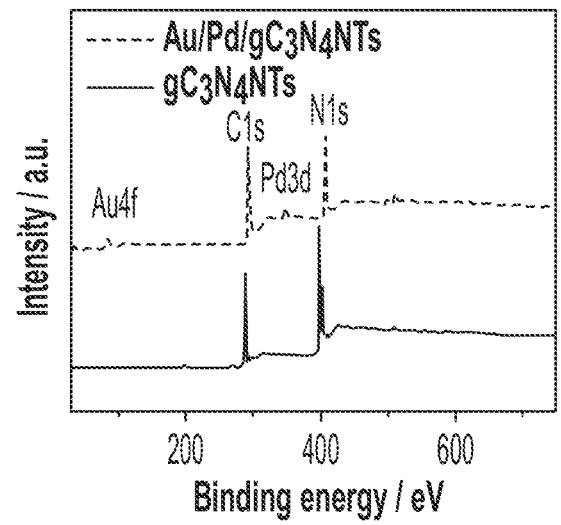
FIG. 6A  FIG. 6B
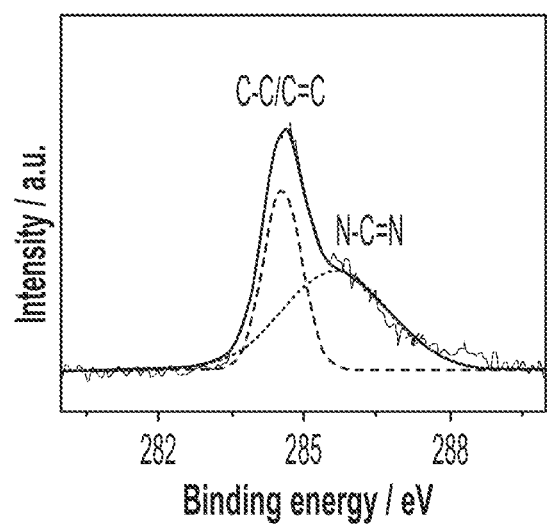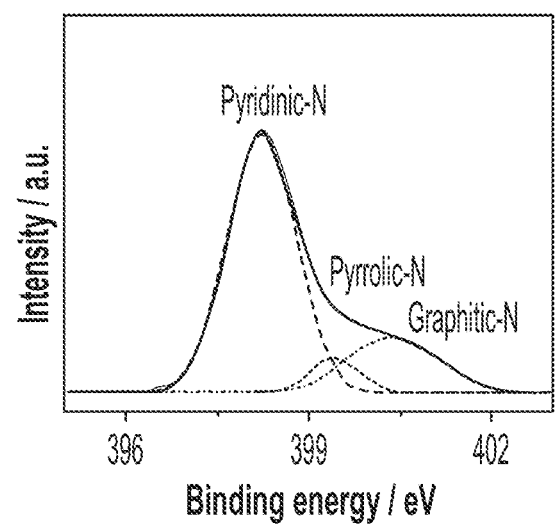
FIG. 6C  FIG. 6D

Scheme 2 — The preparation process of Au/Pd/gC3N4NFs

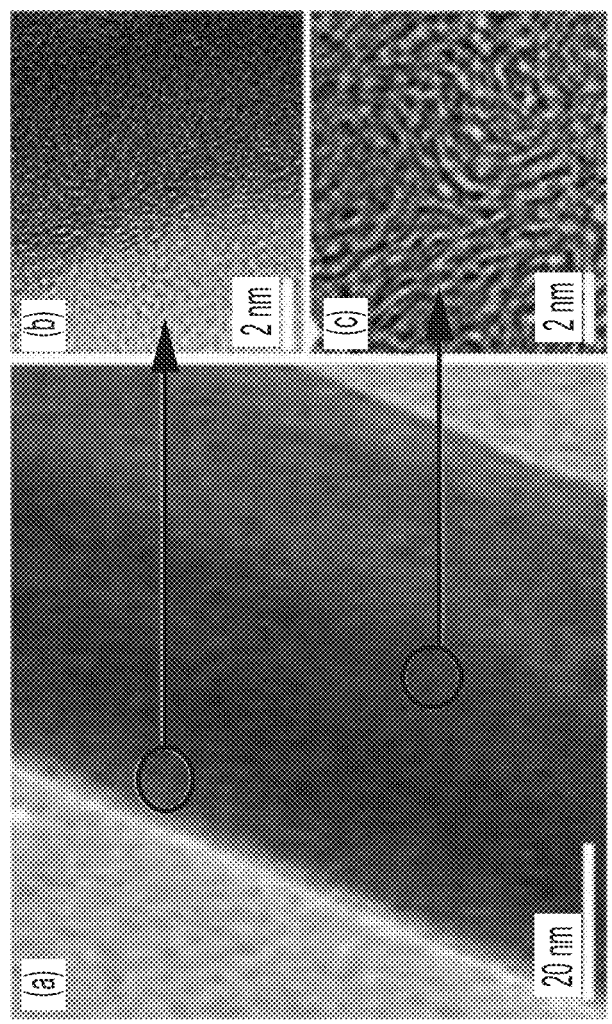

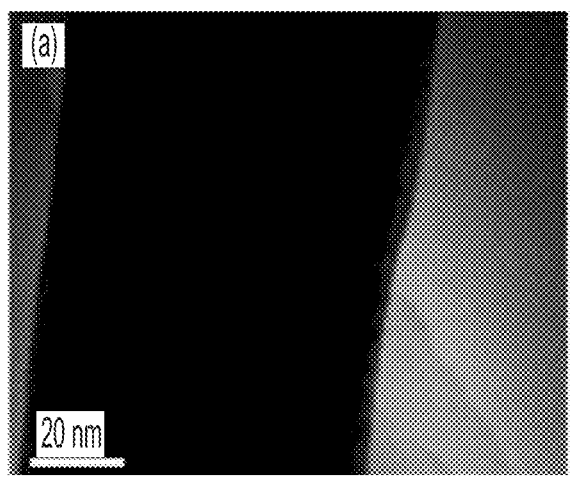
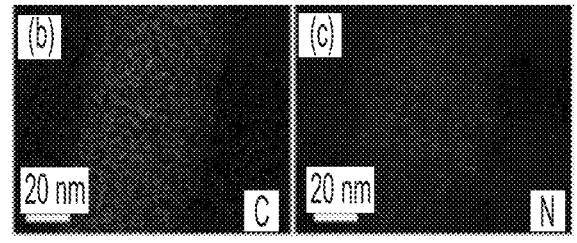
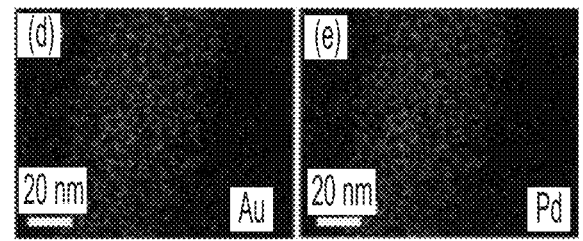
FIG. 14A
FIG. 14B  FIG. 14C
FIG. 14D  FIG. 14E
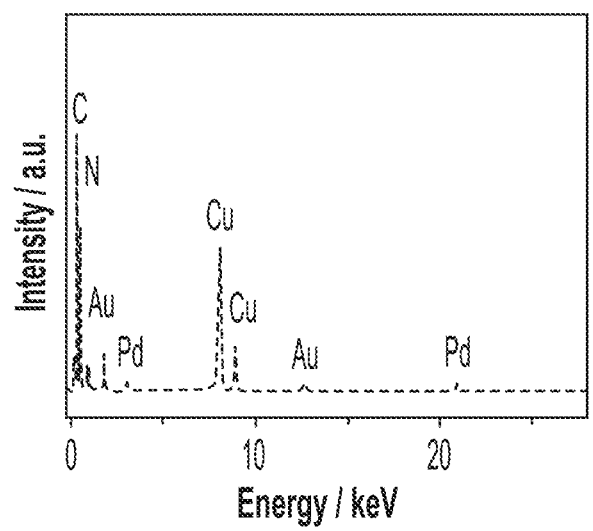
FIG. 14F Scheme 3 The formation process of PtPd/CNs nanorods

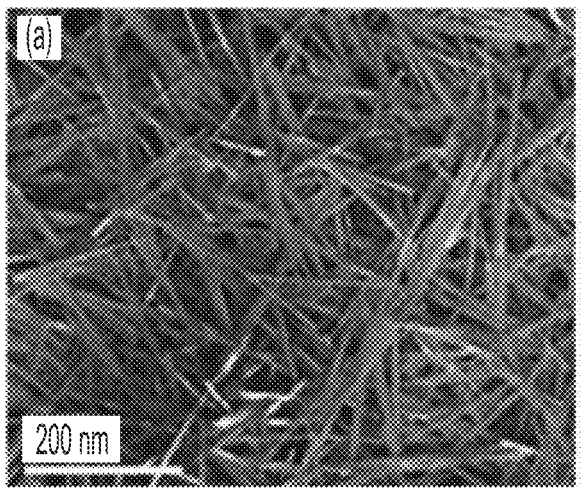
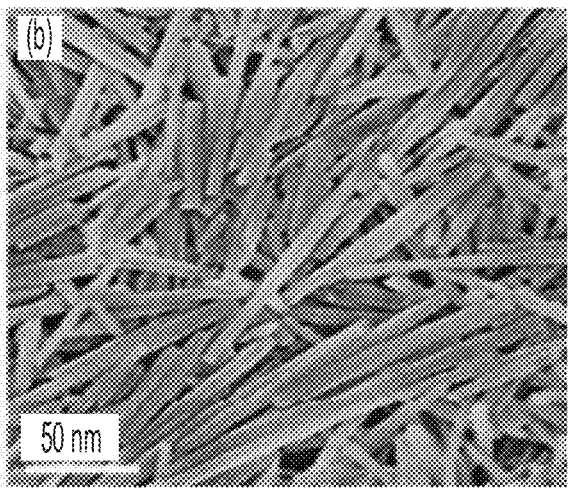
FIG. 21A    FIG. 21B
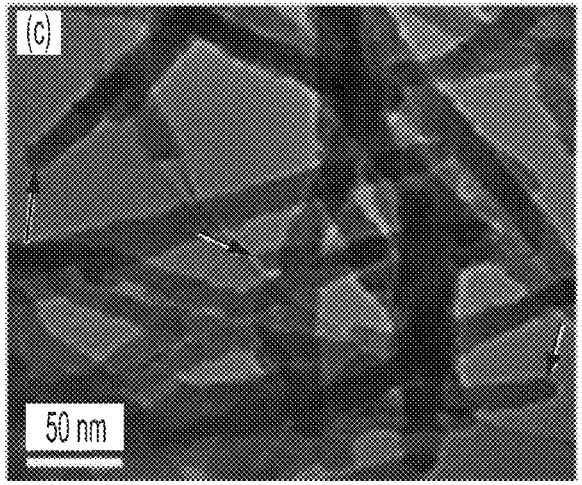
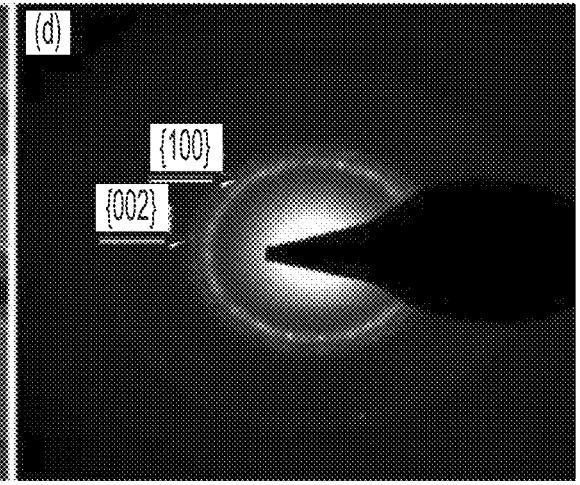
FIG. 21C    FIG. 21D

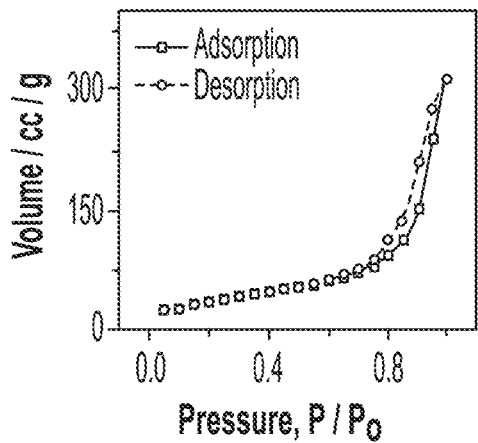 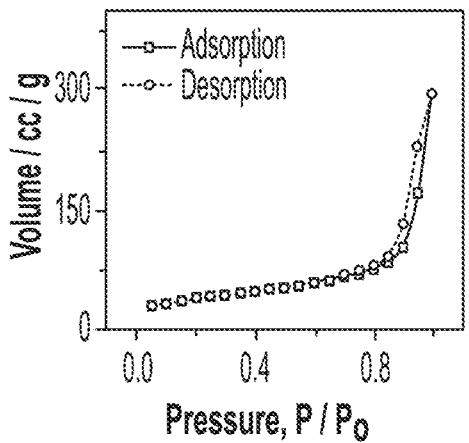
FIG. 25A        FIG. 25B
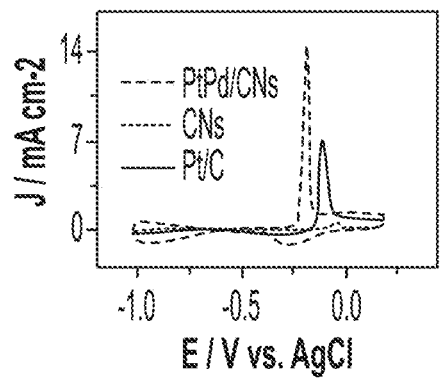 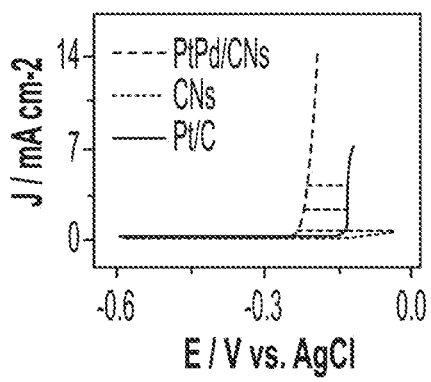
FIG. 26A        FIG. 26B
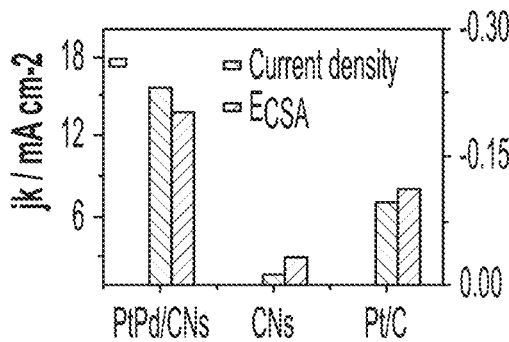 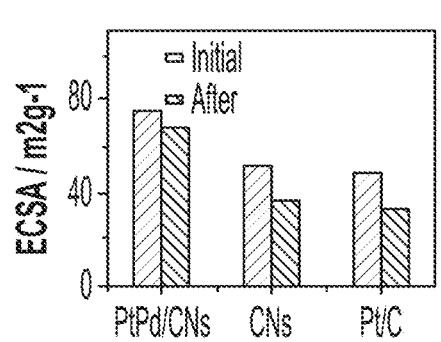
FIG. 26C        FIG. 26D

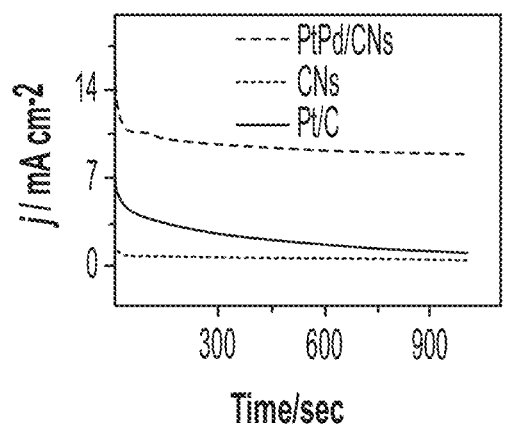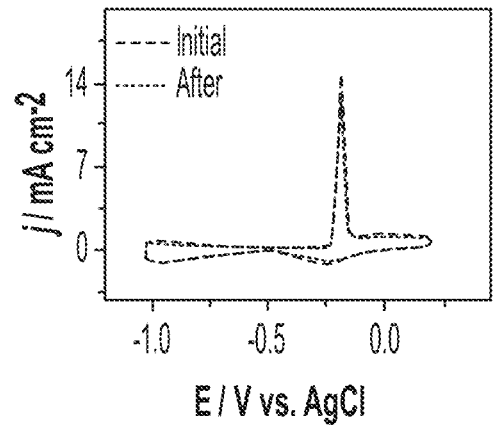
FIG. 28A    FIG. 28B
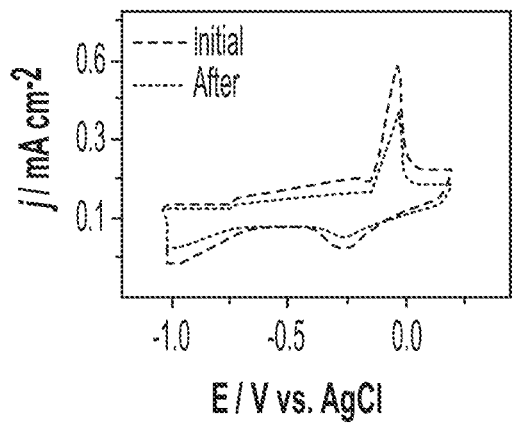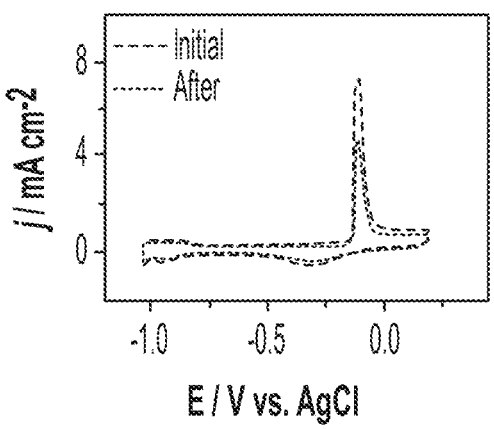
FIG. 28C    FIG. 28D

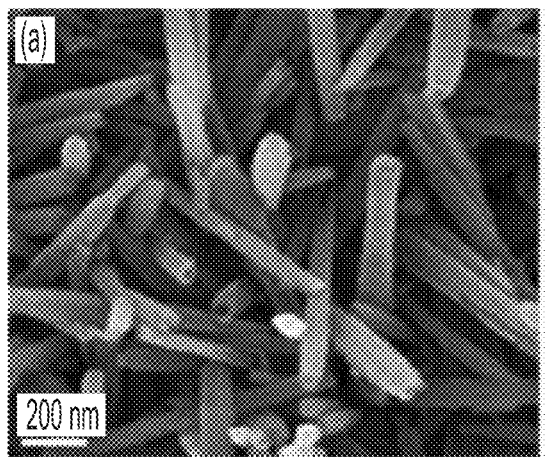
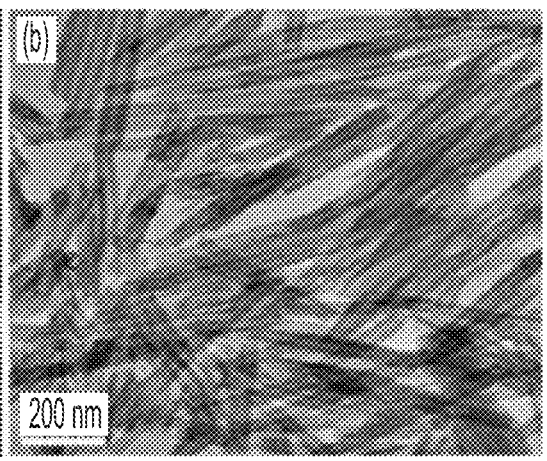
FIG. 31A  FIG. 31B
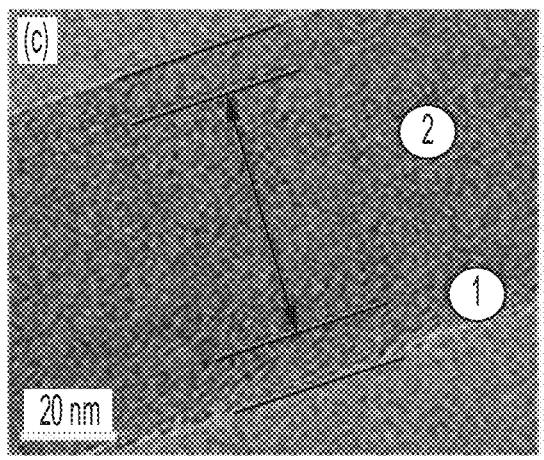
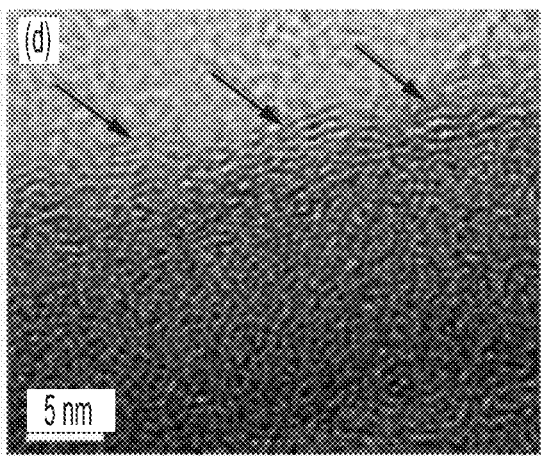
FIG. 31C  FIG. 31D
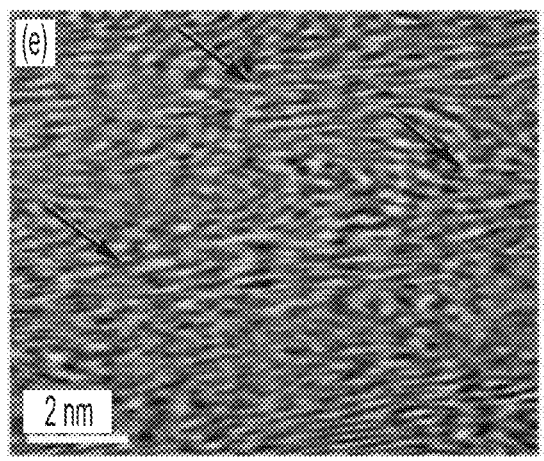
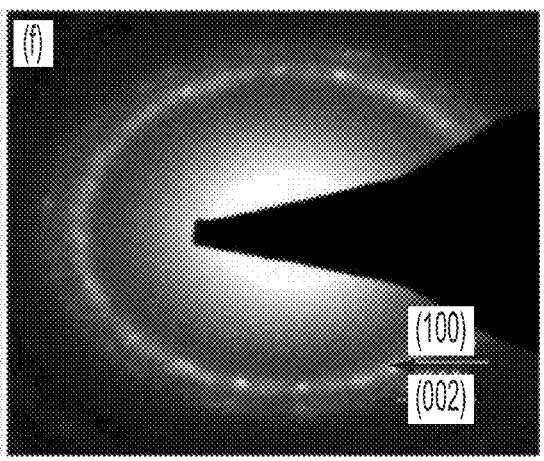
FIG. 31E  FIG. 31F

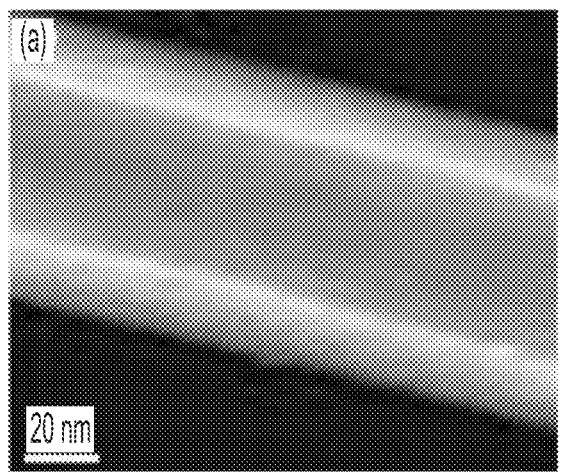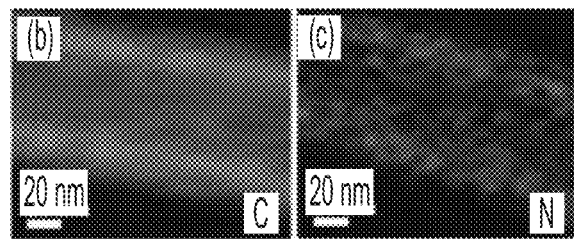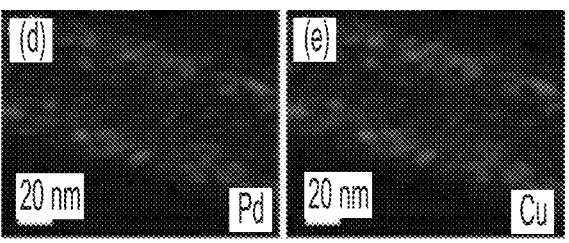
FIG. 32A
FIG. 32B    FIG. 32C
FIG. 32D    FIG. 32E
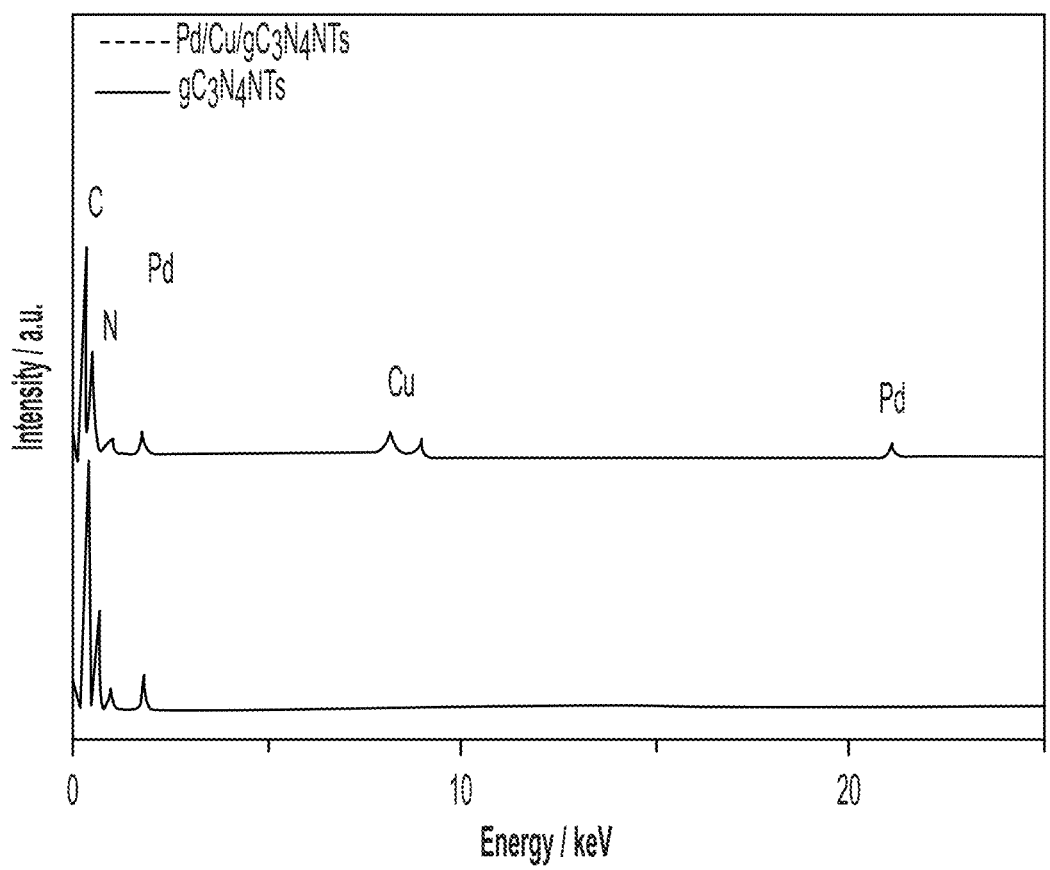
FIG. 32F

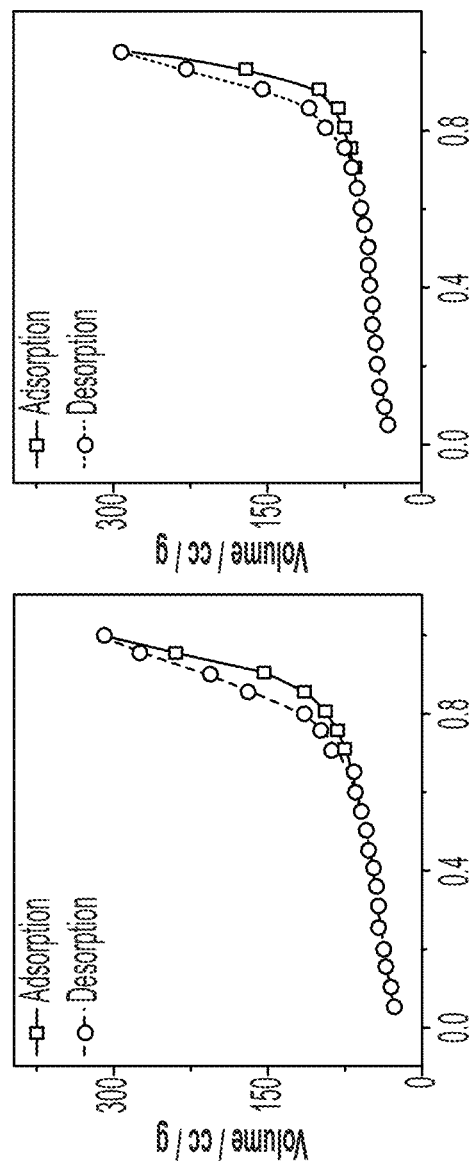
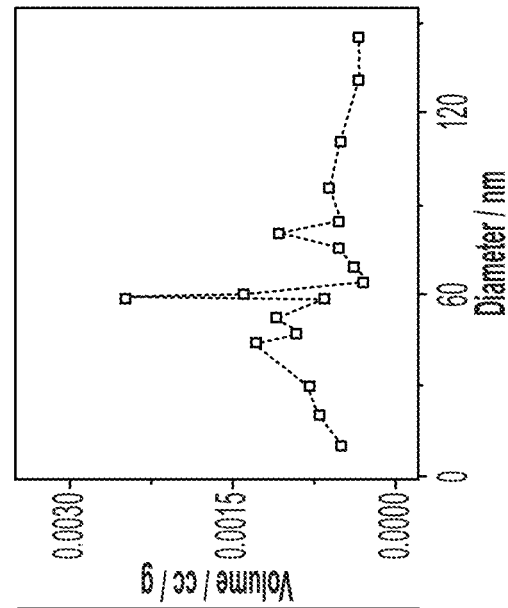
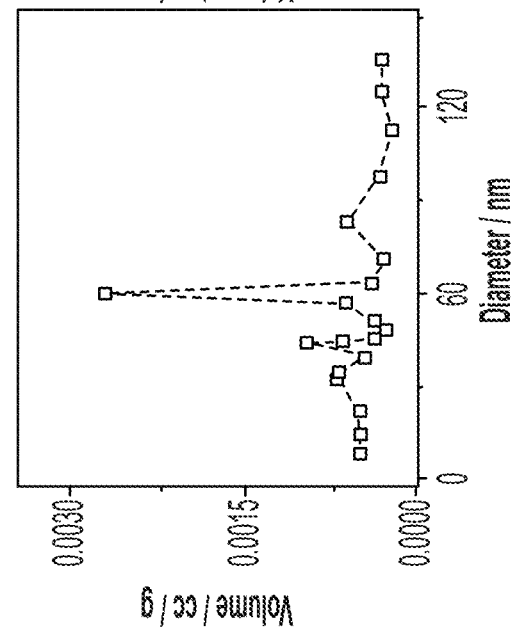
FIG. 34A  FIG. 34B  FIG. 34C  FIG. 34D

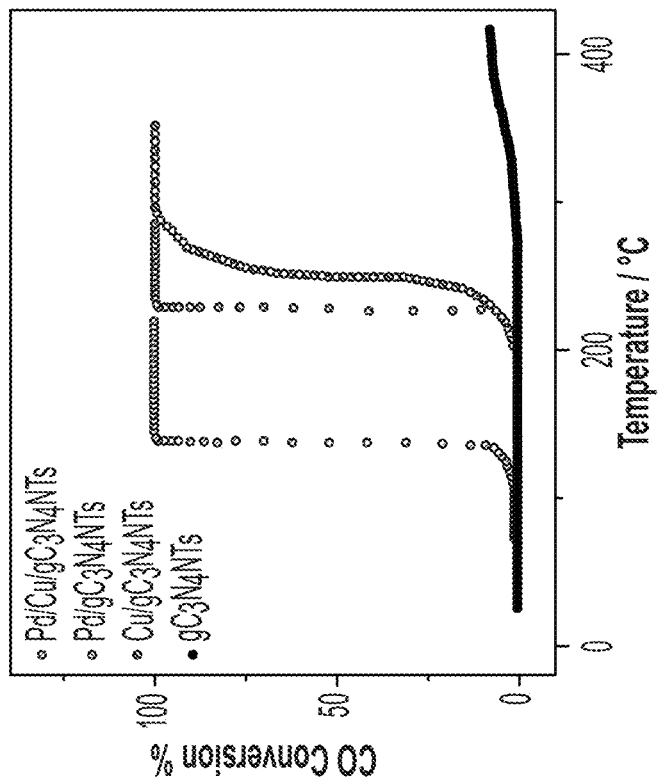
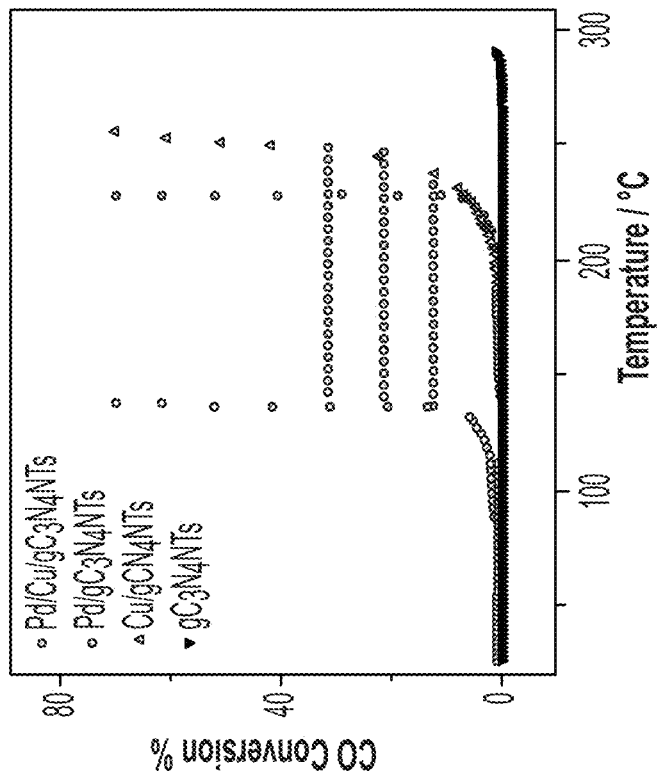
FIG. 35A
FIG. 35B

POROUS ONE-DIMENSIONAL POLYMERIC GRAPHITIC CARBON NITRIDE-BASED NANOSYSTEMS FOR CATALYTIC CONVERSION OF CARBON MONOXIDE AND CARBON DIOXIDE UNDER AMBIENT CONDITIONS

CROSS-REFERENCE TO RELATED APPLICATIONS

This application is a divisional of U.S. patent application Ser. No. 16/846,020 (filed Apr. 10, 2020), which claims the benefit of U.S. Provisional Application No. 62/960,946 (filed Jan. 14, 2020), both of which are incorporated by reference in their entirety for all purposes.

TECHNICAL FIELD

The present application sets forth porous one-dimensional polymeric graphitic carbon nitride-based nanosystems and their applications in catalytic conversion of carbon monoxide and carbon dioxide.

BACKGROUND

Global energy consumption has substantially increased in the last decades, and it is expected to rise by more than 40% in the coming 20 years, owing to continued economic and population growth (FIG. 1A). This has led to massive emissions of CO and $CO_2$ gases, which will rise around 15% in the coming 10 years (FIG. 1B). Over 35 billion metric tons of CO and $CO_2$ gasses are emitted annually worldwide from human sources. For example, Qatar Aluminium company in Qatar produces around 4,987,233 mt of $CO_{2eq}$ (nearly 7.63 tons of $CO_{2eq}$ per ton of aluminum) and is expected to increase by around 20% in the coming 10 years. Meanwhile, around 1,319,563 cars in Qatar emit nearly 98,967.225 tons of CO annually.

Given the increased use of energy and the generation of CO and $CO_2$ gasses, the successful conversion of CO and $CO_2$ into useful hydrocarbon fuels could be a sustainable energy source worth billions of dollars. The design and fabrication of efficient and inexpensive catalysts that are applicable to commercial usage as well as development of a mobile gas conversion system could provide great social and economic benefits.

BRIEF SUMMARY

In some aspects, provided herein is a graphitic-like carbon nitride nanostructure, which is optionally doped atomically with one or more metal elements. In some embodiments, the carbon nitride nanostructure can be nanotube, nanowire, nanorod, or nanofiber. In some embodiments, the carbon nitride nanostructure comprises nanontubes, nanowires, nanorod, or nanofibers.

In some aspects, provided herein is a method of making a metal-doped carbon nitride nanostructure, comprising:
  providing a metal salt solution comprising one or more metal salts and a first solvent;
  adding melamine to the metal salt solution followed by adding an acid solution, optionally while stirring at a first temperature, thereby forming a precipitate;
  washing the precipitate with a second solvent; and
  drying the washed precipitate at a second temperature, thereby obtaining a powder.

In some aspects, provided herein is a carbon nitride nanostructure made by the method of any embodiments provided herein.

In some aspects, provided herein is a catalyst comprising the carbon nitride nanostructure of any embodiments provided herein.

In some aspects, provided herein is a method of oxidizing CO, comprising: providing a CO gas mixture comprising at least 1% CO; providing a catalyst described herein to the CO gas mixture; and performing a CO oxidation reaction.

In some aspects, provided herein is a method of reducing $CO_2$, comprising: providing a $CO_2$ gas mixture containing at least 1% CO; providing a catalyst described herein to the $CO_2$ gas mixture; and performing $CO_2$ reduction reaction.

In some aspects, provided herein is a method of converting CO or $CO_2$ to a hydrocarbon, comprising: providing a CO or $CO_2$ gas mixture containing 1-100% CO or $CO_2$ respectively; providing a catalyst of any of any embodiments provided herein to the gas mixture; and performing conversion reaction.

BRIEF DESCRIPTION OF THE DRAWINGS

FIGS. 2-10B are directed to Example 1 described herein.

FIG. 2 shows a scheme (Scheme 1) displaying an exemplary fabrication process of a metal-doped carbon nitride nanostructure Au/Pd/$gC_3N_4$NTs, the process comprising or consisting of the polymerization of melamine in an ethylene glycol solution in the presence of both Pd and Au precursors with the assistance of nitric acid followed by carbonization.

FIGS. 3A-3D show microscopy of Au/Pd/$gC_3N_4$NTs at different magnification scales, including scanning electron microscopy (SEM) images at 1 mm (FIG. 3A) and 200 nm (FIG. 3B) and transmission electron microscopy (TEM) images at 500 nm (FIG. 3C) and 200 nm (FIG. 3D).

FIGS. 6A-6F show wide-angle XRD patterns (FIG. 6A) and XPS survey (FIG. 6B) of Au/Pd/$gC_3N_4$NTs and $gC_3N_4$ NTs, as well as high-resolution XPS spectra of C is (FIG. 6C), N is (FIG. 6D), Au 4f (FIG. 6E), and Pd 3d (FIG. 6F).

FIG. 8 shows FTIR analysis of Au/Pd/$gC_3N_4$NTs as compared to $gC_3N_4$NTs.

(FIG. 9B), the CO conversion as a function of time (FIG. 9C), and the stability tests of An/Pd/$gC_3N_4$NTs measured for 10 cycles (FIG. 9D).

FIGS. 10A-10B show CO peaks adsorbed on Au/Pd/$gC_3N_4$NTs and $gC_3N_4$NTs benchmarked in a CO-saturated aqueous solution of 0.5 M KaOH at a sweeping rate of 50 mV (FIG. 10A) and CO-oxidation kinetics at a potential ranging between −0.8 and 0.5 V (FIG. 10B).

FIGS. 11-19B are directed to Example 2 described herein.

FIG. 11 shows a scheme (Scheme 2) displaying an exemplary preparation process of Au/Pd/gC$_3$N$_4$NFs.

FIGS. 13A-13C show a high magnification TEM image of Au/Pd/gC$_3$N$_4$NFs (FIG. 13A) and HRTE (FIGS. 13B and 13C).

FIGS. 14A-14F show a HAADF-STEM image of a single Au/Pd/gC$_3$N$_4$NFs nanofiber (FIG. 14A) and elemental mapping images for C (FIG. 14B), N (FIG. 14C), Au (FIG. 14D), and Pd (FIG. 14E), respectively, as well as EDX (FIG. 14F).

(FIG. 18B), the total conversion temperature $T_{100}$ (FIG. 18C), and the durability tests for CO conversion percentage as a function of time (FIG. 18D).

FIGS. 19A-19B show a SEM image of Au/Pd/C$_3$N$_4$NFs before (FIG. 19A) and after (FIG. 19B) durability tests.

FIGS. 20-29 are directed to Example 3 described herein.

FIG. 20 shows a scheme (Scheme 3) displaying the formation process of Pt/Pd/CNs nanorods.

FIGS. 21A-21D show the SEM (FIGS. 21A-21B), TEM (FIG. 21C), and SAED pattern (FIG. 21D) of Pt/Pd/CNs nanorods.

FIGS. 25A-25B show N$_2$ adsorption-desorption isotherms of Pt/Pd/CNs nanorods (FIG. 25A) and metal-free CN nanorods (FIG. 25B).

FIGS. 26A-26D show CVs (FIG. 26A) and LSV (FIG. 26B) of Pt/Pd/CNs, CNs, and Pt/C benchmarked in a CO-saturated aqueous solution of 0.1 M KOH at a sweeping rate of 50 mVs$^{-1}$; comparison of the current densities and oxidation potentials (FIG. 26C); and ECSA of the as-synthesized catalysts (FIG. 26D).

FIGS. 28A-28D show I-T chronoamperometric measurements in a CO-saturated aqueous solution of 0.1 M KOH at −0.19 V (FIG. 28A), as well as CVs before and after durability cycles for Pt/Pd/CNs nanorods (FIG. 28B), CN nanorods (FIG. 28C), and commercial Pt/C catalyst (FIG. 28D).

FIG. 29 shows CVs of Pt/Pd/CNs nanorods measured under UV-light irradiation relative to that under dark in a CO-saturated aqueous solution of 0.1 M KOH at 50 mV s$^{-1}$.

FIGS. 30-36E are directed to Example 4 described herein.

FIG. 30 shows oxidation of CO to CO$_2$ and reduction of CO$_2$ to HCOOH using the catalyst Pd/Cu/gC$_3$N$_4$NTs.

FIGS. 31A-31F show SEM (FIG. 31A) and TEM (FIG. 31B) images of Pd/Cu/gC$_3$N$_4$NTs, as well as a high magnification TEM image of an individual nanotube (FIG. 31C), HRTEM images of the numbered areas in FIG. 31C, respectively (FIGS. 31D-31E), and the SAED pattern of Pd/Cu/gC$_3$N$_4$NTs (FIG. 31F).

FIGS. 32A-32F show a HAADF-STEM image of a single Pd/Cu/gC$_3$N$_4$NTs nanotube (FIG. 32A) and its elemental mapping analysis for C (FIG. 32B), N (FIG. 32C), Pd (FIG. 32D), and Cu (FIG. 32E), respectively, and EDX analysis of gC$_3$N$_4$NTs and Pd/Cu/gC$_3$N$_4$NTs (FIG. 32F).

FIGS. 34A-34D show N$_2$ adsorption-desorption isotherms and pore size distributions of Pd/Cu/gC$_3$N$_4$NTs (FIG. 34A and FIG. 34C) and gC$_3$N$_4$NTs (FIG. 34B and FIG. 34D), respectively.

FIGS. 35A-35B show the CO conversion efficiency of some exemplary catalysts as a function of temperature (FIG. 35A) and CO conversion kinetics at temperatures that ranged from 25 to 200° C. (FIG. 35B).

FIGS. 36A-36E show CVs in the absence of CO$_2$ (FIG. 36A), CVs (FIG. 36B), LSV (FIG. 36C), and EIS in the presence of CO$_2$ (FIG. 36D) measure in 0.5 M NaHCO$_3$ under an applied potential of 0.2 V at room temperature, as well as CVs under light relative to under dark on a Pd/Cu/gC$_3$N$_4$CTs tested CO$_2$-saturated aqueous solution of 0.5 M NaHCO$_3$ at 50 nVs$^{-1}$ at room temperature (FIG. 36E).

DETAILED DESCRIPTION

Figure 1A:
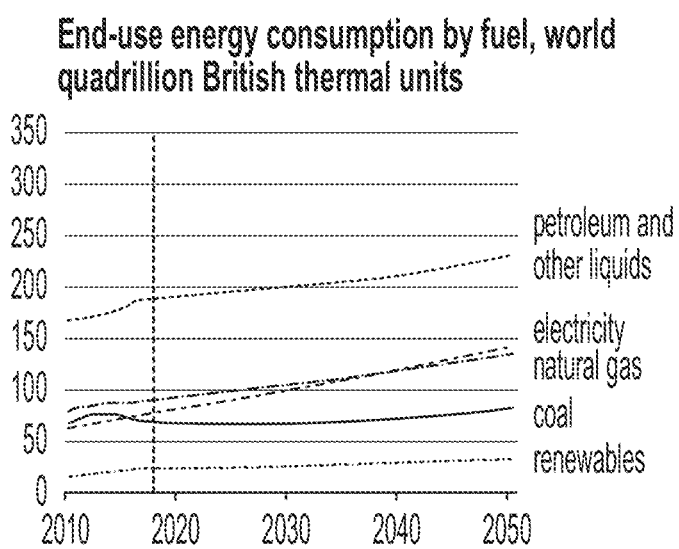
FIGS. 1A-1B show the worldwide energy consumption (FIG. 1A) and worldwide $CO_2$ emission (FIG. 1B), as obtained from International Energy Outlook 2019, U.S. Energy Information Administration Office of Energy Analysis, U.S. Department of Energy, Washington, DC 20585.
Figure 1B:
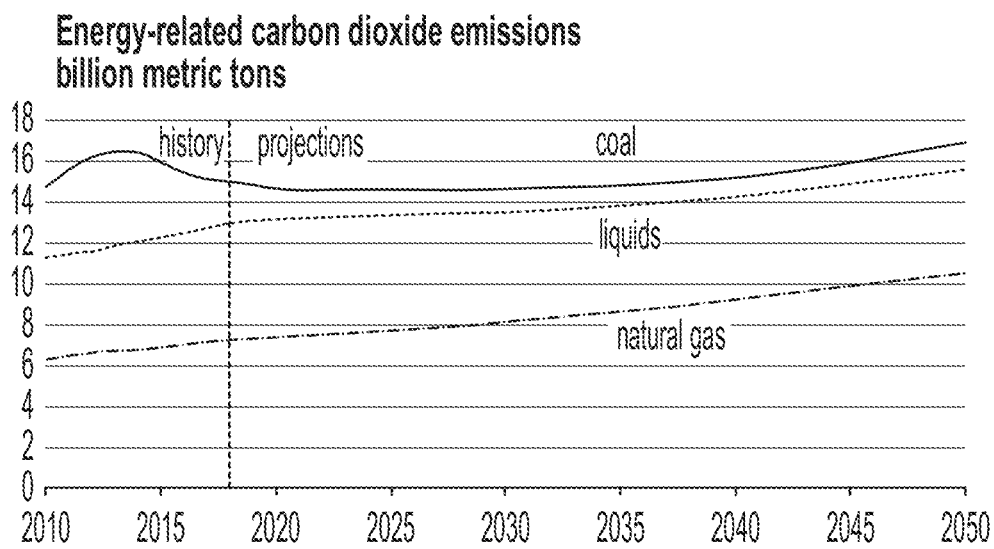

In some aspects, provided herein is a solution for conversion of CO$_2$ and CO gases into useful hydrocarbon fuels under ambient reaction conditions using active, stable, inexpensive, earth-abundant, and environmental benign carbon-nitride-based catalysts to reduce greenhouse-gas emissions.

In some aspects, provided herein are porous one-dimensional (1-D) polymeric graphitic-like carbon nitrides (gC$_3$N$_4$) nanotubes, nanowires, nanorods, and nanofibers codoped atomically with Au/Pd or Pd/Cu or Pt/Pd as active and durable gas phase catalysts and electrocatalysts for CO and CO$_2$ conversion reactions. In some aspects and embodiments, the catalysts provided herein possess various physicochemical benefits, including unique thermal stability (up to 600° C. in air), dynamic chemical stability in different organic/inorganic solvents, high electron density, massive defects, and nontoxicity which are highly required merits in practical gas conversion applications.

In some aspects and embodiments, porous 1-D $gC_3N_4$ nanostructures enriched with N-atom provide various accessible active sites for the adsorption of the reactant molecules and facilitate their diffusion to the interior cores, which are not vulnerable to aggregation and have high tolerance to the reaction products. Meanwhile, the abundant dipole $N^-$—$C^+$ bonds inside $gC_3N_4$ favor electrophilic/nucleophilic attack, accelerating the adsorption of CO along with the adsorption/dissociation of $O_2$, which are pivotal factors for enhancement the gas conversion performance.

Unlike traditional supported metal and metal oxides catalysts ubiquitously used with a high content (nearly ≥30 wt. %), some embodiments of the catalysts provided herein are freestanding and include Au/Pd, Pd/Cu, and Pt/Pd in the form of atomic doping with content thereof (e.g., only 1 wt. %-1.2 wt. %). In some preferred embodiments, the atomic doping reduces consumption of expensive and scarce metals and provides more accessible active sites for the adsorption of reactant molecules, generating oxygenated species and accelerating the gas conversion kinetics under ambient conditions with a high tolerance for the reaction products. In some embodiments, the doping increases the utilization of metal atoms and reduces or eliminates susceptibility for agglomeration during the gas conversion reactions.

In some embodiments, the 1-D $gC_3N_4$-based materials provided herein can be easily prepared from wide ranges of earth abundant and inexpensive resources, which can be adapted to large-scale and practical applications.

In some embodiments, the combination between unique physicochemical merits of 1-D $gC_3N_4$ and impressive catalytic properties of Au/Pd, Pd/Cu, and Pt/Pd resulted in efficient catalysts in line with the United States Department of Energy target for CO oxidation catalyst (<150° C.).

In some aspects and embodiments, the catalysts provided herein can fully oxidize CO to $CO_2$ and reduce $CO_2$ to hydrocarbon thermally, electrochemically, or photo-electrochemically.

In some embodiments, the catalytic performances of the catalysts provided herein are superior to wide ranges of pre-existing Au-based, Pd-based, Pt-based, Cu-based, and Cu/Mn-based catalysts.

Embodiments of the catalysts provided herein were used successfully for CO oxidation under ambient reaction conditions as well as $CO_2$ reduction and could be extended for the conversion of other gases. In some aspects and embodiments, the catalysts provided herein possess various advantages over previously available catalysts for CO conversion reaction.

Porous polymeric 1-D $gC_3N_4$ materials were not typically used as catalysts for CO oxidation and/or $CO_2$ reduction, owing to inferior conductivity, inaccessible surface area, and weak interaction with the metal-catalysts. In some aspects and embodiments presented herein, atomic doping alters the physiochemical merits of porous 1-D $gC_3N_4$, including enhancement of its surface area to (320.6 $m^2\ g^{-1}$), porosity (average pore size of 54.8 nm and pore volume 0.54 cc/g), and conductivity (doping with Pd/Cu, Au/Pd, and Pt/Pd).

In some embodiments, the method provided herein allowed one-pot synthesis of porous 1-D $gC_3N_4$ nanotubes, nanofibers, nanowires, and nanorods with high mass production, without the needing for template and multiple complicated steps. In addition, these nanostructures can be in suite doped with binary metals without any additional steps for doping or activation. In some embodiments, the method provided herein can be used easily for the fabrication of wide ranges of graphite-like carbon nitride materials in different shapes or dimensions doped with various metals.

In some embodiments, polymeric porous 1-D $gC_3N_4$ as provided herein can be simply prepared in a high yield from wide ranges of cheap and abundant resources as well as easily stored, handled, and modified without special laboratory equipment.

In some embodiments, atomic doping of Au/Pd, Pd/Cu, and Pt/Pd inside $gC_3N_4$ not only reduce the metal consumption, but also lessen the reaction barriers for CO oxidation or $CO_2$ reduction.

In some embodiments, the 1-D $gC_3N_4$ catalysts doped with only 1%-1.2 wt. % of Au/Pd, Pt/Pd, or Pd/Cu atoms provided herein were successfully used for complete CO conversion to $CO_2$ under temperature lower than 150° C.

In some embodiments, the 1-D $gC_3N_4$ catalysts provided herein can promptly oxidize CO thermally, electrochemically, photocatalytically, and photo-electrochemically to $CO_2$ along with reducing $CO_2$ to hydrocarbons (under low potential).

In some aspects and embodiments, provided herein are graphitic-like carbon nitride ($gC_3N_4$) nanostructures which are optionally doped atomically with one or more metal elements, and catalysts comprising the graphitic-like carbon nitride ($gC_3N_4$) nanostructures.

In some embodiments, the graphitic-like carbon nitride ($gC_3N_4$) nanostructure is doped atomically with one or more metal elements.

In some embodiments, the graphitic-like carbon nitride ($gC_3N_4$) nanostructure is not doped atomically with one or more metal elements.

In some embodiments, the carbon nitride nanostructure is nanotube, nanowire, nanorod, or nanofiber. In some embodiments, the nanostructure comprises at least one of nanotubes, nanowires, nanorods, or nanofibers.

In some embodiments, the carbon nitride nanostructure is one-dimensional (1-D). In some embodiments, the carbon nitride nanostructure is two-dimensional (2-D). In some embodiments, the carbon nitride nanostructure is three-dimensional (3-D). Preferably, the carbon nitride nanostructure is one-dimensional (1-D).

In some embodiments, the carbon nitride nanostructure is used as catalyst for carbon monoxide (CO) oxidation reaction. In some embodiments, the carbon nitride nanostructure is used as catalyst for carbon dioxide ($CO_2$) reduction reaction. In some embodiments, in CO oxidation reaction CO is oxidized to $CO_2$. In some embodiments, in $CO_2$ reduction reaction, $CO_2$ is reduced to $HCO_2H$.

In some embodiments, the carbon nitride nanostructure is functionalized with metal-based nanoparticle(s), single-atom, metal oxide nanoparticle(s), or hybrid nanoparticle(s), and is capable of being used as catalyst for CO oxidation reaction and/or $CO_2$ reduction reaction. In some embodiments, the metal is in the form of dopants, signal-atom, nanoparticle, ion, oxide, or any combination thereof. In some embodiments, the metal is mono, binary, ternary, or hybrid metal, and is in the form of dopants, single-atom, nanoparticles, ions, oxides, or any combination thereof.

In some embodiments, the carbon nitride nanostructure is doped atomically with one or more metal elements selected from the group consisting of gold (Au), palladium (Pd), copper (Cu), platinum (Pt), and any combination thereof. In some embodiments, the carbon nitride nanostructure is doped atomically with Au and Pd. In some embodiments, the carbon nitride nanostructure is doped atomically with Pd and Cu. In some embodiments, the carbon nitride nanostructure is doped atomically with Pd and Pt. In some embodiments, the nanostructure is doped atomically with Pd and at least a second metal element selected from the group consisting of Au, Cu, and Pt.

In some embodiments, the carbon nitride nanostructure is doped with 1 wt. %-1.2 wt. % metal elements. In some embodiments, the carbon nitride nanostructure is doped with 1 wt. %-1.2 wt. % Au/Pd. In some embodiments, the carbon nitride nanostructure is doped with 1 wt. %-1.2 wt. % Pd/Cu. In some embodiments, the carbon nitride nanostructure is doped with 1 wt. %-1.2 wt. % Pt/Pd.

In some embodiments, the carbon nitride nanostructure is carbon nitride nanotube doped with Au and Pd (Au/Pd/$gC_3N_4$NT). In some embodiments, the carbon nitride nanostructure is carbon nitride nanofiber doped with Au and Pd (Au/Pd/$gC_3N_4$NF). In some embodiments, the carbon nitride nanostructure is carbon nitride nanorod doped with Pt and Pd (Pt/Pd/CN nanorod). In some embodiments, the carbon nitride nanostructure is carbon nitride nanotube doped with Pd and Cu (Pd/Cu/$gC_3N_4$NF).

In some embodiments, the carbon nitride nanostructure is porous, having surface area ranging from 300 $m^2 g^{-1}$ to 350 $m^2 g^{-1}$. In some embodiments, the carbon nitride nanostructure is porous, having average pore size/diameter ranging from 45 nm to 65 nm, and pore volume ranging from 0.45 cc/g to 0.65 cc/g. In some embodiments, the surface area is about 300, 310, 320, 330, 340, or 350 $m^2 g^{-1}$. In some embodiments, the nanostructure is porous, having surface area ranging from 300 $m^2 g^{-1}$ to 350 $m^2 g^{-1}$, an average pore size/diameter ranging from 45 nm to 65 nm, and a pore volume ranging from 0.45 cc/g to 0.65 cc/g In some embodiments, the carbon nitride nanostructure is nanotube, having surface area ranging from 300 $m^2 g^{-1}$ to 350 $m^2 g^{-1}$", for example, the surface area is about 300, 310. 320, 330, 340, or 350 $m^2 g^{-1}$.

In some embodiments, the carbon nitride nanostructure is nanotube, having surface area ranging from 200 $m^2 g^{-1}$ to 280 $m^2 g^{-1}$", for example, the surface area is about 200, 210, 220, 230, 240, 250, 260, 270, or 280 $m^2 g^{-1}$.

In some embodiments, the carbon nitride nanostructure is nanofiber, having surface area ranging from 50 $m^2 g^{-1}$ to 120 $m^2 g^{-1}$, for example, the surface area is about 50, 60, 70, 80, 90, 100, 110, or 120 $m^2 g^{-1}$. In some embodiments, the carbon nitride nanostructure is nanofiber, having surface area ranging from 80 $m^2 g^{-1}$ to 100 $m^2 g^{-1}$, for example, the surface area is about 80, 90, or 100 $m^2 g^{-1}$.

In some embodiments, the carbon nitride nanostructure is nanorod, having surface area ranging from 100 $m^2 g^{-1}$ to 200 $m^2 g^{-1}$, for example, the surface area is about 100, 110, 120, 130, 140, 150, 160, 170, 180, 190, or 200 $m^2 g^{-1}$.

In some embodiments, the carbon nitride nanostructure has conductivity.

In some embodiments, the carbon nitride nanostructure is doped atomically with one or more metal elements selected from the group consisting of gold (Au), palladium (Pd), copper (Cu), platinum (Pt), and any combination thereof; or the carbon nitride nanostructure is doped atomically with Au and Pd, or Pd and Cu, or Pd and Pt; and the carbon nitride nanostructure is porous, having surface area ranging from 300 $m^2 g^{-1}$ to 350 $m^2 g^{-1}$, average pore size/diameter ranging from 45 nm to 65 nm, and pore volume ranging from 0.45 cc/g to 0.65 cc/g.

In some embodiments, the carbon nitride nanostructure provided herein is used or is capable of being used as catalyst for oxidizing CO in a CO gas mixture, and/or reducing $CO_2$ in a $CO_2$ gas mixture, at a temperature ranging from the room temperature to 300° C., wherein the CO gas mixture contains 1%-100% of CO, the $CO_2$ gas mixture contains 1%-100% of $CO_2$.

In some embodiments, the carbon nitride nanostructure is used or is capable of being used as catalyst for CO and $CO_2$ conversion to a hydrocarbon. In some embodiments, the conversion is thermal, electrochemical, photocatalytic and photo-electrochemical conversion.

In some embodiments, the carbon nitride nanostructure is used or is capable of being used as catalyst for $CO_2$ conversion to CO and/or to a hydrocarbon.

In some embodiments, the CO and $CO_2$ conversion is enhanced using at least one other metal support selected from the group consisting of metal oxides, molecular sieves, carbon supports, ceramic-based materials, clay-based materials, and promoters,
  wherein the metal oxides is at least one of $TiO_2$, $CeO_2$, $Fe_2O_3$, $SiO_2$, or $Fe_3O_4$,
  wherein the molecular sieves is a zeolite,
  wherein the carbon supports is at least one of diamond, graphene, cellulose, lignin, and carbon nanotube,
  wherein the ceramic-based materials comprises bioglass and hydroxyapatite,
  wherein the clay-based materials comprises bentonite and halloysite, and
  wherein the promotors comprises KOH, HCl, $HNO_3$, and $CH_3COOH$.

In some aspects and embodiments, provided herein is a method of making a carbon nitride ($gC_3N_4$) nanostructure, the method comprising:
  a. providing a metal salt solution comprising one or more metal salts and a first solvent;
  b. adding melamine to the metal salt solution followed by adding an acid solution, optionally while stirring at a first temperature, thereby forming a precipitate;
  c. washing the precipitate with a second solvent;
  d. drying the washed precipitate at a second temperature, thereby obtaining a powder.

In some embodiments, the method further comprises annealing the powder (e.g., by annealing after drying).

In some embodiments of the method, the metal salt is selected from the group consisting of $HAuCl_4 \cdot 3H_2O$, $HAuCl_4$, $K_2PdCl_4$, $Na_2PdCl_4$, $K_2PtCl_4$, $Na_2PtCl_4$, $CuCl_2 \cdot 2H_2O$, $CuCl_2$, and any combination thereof. In some embodiments, the metal salt is selected from the noble metals group, the transition metals, and any combination thereof.

In some embodiments of the method, the first solvent is selected from the group consisting of ethylene glycol and isopropanol. In some embodiments, the first solvent is selected from the group consisting of ethylene glycol, isopropanol, and water.

In some embodiments of the method, the second solvent is selected from the group consisting of ethanol and isopropanol.

In some embodiments of the method, the first and second solvents are the same.

In some embodiments of the method, the acid is selected from the group consisting of $HNO_3$ and HCl. In some embodiments, the HCl is combined with $NaNO_3$.

In some embodiments of the method, the first temperature is room temperature.

In some embodiments of the method, the second temperature is ranging from about 70° C. to 100° C.

In some aspects, the embodiments of the method provided herein are used for making the carbon nitride nanostructures provided herein. In some embodiments of the method, the nanostructure is prepared from a nitrogen-rich precursor comprising urea, thiourea, cyanuric acid-based, cyandiamide, pyridine, or guanidine hydrochloride.

In some aspects, provided herein are carbon nitride nanostructures made by the embodiments of the method provided herein.

In some aspects, provided herein are catalysts comprising the carbon nitride nanostructures of embodiments provided herein. In some embodiments, the catalysts provided herein further comprises other carbon-based materials or metal oxides for CO gas and/or $CO_2$ gas conversions.

In some aspects and embodiments, provided herein is a method of oxidizing CO, comprising
  providing a CO gas mixture containing 1-100% CO (e.g., at least 1% CO);
  providing a catalyst provided herein to the CO gas mixture (e.g., providing a catalyst to contact the CO gas mixture, wherein the catalyst comprises the graphitic-like carbon nitride nanostructure as otherwise disclosed herein); and
  performing CO oxidation reaction.

In some aspects and embodiments, provided herein is a method of reducing $CO_2$, comprising
  providing a $CO_2$ gas mixture containing 1-100% CO (e.g., at least 1% CO);
  providing a catalyst provided herein to the $CO_2$ gas mixture (e.g., providing a catalyst to contact the $CO_2$ gas mixture, wherein the catalyst comprises the graphitic-like carbon nitride nanostructure as otherwise disclosed herein); and
  performing $CO_2$ reduction reaction.

In some embodiments, CO is oxidized to $CO_2$ in the CO oxidation reaction. In some embodiments, $CO_2$ is reduced to $HCO_2H$ in $CO_2$ reduction reaction.

In some embodiments, the CO oxidation or the $CO_2$ reduction is performed under a condition wherein a UV-light is on the catalyst.

In some aspects and embodiments, the method further comprises converting CO or $CO_2$ to a hydrocarbon.

In some aspects and embodiments, provided herein is a method of converting CO or $CO_2$ to a hydrocarbon, comprising
  providing a CO or $CO_2$ gas mixture containing 1-100% CO or $CO_2$;
  providing a catalyst provided herein to the gas mixture; and
  performing conversion reaction.

In some embodiments, the conversion is for thermal, electrochemical, photocatalytic, or photo-electrochemical conversion.

EXAMPLES

Materials

| Material Description | Source |
| --- | --- |
| Nitric acid 70% ($HNO_3$) | Sigma-Aldrich Chemie GmbH (Munich, Germany) |
| Hydrochloric acid, 37% (HCl) | Sigma-Aldrich Chemie GmbH (Munich, Germany) |
| Ethylene glycol, 99.8% ($HOCH_2CH_2OH$) | Sigma-Aldrich Chemie GmbH (Munich, Germany) |
| Sodium nitrate, 99.0% (NaNO3) | Sigma-Aldrich Chemie GmbH (Munich, Germany) |

-continued

| Material Description | Source |
| --- | --- |
| Ethanol, 99.9% ($C_2H_5OH$) | Sigma-Aldrich Chemie GmbH (Munich, Germany) |
| Sodium nitrate, 99% ($NaNO_3$) | Sigma-Aldrich Chemie GmbH (Munich, Germany) |
| Melamine, 99.0% ($C_3H_6N_6$) | Sigma-Aldrich Chemie GmbH (Munich, Germany) |
| Gold(III) chloride trihydrate, 99.9% ($HAuCl_4 \cdot 3H_2O$) | Sigma-Aldrich Chemie GmbH (Munich, Germany) |
| Potassium tetrachloropladinate (II), 99.9% ($K_2PdCl_4$) | Sigma-Aldrich Chemie GmbH (Munich, Germany) |
| Copper (II) chloride dihydrate, 99.9% ($CuCl_4 \cdot 2H_2O$) | Sigma-Aldrich Chemie GmbH (Munich, Germany) |
| Potassium tetrachloroplatinate (II), 99.99% ($K_2PtCl_4$) | Sigma-Aldrich Chemie GmbH (Munich, Germany) |

Materials and Products Characterization

The morphology and composition of the as-synthesized materials were determined with a scanning electron microscope (SEM, Hitachi S-4800, Hitachi, Tokyo, Japan), a transmission electron microscope (TEM, TecnaiG220, FEI, Hillsboro, OR, USA) equipped with an energy-dispersive spectrometer (EDS), a high-angle annular dark-field scanning transmission electron microscopy (HAADF-STEM), elemental mapping, and high-resolution TEM (HRTEM).

X-ray photoelectron spectroscopy (XPS) was carried out with a Kratos Axis (Ultra DLD XPS Kratos, Manchester, U.K.) equipped with a monochromatic Al Kα radiation source (1486.6 eV) under a UHV environment (ca. $5 \times 10^{-9}$ Torr).

The X-ray diffraction pattern (XRD) was recorded on an X-ray diffractometer (X'Pert-Pro MPD, PANalytical Co., Almelo, The Netherlands) using a Cu Kα X-ray source (λ=1.540598 Å).

The $N_2$-physisorption isotherms were measured on a Quantachrome Autosorb-1 analyzer (Quantachrome Instrument Corporation, Boynton Beach, FL, USA). Or, the $N_2$-physisorption isotherms were measured on a Quantachrome Autosorb 3.01 instrument (Quanta chrome instrument corporation, Boynton Beach, FL, USA) at 77 K. Before the measurements the samples were initially degassed, e.g., for 24-hours at 323 K under vacuum.

The Fourier transform infrared spectra were recorded on a Thermo Nicolet Nexus 670 FTIR spectrometer (Thermo Scientific, Madison, WI, USA).

The Raman spectra were recorded on a PerkinElmer RamanStation 400 spectrometer with a 785 nm laser as an excitation source.

Example 1: Au/Pd/$gC_3N_4$NTs ($gC_3N_4$ Nanotubes Doped with Au and Pd)

Materials: Gold (III) chloride trihydrate ($HAuCl_4 \cdot 3H_2O$, 99.99%), potassium tetrachloropalladate (II) ($K_2PdCl_4$, 99.99%), melamine (99%), ethylene glycol, and nitric acid (70%) were obtained from Sigma-Aldrich Chemie GmbH (Munich, Germany).

Synthesis of Porous Au/Pd/$gC_3N_4$NTs: 1 gram of melamine was slowly added to 30 mL of an ethylene glycol solution containing 1 mL of $HAuCl_4 \cdot 3H_2O$ (20 mM) and 1 mL of $K_2PdCl_4$ (20 mM), followed by the dropwise addition of 70 mL of $HNO_3$ (0.1 M) while stirring at room temperature for 30 minutes. The as-formed yellowish precipitate was washed with ethanol and dried at 80° C. for 12 hours before annealing at 450° C. (3°/minute) for 2 hours. After cooling to room temperature, the final product was saved for further characterization.

Material Characterization: The morphology and composition of the as-synthesized materials were determined using methods and instructions set forth in the general description above.

CO Oxidation Reaction: The CO conversion reaction on Au/Pd/gC$_3$N$_4$NTs was benchmarked relative to that on gC$_3$N$_4$NTs in a fixed bed quartz tubular reactor connected to an online gas analyzer (IR200, Yokogawa, Japan). In particular, 50 mg of each catalyst was initially treated at 250° C. under an O$_2$ flow of 50 mL min$^{-1}$ for 1 hour, followed by a flow of H$_2$ (30 mL. min$^{-1}$) for 1 hour. Then the catalysts were exposed to a reactant gas mixture consisting of 4% CO and 20% O$_2$ and balanced with Ar with a total flow of 50 mL min$^{-1}$ while heating. The percentage of CO conversion (% CO) was calculated using the following equation $$\% \ CO = [(CO_{in} - CO_{out})] / CO_{in} \times 100$$

where $CO_{in}$ is the input amount and $CO_{out}$ is the output amount of CO.

The cyclic voltammogram measurements were carried out on a Gantry electrochemical analyzer (reference 3000, Gamry Co., USA), using a three-electrode cell including a platinum wire, Ag/AgCl, and glassy carbon (GC, 5 mm) as the counter, reference, and working electrodes, respectively. The GC electrodes were covered with 10 µg of each catalyst, followed by the addition of 5 µL of Nafion (0.05%), and left to dry before the measurements.

Figure 2:
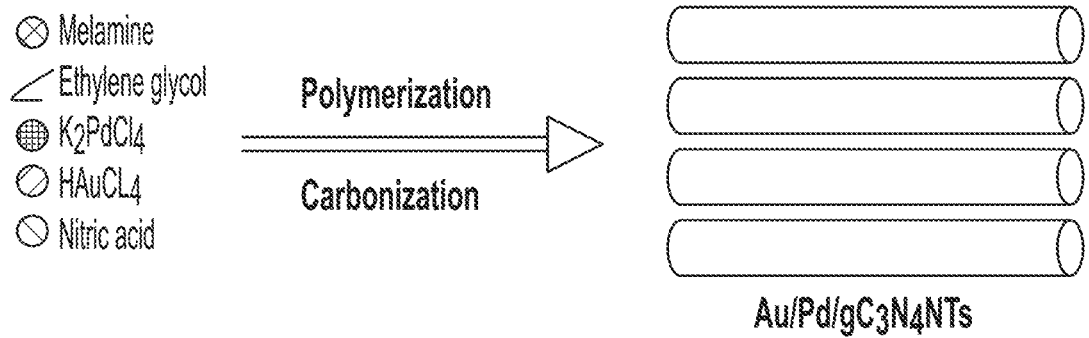

Results and Discussion: Scheme 1 (FIG. 2) displays the fabrication process of the Au/Pd/gC$_3$N$_4$NTs consisting of the polymerization of melamine in an ethylene glycol solution in the presence of both Pd and Au precursors with the assistance of nitric acid followed by carbonization. In particular, nitric acid resulted in polymerized melamine with the formation of melon sheets as revealed by the formation of a yellowish precipitate. The as-formed precipitate was filtered and washed with ethanol and then dried at 80° C. to remove any impurities. Then, the obtained yellowish powder was carbonized by thermal annealing at an elevated temperature. This clearly displays the inherent capacity toward high mass production of the Au/Pd/gC$_3$N$_4$NTs.

The SEM images displayed the formation of monodisperse, uniform one-dimensional (1-D) nanotube morphology (FIGS. 3A and 3B). The TEM image of Au/Pd/gC$_3$N$_4$NTs also revealed the production of porous nanotube structure with an average length of 1.3 µm and a width of 95 nm (FIGS. 3C and 3D).

Figure 4A:
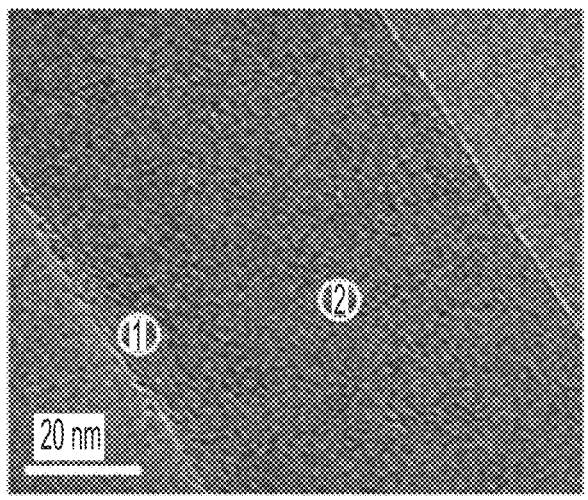
FIGS. 4A-4C show a high-magnification TEM image of Au/Pd/$gC_3$)$N_4$NTs (FIG. 4A) and HRTEM images of the numbered areas in FIG. 4A respectively (FIGS. 4B and 4C). The inset in FIG. 4C shows the FFT and FT.
Figure 4B:
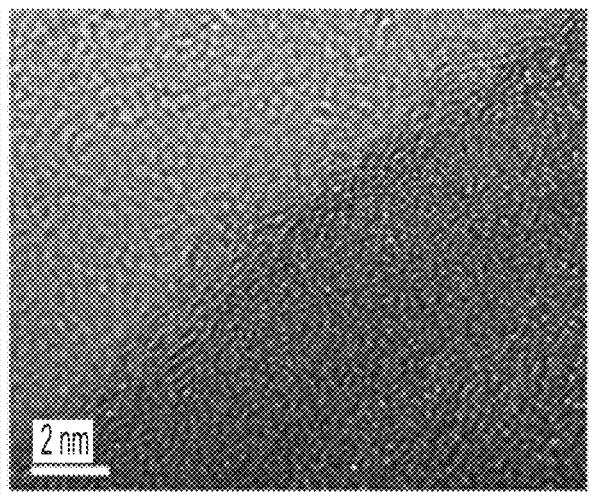

The high-magnification TEM image of a single nanotube showed its smooth surface and well-defined porous interior (FIG. 4A). The HRTEM image of a randomly selected area from the nanotube wall showed that the wall was composed of a polycrystalline graphitic layer of nanostructures (FIG. 4B). In the meantime, the HRTEM image of the core area displayed the polycrystalline phase of carbon nanostructures having various nanosheet curvatures (FIG. 4C).

Figure 4C:
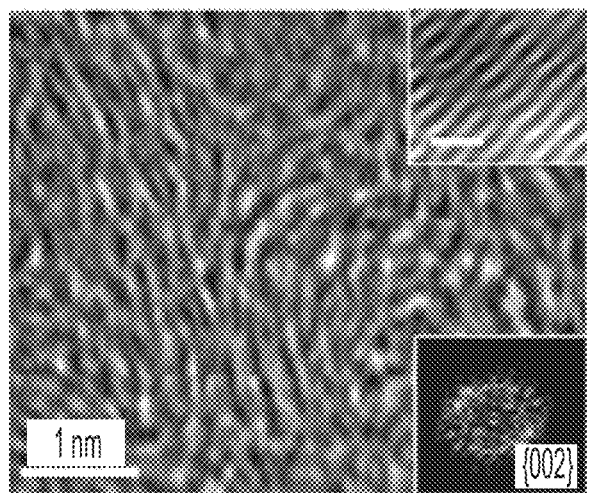

The resolved Fourier filtered lattice fringes (FFT) in the core area showed their twisting with multiple crystalline defects and lattice distortion (FIG. 4C, inset). These defects could plausibly be attributed to the codoping effect with both Au and Pd. The interplanar distance among the adjacent lattice fringes was determined to be about 0.33 nm, which is assigned to the {002} facet of the graphitic carbon structure and has also been demonstrated by the corresponding Fourier transform (FT) pattern (FIG. 4C).

Both the TEM and SEM images showed only the presence of nanotube structure in the absence of any kind of undesired nanocrystals such as nanoparticles, which reflects on the uniformity of the as-formed Au/Pd/gC$_3$N$_4$NTs. Au and Pd could not be observed by TEM because neither of them are nanoparticles but are doped structures at the atomic level inside the carbon skeletal structure. Therefore, EDX, element mapping analysis, and XPS analysis were used to confirm the presence of Au and Pd as set forth below.

Figure 5A:
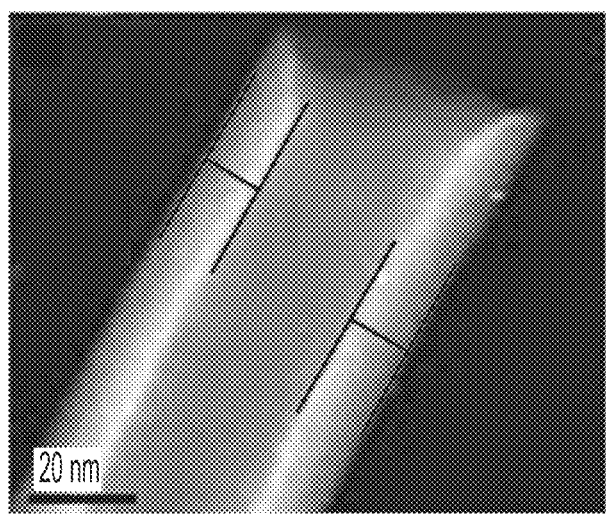
FIGS. 5A-5E show a HAADF-STEM image of a single Au/Pd/$gC_3N_4$NT nanotube (FIG. 5A) and its elemental mapping analysis for C (FIG. 5B), N (FIG. 5C), Au (FIG. 5D), and Pd (FIG. 5E).
Figures 5B, 5C:
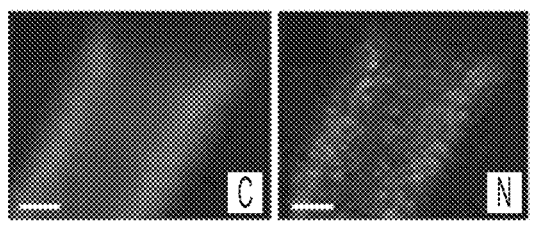
Figures 5D, 5E:
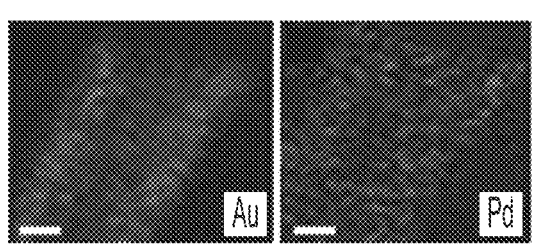

The HAADF-STEM image analysis also revealed the fruitful production of porous nanotube morphology with a smooth surface and well-defined thick walls (FIG. 5A). The average inner diameter of the nanotubes is about 70 nm and a wall thickness of 8 nm (FIG. 5A). The element mapping analysis was used to gain more insight into the composition of the materials thus obtained, which clearly depicted the obvious presence of C, N, Au, and Pd through the nanotubes (FIGS. 5B-5E). Both Au and Pd were found to be coherently distributed through the interior pores and exterior surface of the nanotube. The atomic contents of C, N, Au, and Pd were determined to be 40, 59, 0.52, and 0.48, respectively. These estimated atomic contents were almost in line with the initial precursor's concentrations, demonstrating the purity of the as-obtained materials.

Figure 5F:
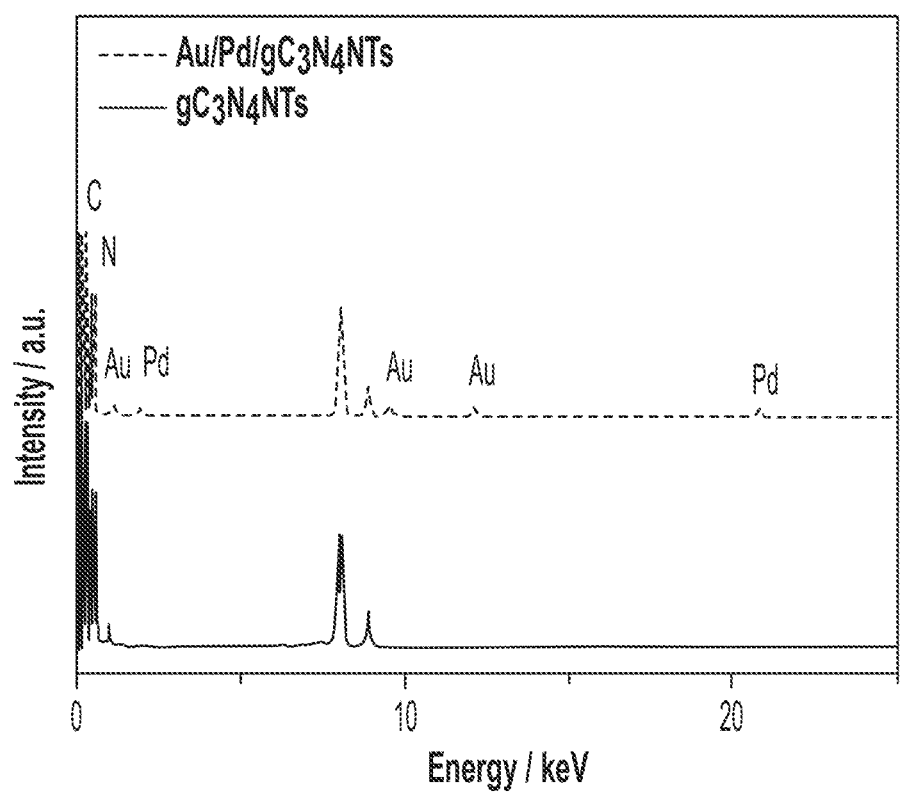
FIG. 5F shows an EDX analysis of the as-fabricated materials. The indicated scale bars in FIGS. 5B-5D are 20 nm.

EDX analysis was carried out to confirm the composition of the materials thus prepared. As expected, gC$_3$N$_4$NTs showed the presence of C and N with atomic ratios of 45 and 55, respectively, without any kind of metal impurities except for elemental Cu from the TEM copper grid (FIG. 5F). Meanwhile, Au/Pd/gC$_3$N$_4$NTs revealed the existence of C, N, Au, and Pd with atomic ratios of 41, 58, 0.51, and 0.49, respectively. This implies that the ratio of Au/Pd is almost 1, demonstrating their equal distribution in the as-made Au/Pd/gC$_3$N$_4$NTs. Meanwhile, the detection of Au and Pd by EDX analysis implies their presence in the bulk or inside the pore of the nanotubes. Therefore, both element mapping and EDX analysis of Au/Pd/gC$_3$N$_4$NTs displayed the homogeneous distribution of Au and Pd inside and outside the nanotubes.

Metal-free gC$_3$N$_4$NTs porous nanotubes were prepared as a control via activation of the polymerization and carbonization of melamine in an ethylene glycol solution free of Au and Pd precursors. Porous gC$_3$N$_4$NTs nanotubes with an average length of 1.21 µm and an average width of 93 nm were formed. The average width of the as-fabricated gC$_3$N$_4$NTs was slightly narrower than that of its counterpart Au/Pd/gC$_3$N$_4$NTs, which may be attributed to the Au and Pd dopants resulting in an expansion of the lattice.

The crystallinity of the as-synthesized Au/Pd/gC$_3$N$_4$NTs and gC$_3$N$_4$NTs was investigated by XRD analysis, which revealed that the diffraction peak at 2Ø of 27° corresponds to the {002} facet of graphitic-like carbon (FIG. 6A). The diffraction peak of Au/Pd/gC$_3$N$_4$NTs was positively shifted relative to gC$_3$N$_4$NTs, which can serve as indirect evidence of the Au and Pd dopants. The diffraction peaks for Au, Pd, and/or their oxides, were not resolved, likely owing to their low content and the inherent doping at the atomic level in Au/Pd/gC$_3$N$_4$NTs.

Figure 6E:
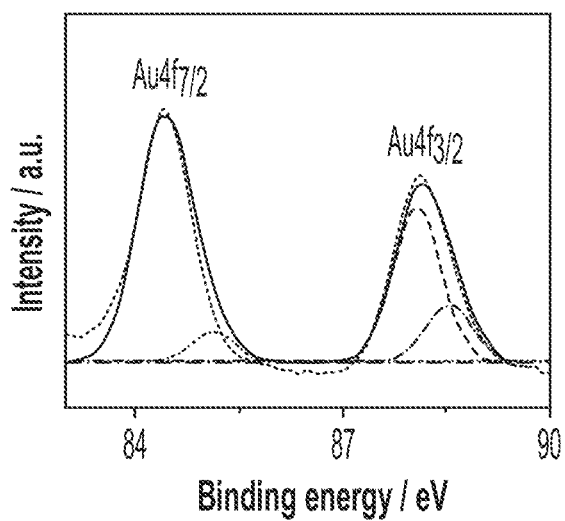
Figure 6F:
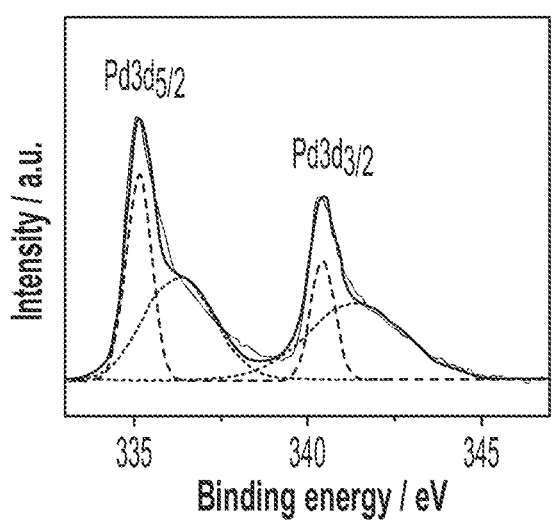

The electronic structure and surface composition of the Au/Pd/gC$_3$N$_4$NTs and gC$_3$N$_4$NTs were investigated by XPS analysis. The full-scan XPS indicated the presence of C, N, Au, and Pd peaks in Au/Pd/gC$_3$N$_4$NTs; meanwhile, gC$_3$N$_4$NTs showed only the C and N peaks (FIG. 6B). The binding energies of both C 1 s and N 1 s peaks in Au/Pd/gC$_3$N$_4$NTs were slightly positively shifted relative to their counterparts in gC$_3$N$_4$NTs, which could be due to the codoping effect with Au and Pd. The C 1 s peak was fitted into two main peaks that were attributed to either graphitic carbon (C—C or C═C) at 284.7 eV or the sp$^2$ carbon-nitrogen (N—C═N) at 286 eV of aromatic rings such as the s-triazine unit and pyridine-like structure (FIG. 6C). The N 1 s spectrum had been deconvoluted into three peaks that were attributed to the pyridinic N at 398.3 eV, pyrrolic N at 399.1 eV, and graphitic N at 401.1 eV, which are ubiquitous features of the carbon nitride-based materials (FIG. 6D). The high-resolution XPS of Pd 4f displayed two major peaks for Pd $3d_{5/2}$ at 335.0 V and Pd $3d_{3/2}$ at 340.5 eV with inferior oxide phases (FIG. 6F). Similarly, Au 4f showed two main peaks at 84.3 eV for Au $4f_{7/2}$ and 88.2 eV for Au $4f_{5/2}$ alongside insignificant oxide phases (FIG. 6E). The surface composition of the Au/Pd/$gC_3N_4$NTs showed the presence of C, N, Au, and Pd with atomic contents of 40, 59, 0.51, and 0.49, respectively, which confirms the presence of Au and Pd over the surface of the nanotubes. Both Au and Pd were also detected after etching of around 20 nm from the surface of the synthesized Au/Pd/$gC_3N_4$NTs, which indicates the presence of Au and Pd inside the nanotubes. This result was in line with the EDX and element mapping analysis, which revealed the homogeneous atomic distribution of Au and Pd inside and outside the nanotubes.

Figure 7A:
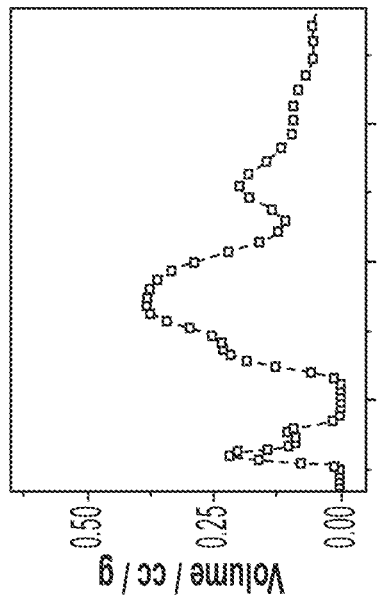
FIGS. 7A-7D show $N_2$ adsorption-desorption isotherms and pore size distributions of Au/Pd/$gC_3N_4$NTs (FIGS. 7A and 7B) and $gC_3N_4$NTs (FIGS. 7C and 7D), respectively.
Figure 7B:
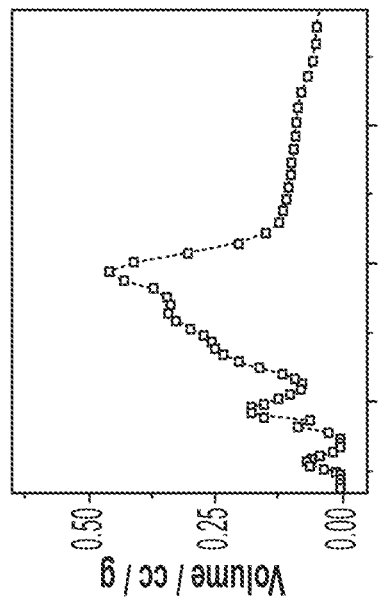
Figure 7C:
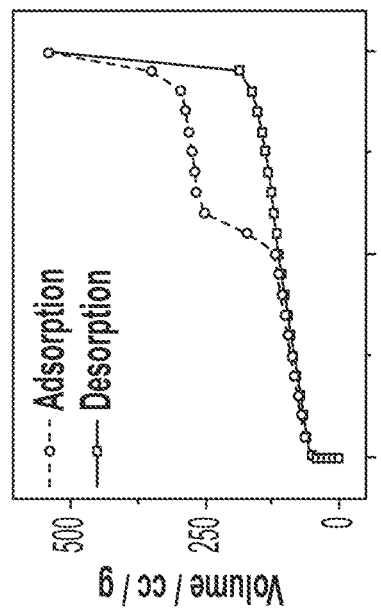
Figure 7D:
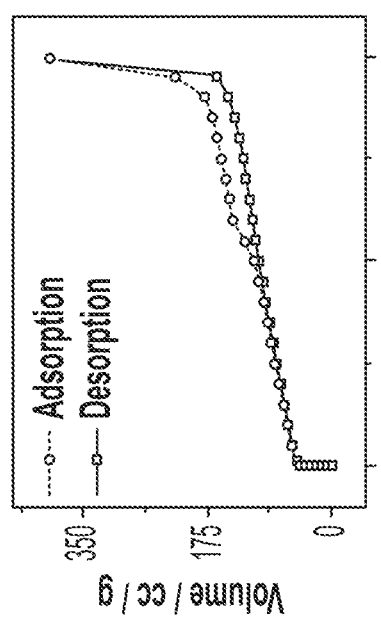

FIGS. 7A-7D shows the $N_2$-physisorption isotherm measurements of Au/Pd/$gC_3N_4$NTs compared to $gC_3N_4$NTs. The surface area and porosity of the as-fabricated materials were calculated using density functional theory (DFT). The surface area of Au/Pd/$gC_3N_4$NTs (320.6 m$^2$ g$^{-1}$) (FIG. 7A) was slightly larger than that of metal-free $gC_3N_4$NTs (275.7 m$^2$ g$^{-1}$) (FIG. 7C). This indicates that Au/Pd/$gC_3N_4$NTs could provide more active catalytic sites for the adsorption of reactant molecules during the catalytic reactions. The average pore diameter of Au/Pd/$gC_3N_4$NTs (57.6 nm) (FIG. 7B) was close to that of $gC_3N_4$NTs (54.8 nm) (FIG. 7D). This is in addition to other pores with different diameters in both samples. The porosity of Au/Pd/$gC_3N_4$NT nanotubes was expected to accelerate mass transfer and electron mobility during the catalytic applications.

Figure 8:
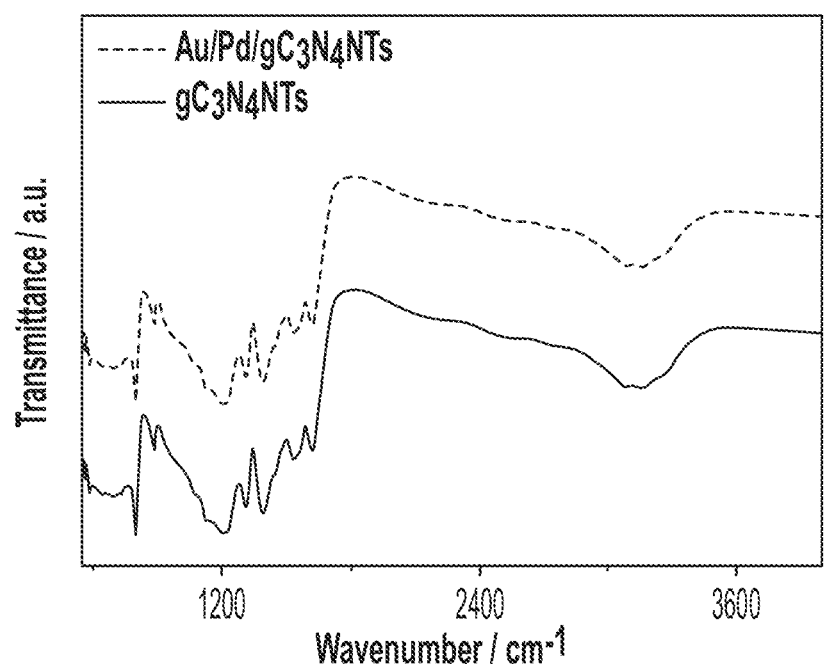

The formation of Au/Pd/$gC_3N_4$NT and $gC_3N_4$NT had been additionally confirmed by FTIR analysis, where both samples depict the main absorption peaks assigned to the breathing mode of triazine at 810 cm$^{-1}$ and the stretching mode of C—N heterocycles at 1200-1650 cm$^{-1}$ (FIG. 8). In the meantime, the small broad bands between 2900 and 3300 cm$^{-1}$ could be possibly attributed to N—H vibrations that originated from the uncondensed amine groups. Noticeably, the bands at 2900-3300 cm$^{-1}$ were less intensive and broader in the Au/Pd/$gC_3N_4$NTs than those in its counterpart $gC_3N_4$NTs, most plausibly owing to the doping effect resulting from the strong attraction of N toward Au and Pd atoms (FIG. 8). This is indicated by the acceleration and improvement of the condemnation of the $gC_3N_4$NTs through Au/Pd-mediated synthesis. Additionally, the bands of Au/Pd/$gC_3N_4$NTs were slightly shifted relative to those of the $gC_3N_4$NTs, which is an apparent demonstration of the effect of codoping with Au and Pd.

The successful production of the as-synthesized materials was further proved by Raman spectroscopy using 785 nm laser light as an excitation source because it is one of the most accurate approaches to investigating the disorder in sp$^2$ carbon materials. Both $gC_3N_4$NTs and Au/Pd/$gC_3N_4$NTs displayed one prominent wide peak at 1550 cm$^{-1}$ attributed to the crystalline G band, in line with previous reports. Meanwhile, the absence of the disordered D-band indicates the high degree of graphitization of the as-synthesized materials that is ascribed to the amorphous/crystalline structure of the obtained materials without any resolved lattice fringes as investigated with HRTEM. Internally, both materials displayed a noticeable peak at 2680 cm$^{-1}$, which could be attributed to the symmetrical 2D, indicating their full dispersion.

Various reaction experiments were carried out to optimize the fabrication process of the Au/Pd/$gC_3N_4$NTs and to understand the reason behind the formation of nanotubes instead of other morphologies such as rods and sheets. The quick addition of melamine to the reaction solution drove the formation of aggregated flake-like nanostructures that implied the significant effect of the slow addition of melamine to produce uniform nanotube structure. The polymerization of melamine with nitric acid in the absence of ethylene glycol formed sheet-like aggregated structure. This is an unambiguous indication of the role of ethylene glycol as a structural directing agent in the formation of tubular structures. It was further proven through the use of isopropanol solution instead of ethylene glycol, which resulted in the formation of fiber-like architecture. The fast addition of nitric acid produced non-uniform and aggregated nanotubes. Uniform nanotubes atomically doped with Au and Pd were not obtained when the initial Au and Pd precursor ratios were changed.

Figure 9A:
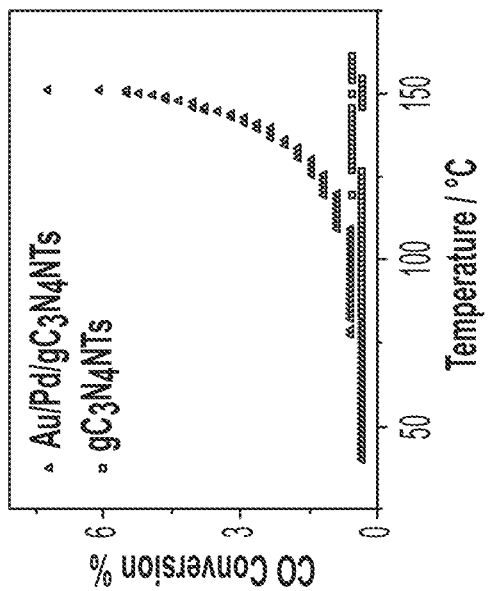
FIGS. 9A-9D show the CO conversion efficiency of several exemplary catalysts as a function of temperature (FIG. 9A), the CO conversion kinetics at temperatures that ranged from 25 to 150° C.

The catalytic activity of the as-synthesized materials was investigated for the gas-phase CO oxidation reactions under ambient atmospheric conditions owing to the importance of this reaction in various fundamental, industrial, and environmental applications. The CO conversion to $CO_2$ (CO+½O→$CO_2$) employing the Au/Pd/$gC_3N_4$NTs relative to that for metal-free $gC_3N_4$NTs was estimated at different reaction temperatures that ranged from room temperature to 400° C. (FIG. 9A). The results displayed that the metal-free $gC_3N_4$NTs did not exhibit any significant CO oxidation activity, even after heating, until 400° C.

Figure 9B:
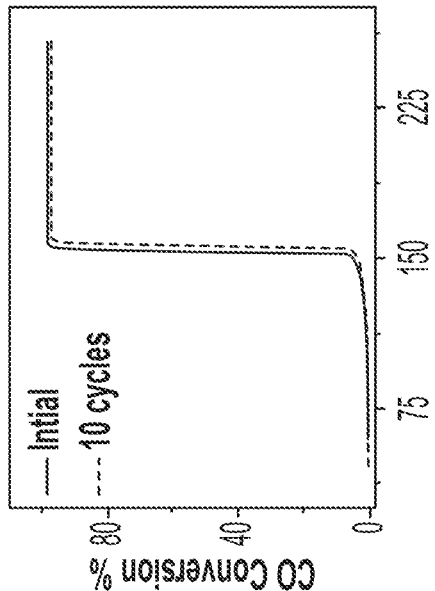

After the codoping of $gC_3N_4$NTs with both Au and Pd, the CO conversion efficiency increased substantially with an increase in the reaction temperature until complete conversion occurred (FIG. 9A). The complete CO conversion (100%) was achieved on the Au/Pd/$gC_3N_4$NTs at 165° C., which indicated the significant doping effect in the improvement of the CO conversion efficiency when compared with $gC_3N_4$NTs. This is due to the electronic effect of Au and Pd which enhanced the adsorption of CO and activation of $O_2$ leading to oxygen accelerating the CO oxidation kinetics. This was indicated in the earlier conversion temperature of the Au/Pd/$gC_3N_4$NTs rather than in the $gC_3N_4$NTs (FIG. 9B). Indeed, the CO conversion on the Au/Pd/$gC_3N_4$NTs started at 74° C., which was significantly lower than that for the $gC_3N_4$NTs (130° C.). Following that, the CO conversion increased sharply on the Au/Pd/$gC_3N_4$NTs, whereas an increase in the reaction temperature did not afford any noticed increase in the CO conversion on the $gC_3N_4$NTs. This mainly could be attributed to the presence of oxygenated species formed by a combination between Au and Pd, which eventually leads to a decrease in the temperature required for the CO conversion. To this end, the half conversion temperature ($T_{50}$) and the full conversion temperature ($T_{100}$) on Au/Pd/$gC_3N_4$NTs were found to be 152° C. and 165° C., respectively. The quick CO conversion kinetics on the Au/Pd/$gC_3N_4$NTs gained further support by the observation of less time necessary for the full CO conversion. The CO conversion percentages on Au/$gC_3N_4$NTs and Pd/$gC_3N_4$NTs were about 8% and 7%, respectively, which were slightly higher than that of $gC_3N_4$NTs. This implies that $gC_3N_4$NTs should be codoped with both Au and Pd to achieve full CO conversion (100%), owing to the electronic and synergetic effects of Au/Pd.

Figure 9C:
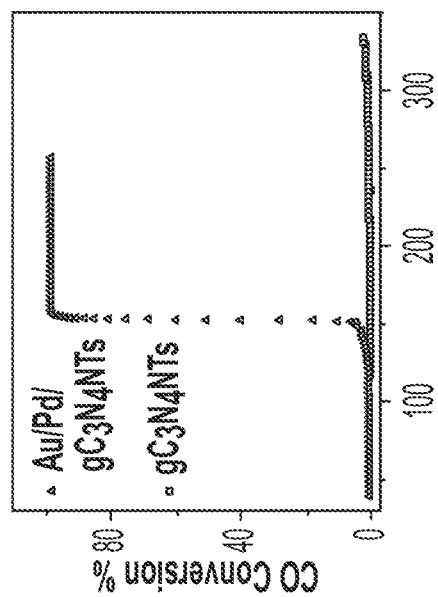
Figure 9D:
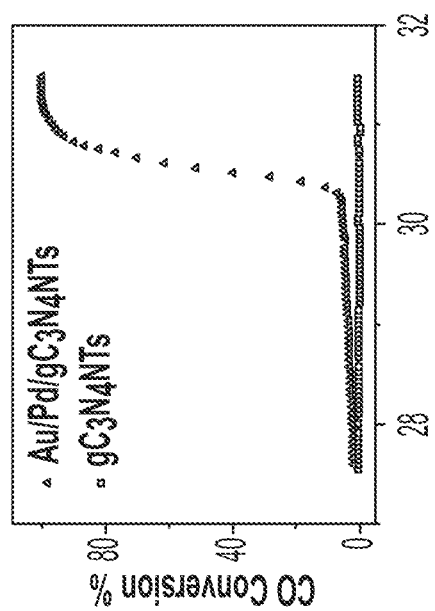

The complete CO conversion time was noticed for the Au/Pd/gC$_3$N$_4$NTs at 30 minutes while at the same time the conversion was only 2% of CO for the gC$_3$N$_4$NTs (FIG. 9C). The T$_{wo}$ of the newly synthesized Au/Pd/gC$_3$N$_4$NTs of 165° C. was lower than that previously reported for various Au-based and Pd-based catalysts such as Au$_{0.75}$Cu$_{0.25}$/SiO$_2$ of 300° C., Pd/La-doped alumina of 175° C., Pt/CNx/SBA-15 of 250° C., and Pd-impeded 3-D porous graphene of 190° C. FIG. 9D illustrates the CO oxidation durability test carried out on the Au/Pd/gC$_3$N$_4$NTs for 10 durability cycles. The results showed that the Au/Pd/gC$_3$N$_4$NTs maintained their initial CO oxidation activity after 10 accelerated stability cycles without any significant loss. Additionally, after the durability test, Au/Pd/gC$_3$N$_4$NTs reserved their nanotube morphology without any noticeable cracking or agglomeration.

Figures 10A, 10B:
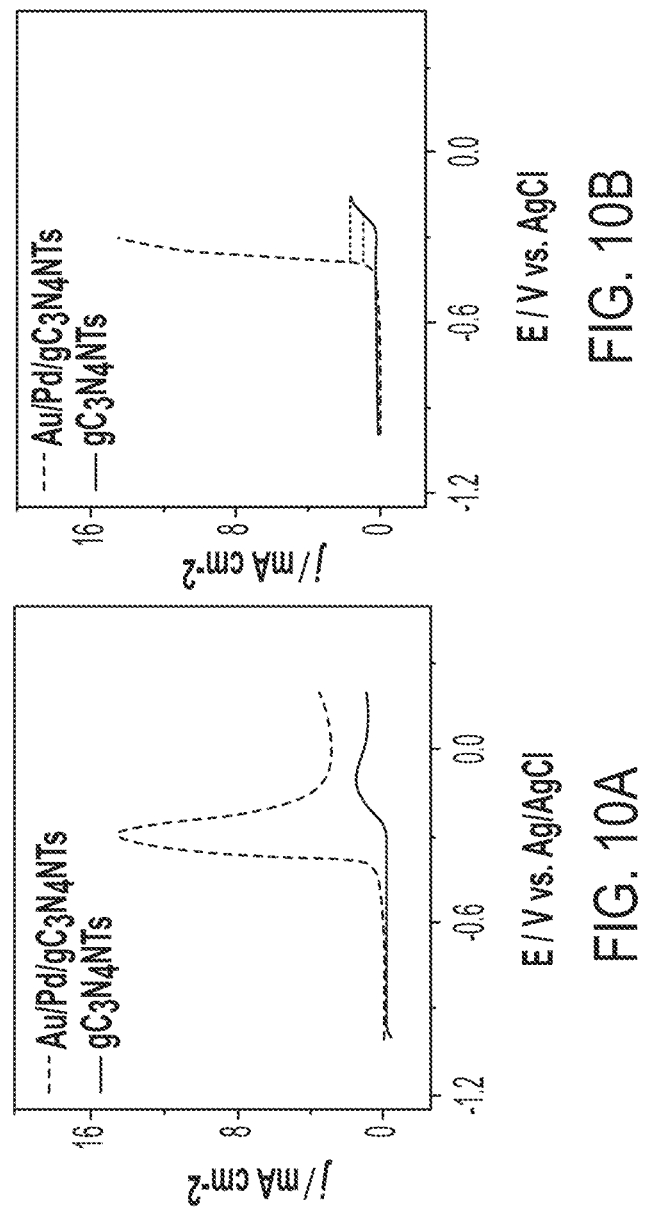

To elucidate the enhanced CO oxidation activity of the Au/Pd/gC$_3$N$_4$NTs, its ability to adsorb CO was measured. This includes benchmarking CO-stripping CVs in CO saturated in an aqueous solution of 0.1 M KOH at a scan rate of 50 mV s$^{-1}$ (FIG. 10A). The results displayed the superior CO-adsorption ability of the Au/Pd/gC$_3$N$_4$ NTs as compared to that of the metal-free gC$_3$N$_4$NTs. Additionally, the onset potential and oxidation potential of CO on Au/Pd/gC$_3$N$_4$NTs manifested a substantial negative shift relative to the gC$_3$N$_4$NTs. Meanwhile, the CO oxidation kinetics for the Au/Pd/gC$_3$N$_4$NTs was significantly faster than that for the gC$_3$N$_4$NTs under any applied potential, as indicated by the dashed lines in FIG. 10B.

These results unambiguously showed the superior CO oxidation activity and durability of the Au/Pd/gC$_3$N$_4$NTs, which was attributed to a unique combination of the intrinsic physicochemical properties of the gC$_3$N$_4$NTs and the impressive inherent catalytic merits of doping with Au and Pd. Indeed, the electronic effect of Au/Pd led to an enhancement of both the CO and O$_2$ adsorption along with the activation of O$_2$ that consequently led to an acceleration of the CO oxidation kinetics. Meanwhile, gC$_3$N$_4$NTs with its great electron density and oxidation activity. The porous nanotube architecture provides a highly accessible surface area and various active sites for the adsorption of the reactant molecules along with accelerating their transfer and molecular mobility.

Conclusion: In brief, this example sets forth a scaled-up approach to tailoring the fabrication of the Au/Pd/gC$_3$N$_4$NTs via the polymerization of melamine in an ethylene glycol solution that contains Pd and Au precursors with the addition of nitric acid followed by subsequent carbonization at high temperatures. In contrast to previous synthesis approaches to gC$_3$N$_4$, the present inventors' method is simple and allows for the high mass production of the gC$_3$N$_4$ porous nanotubes codoped with Au and Pd having a high surface area. These unique merits endow the Au/Pd/gC$_3$N$_4$NTs with respect to the CO oxidation activity with a significantly low T$_{100}$ of 165° C.

Example 2: Au/Pd/gC$_3$N$_4$NFs (gC$_3$N$_4$ Nanofibers Doped with Au and Pd)

Chemicals and Materials: HAuCl$_4$ (99.99%), K$_2$PdCl$_4$ (99.99%), melamine (99%), isopropanol (99.7%), and nitric acid (HNO$_3$ (70%)) were obtained from Sigma-Aldrich Chemie GmbH (Munich, Germany).

Synthesis of Au/Pd/gC$_3$N$_4$NFs: One-dimensional (1-D) Au/Pd/gC$_3$N$_4$NFs nanostructures were prepared by a sluggish mixing of 1 gram of melamine in 30 mL of isopropanol solution containing 1.5 mL of HAuCl$_4$ (20 mM) and 1.5 mL of K$_2$PdCl$_4$ (20 mM), followed by slow addition of 60 mL of HNO$_3$ (0.3 M) under stirring at 40° C. The obtained yellowish precipitate was washed with isopropanol and dried at 100° C. for 12 hours. The as-dried powder was then annealed at 480° C. for 2 hours at a heating rate of 5° C./min under N$_2$ in a chemical vapor deposition (CVD) furnace. The reference samples including Au/gC$_3$N$_4$, Pd/gC$_3$N$_4$, and gC$_3$N$_4$ were prepared by the same procedure, but with using reaction conditions with HAuCl$_4$, Na$_2$PdCl$_4$, and without metal precursors, respectively.

Materials Characterization: The morphology and composition of the as-obtained materials were determined using the methods and instructions set forth in the general description above. The N$_2$-physisorption isotherms were measured on a Quantachrome Autosorb 3.01 instrument (Quanta chrome instrument corporation, Boynton Beach, FL, USA) at 77 K. Before the measurements, the samples were initially degassed for 24 hours at 323 K under vacuum.

CO Oxidation Reaction: A 50 mg of each catalyst was pretreated at 250° C. (5° C./min) under an O$_2$ flow of 50 mL min$^{-1}$ for 1 hour in a fixed bed quartz tubular reactor, followed by a flow of 5% H$_2$ in 95% He for 20 minutes. Then, the catalysts were exposed to the gas mixture consists of CO (4%), O$_2$ (20%), and Ar (76%) with a total flow of 50 mL min$^{-1}$. The CO conversion efficiency to CO$_2$ was estimated using an online gas analyzer (IR200, Yokogawa, Japan). The CO oxidation reaction was carried out at a temperature ranged from room temperature to 400° C. with a constant heating rate of 5° C./min using a programmed oven. The percentage of CO conversion (CO %) was calculated using the following equation:

$$CO\% = [(CO_{in} - CO_{out})]/CO_{in} \times 100$$

where CO$_{in}$ is the input quantity and CO$_{out}$ is the output quantity.

Figure 11:
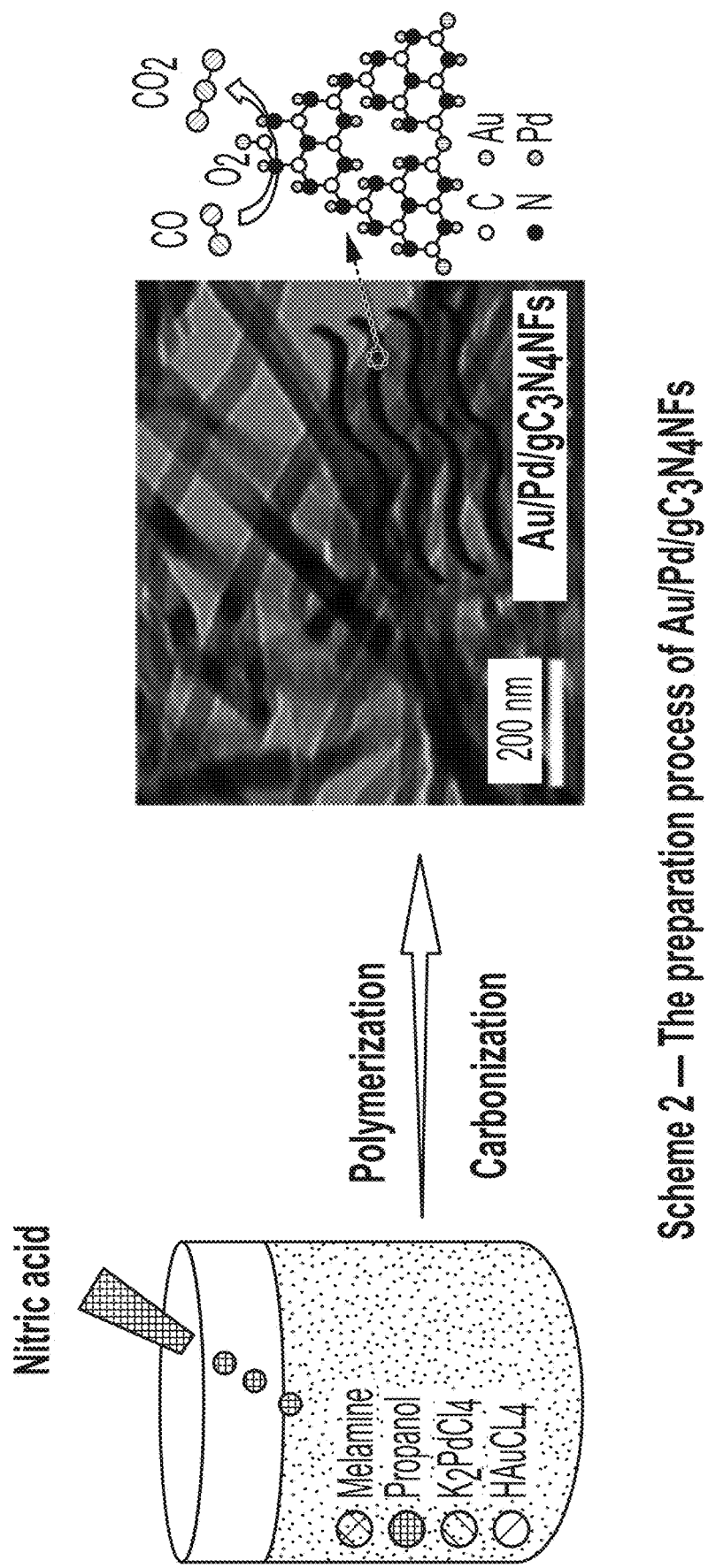

Results and Discussion: Au/Pd/gC$_3$N$_4$NFs were prepared via polymerization of melamine in isopropanol solution contains Pd-precursor and Au-precursor by nitric acid followed by carbonization at 450° C. (Scheme 2, as shown in FIG. 11).

Figure 12A:
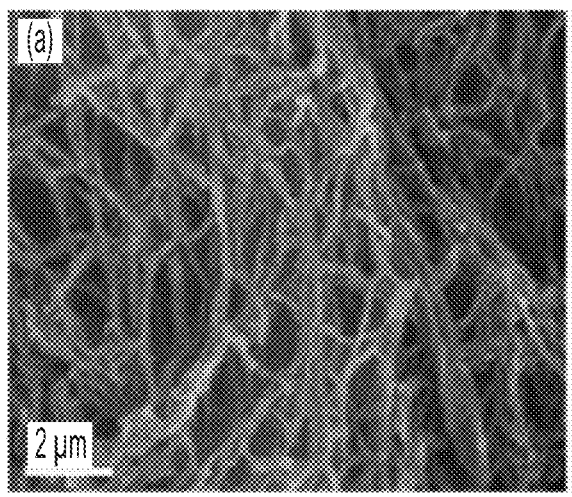
FIGS. 12A-12B show SEM (FIG. 12A) and TEM (FIG. 12B) images of Au/Pd/gC$_3$N$_4$NFs.
Figure 12B:
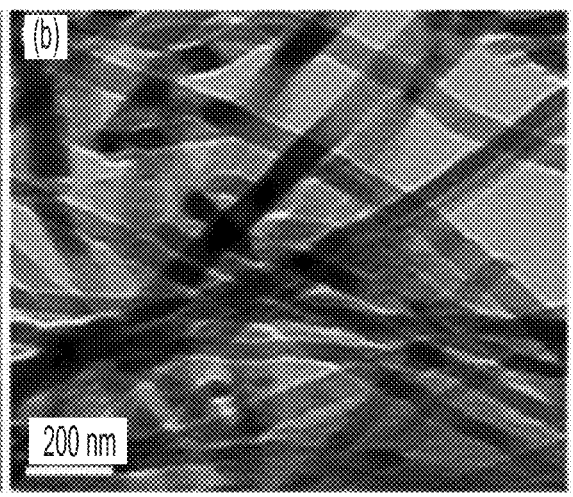

The SEM image of the Au/Pd/gC$_3$N$_4$NFs is shown in FIG. 12a. The obtained materials were formed in a high yield of uniform fiber-like nanostructure FIG. 12A). The TEM image also showed the formation of one-dimensional nanofiber morphology without any undesired byproducts (FIG. 12B). The average dimensions of the obtained nanofiber were about 10±1 μm in length and 80±2 nm in width.

The high-magnification TEM of an individual nanofiber revealed its one-dimensional structure with a smooth surface (FIG. 13A). The high-resolution TEM (HRTEM) image of a selected area from the fiber wall revealed its graphitic layer structure (FIG. 13B). Meanwhile, the HRTEM of the core area depicted the random orientations of the lattice fringes with a polycrystalline and amorphous phase (FIG. 13C). Interestingly, the resolved graphite fringes in the core area contain various curvatures, which plausibly originated from their atomic doping with Au and Pd. Meanwhile, the estimated interplanar spacing in the fiber wall was nearly 0.336 nm, attributed to the {002} facet of graphitic-like carbon. Both SEM and TEM images indicated the uniformity of the as-formed Au/Pd/gC$_3$N$_4$NFs.

The HAADF-STEM of Au/Pd/gC$_3$N$_4$NFs also confirmed its one-dimensional nanofiber structure (FIG. 14A). The element mapping analysis of an individual nanofiber raveled only the consistent presence of C, N, Au, and Pd (FIGS. 14B-14E), indicated the uniformity of the as-formed Au/Pd/gC$_3$N$_4$NFs. The atomic ratio of C/N and Au/Pd are about 0.67 and 1.2, respectively. The EDX revealed the presence of C, N, Au, and Pd in the as-obtained Au/Pd/gC$_3$N$_4$NFs with atomic ratios of 40/59/0.55/0.45 (FIG. 14F).

As a reference, metal-free gC$_3$N$_1$NFs nanofibers were prepared by dissolving melamine in isopropanol followed by activation with nitric acid and annealing at 480° C. The as-formed gC$_3$N$_4$NFs have a one-dimensional nanofiber morphology with an average length of 10 um and a width of 79±1 nm. The determined width of metal-free gC$_3$N$_4$NFs was slightly smaller than that of Au/Pd/gC$_3$N$_4$NFs, attributed to the presence of Au and Pd inside the skeleton structure of gC$_3$N$_4$NFs, which causes a slight lattice expansion.

Figure 15A:
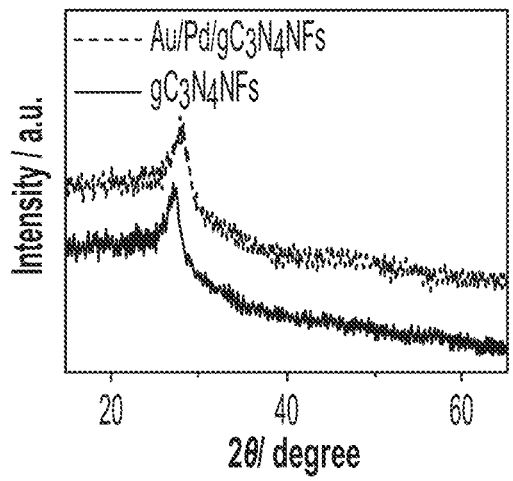
FIGS. 15A-15F show wide-angle XRD patterns (FIG. 15A) and XPS survey (FIG. 15B) of Au/Pd/gC$_3$N$_4$NFs and gC$_3$N$_4$NFs, as well as high-resolution XPS spectra of C (FIG. 15C), N (FIG. 15D), Au (FIG. 15E), and Pd (FIG. 15F).

FIG. 15A displays the XRD diffraction patterns of Au/Pd/gC$_3$N$_4$NFs and gC$_3$N$_4$NFs, which both revealed only one main diffraction peak attributed to {002} facet of the graphitic-like carbon structure. Interestingly, the diffraction peak of Au/Pd/gC$_3$N$_4$NFs was slightly shifted towards a higher 2θ value relative to gC$_3$N$_4$NFs, due to the Au and Pd dopants. The absence of any diffraction peaks for Au and Pd are attributed to their atomic doping along with their low concentration.

Figure 15B:
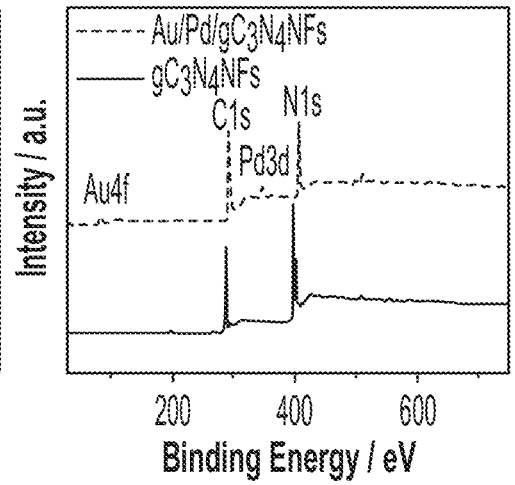
Figure 15C:
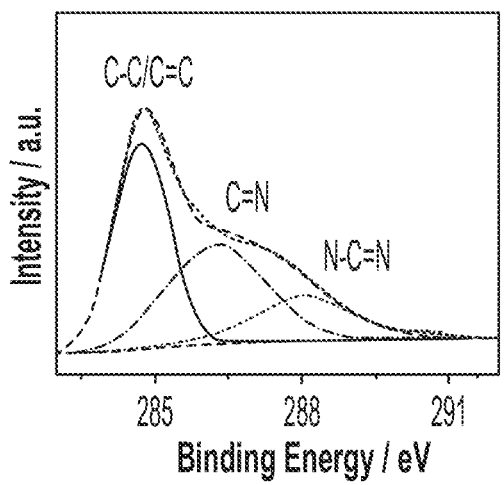
Figure 15D:
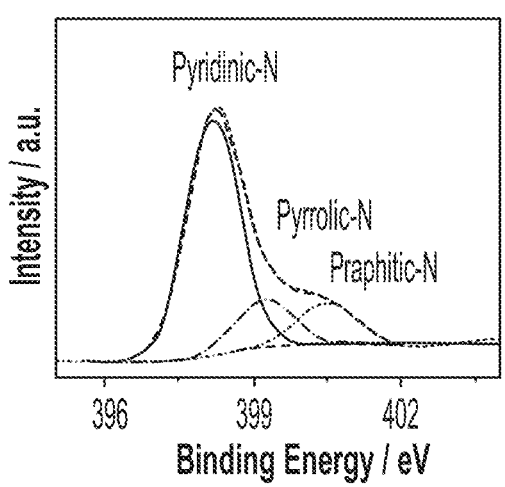
Figure 15E:
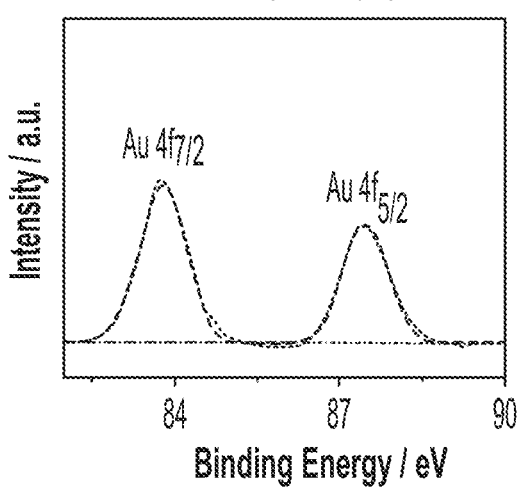
Figure 15F:
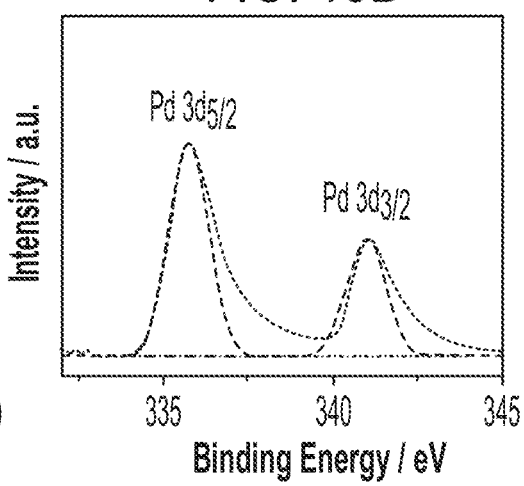

The XPS survey of Au/Pd/gC$_3$N$_4$NFs displayed the presence of C 1 s, N 1 s, Au 4f, and Pd 3d peaks; meanwhile, gC$_3$N$_4$NFs only showed C 1 s and N 1 s peaks (FIG. 15B). The C 1 s and N is peaks of Au/Pd/gC$_3$N$_4$NFs were slightly negatively shifted relative to their counterparts in gC$_3$N$_4$NFs, ascribed to the Au and Pd dopants. The deconvolution of the C is peak showed three peaks attributed to sp$^2$ graphitic carbon (C—C/C=C) at 284.6 eV, sp$^2$ carbon bonded nitrogen (C—N) at 286.3 eV, and sp$^2$-carbon bonded nitrogen of the aromatic rings such as the s-triazine (N—C=N) at 288.1 eV, (FIG. 15C). The N is spectra were fitted into three peaks corresponded to pyridinic-N at 398.6 eV, pyrrolic-N at 401.1 eV, and graphitic-N at 401.7 eV (FIG. 15D), which are the main features for carbon nitrides materials. Au 4f revealed two peaks at 84.1 eV for Au 4f$_{7/2}$ and 88.1 eV for Au 4f$_{5/2}$ (FIG. 15E). Meanwhile, Pd 4f showed two peaks assigned to Pd 3d$_{5/2}$ at 335.0 V and Pd 3d$_{3/2}$ at 340.5 eV with the absence of any metal oxide phases (FIG. 15F). This indicates that Au and Pd dopants are in the metallic state phase. The surface atomic ratios of C/N/Au/Pd were estimated to be 41/58/0.5/0.5, respectively, implying that the atomic ratio of Au/Pd is 1/1 as in their precursors. In some aspects, the presence of Au and Pd dopants with the same atomic ratio (1/1) in the final product is the optimum Au/Pd ratio to balance strong catalytic activity and durability during the CO oxidation reaction. This is because Pd possesses a great affinity for CO adsorption and a high tolerance for the adsorption of CO$_2$ product, while Au provides a great adsorption/dissociation capability for O$_2$. Thus, the ratio of Au/Pd should be the same to make them contribute equally during the CO oxidation reaction.

The FTIR analysis also confirmed the successful production of gC$_3$N$_4$NFs. The Raman analysis further proved the fabrication of gC$_3$N$_4$NFs doped with binary metals.

Figure 16A:
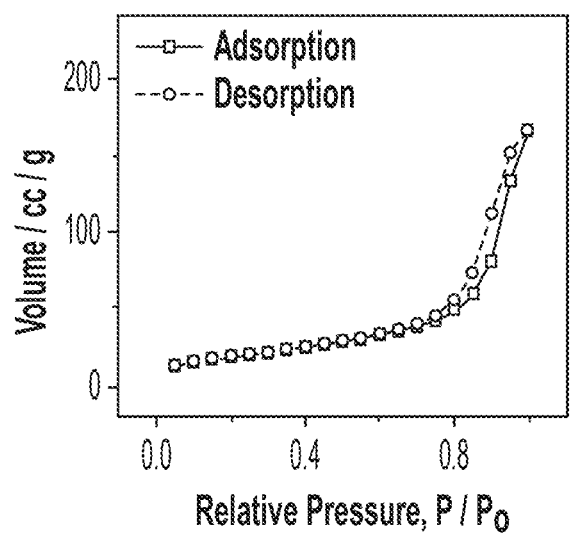
FIGS. 16A-16B show N$_2$-physisorption isotherms of Au/Pd/gC$_3$N$_4$NFs (FIG. 16A) and gC$_3$N$_4$NFs (FIG. 16B).
Figure 16B:
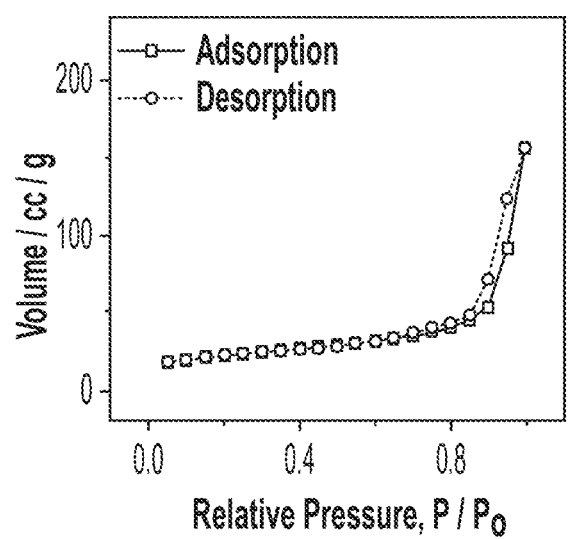

The surface areas of prepared materials were determined using a Brunauer-Emmett-Teller (BET). Both Au/Pd/gC$_3$N$_4$NFs and gC$_3$N$_4$NFs show the isotherm feature close to the type II curve with a H$_3$ hysteresis loop, indicating the presence of mesopores as well as macropores. These pores originated from the assembly of the nanofiber in the form of network-like structures as indicated by the SEM images. The hysteresis loop isotherm of Au/Pd/gC$_3$N$_4$NFs is slightly higher than that of gC$_3$N$_4$NFs, implying its higher surface area. Thus, the estimated BET surface area of Au/Pd/gC$_3$N$_4$NFs (85 m$^2$ g$^{-1}$) (FIG. 16A) is higher than that of gC$_3$N$_4$NFs (72 m$^2$ g$^{-1}$) (FIG. 16B). The observed high surface areas for both Au/Pd/gC$_3$N$_4$NFs and gC$_3$N$_4$NF are due to their uniform one-dimensional fiber-like nanostructure. The greater surface area of Au/Pd/gC$_3$N$_4$NFs makes its surfaces more accessible to the reactant molecules along with providing various accessible active sites during the catalytic reactions.

Figure 17A:
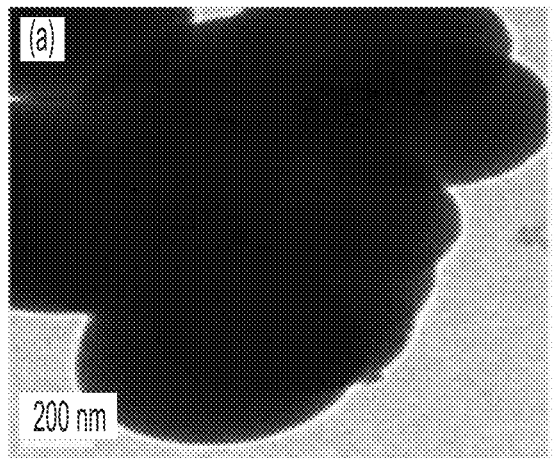
FIGS. 17A-17C show TEM images of Au/Pd/gC$_3$N$_4$ nanostructures prepared by fast addition of melamine (FIG. 17A), 60 ml of HNO$_3$ (0.05 M) (FIG. 17B), and quick addition of nitric acid (FIG. 17C).
Figure 17B:
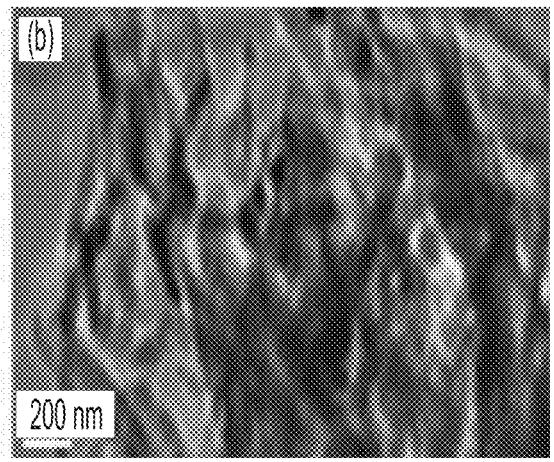
Figure 17C:
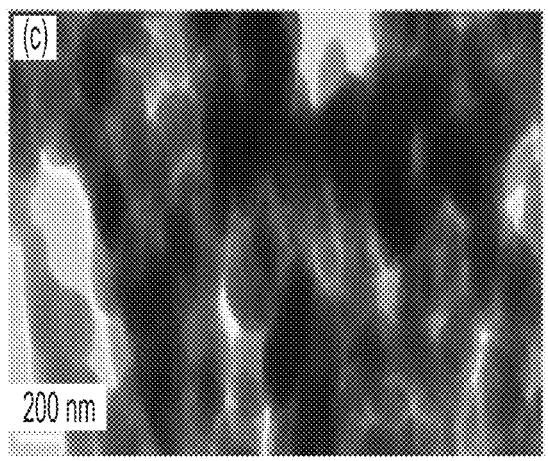

Several control experiments were carried out to optimize the preparation process of Au/Pd/gC$_3$N$_4$NFs. Initially, the quick addition of melamine to isopropanol solution contains metal precursors formed aggregated nanostructures (FIG. 17A). Agglomerated nanofibers were formed by decreasing the concentration of nitric acid to 0.05 M (FIG. 17B). Meanwhile, the fast addition of nitric acid produced irregular nanosheets (FIG. 17C).

Compared with previous reports, the inventive Au/Pd/gC$_3$N$_4$NFs combines the unique physicochemical properties of gC$_3$N$_4$NFs (e.g., great surface area, stability, and electrical conductivity) and outstanding catalytic merits of both Au and Pd dopants.

Figure 18A:
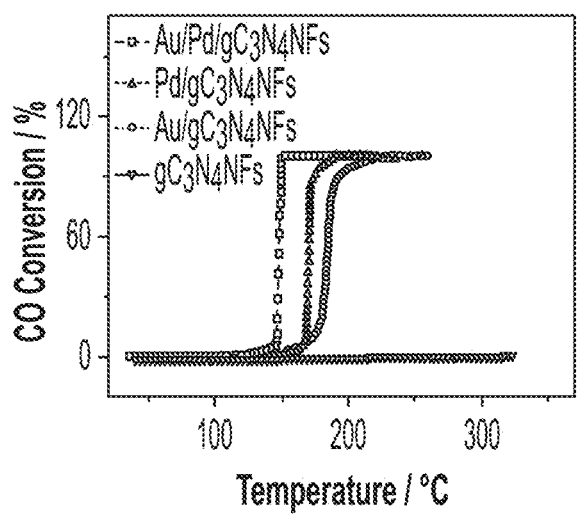
FIGS. 18A-18D show the CO conversion efficiency on some exemplary catalysts as a function of temperature (FIG. 18A), the CO conversion efficiency on different catalysts at a temperature ranging between 25 and 200° C.
Figure 18B:
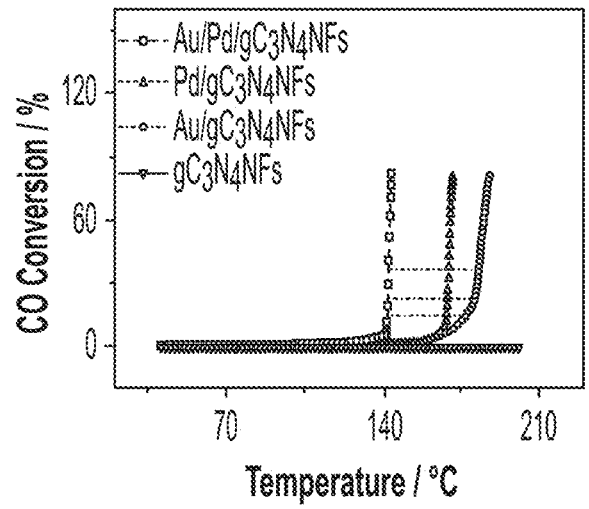
Figure 18C:
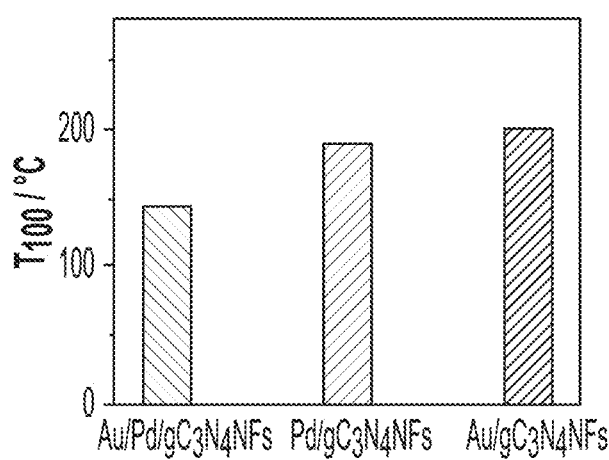

The CO oxidation reaction catalytic performance of Au/Pd/gC$_3$N$_4$NFs was investigated relative to Au/gC$_3$N$_4$NFs, Pd/gC$_3$N$_4$NFs, and metal-free gC$_3$N$_4$NFs under atmospheric conditions. The mesh sizes of Au/Pd/gC$_3$N$_4$NFs, Au/Pd/gC$_3$N$_4$NFs, Au/Pd/gC$_3$N$_4$NFs, and gC$_3$N$_4$NFs were about 0.13, 0.12, 0.15, and 0.17 mm, respectively. FIG. 18A shows the CO conversion efficiencies of the as-synthesized materials under various temperatures ranging from 25 to 400° C. In particular, metal-free gC$_3$N$_4$NFs displayed only 5% CO conversion even after heating to 400° C. (FIG. 18A). Meanwhile, the CO conversion efficiency of Au/Pd/gG$_3$N$_4$NFs, Au/gC$_3$N$_4$NFs, and Pd/gC$_3$N$_4$NFs increased steadily with increased reaction temperature (FIG. 18A), indicating the significant effect of Au and Pd on enhancing the CO oxidation efficiency of gC$_3$N$_4$NFs. Notably, the % CO conversion on Au/Pd/gC$_3$N$_4$NFs was significantly superior to Au/gC$_3$N$_4$NFs and Pd/gC$_3$N$_4$NFs. Additionally, the CO oxidation kinetics on Au/Pd/gC$_3$N$_4$NFs is quicker than that on Pd/gC$_3$N$_4$NFs and Au/gC$_3$N$_4$NFs at any reaction temperature as indicated by the dashed lines in FIG. 18B. The complete CO conversion temperature (T$_{100}$) of Au/Pd/gC$_3$N$_4$NFs (144° C.) is lower than that of Pd/gC$_3$N$_4$NFs (191° C.) and Au/gC$_3$N$_4$NFs (205° C.) (FIGS. 18A and 18C). This result indicates that using Au/Pd with the ratio of (1/1) led to decreasing the T$_{100}$ by 47° C. and 61° C. than that of the (0/1) and (1/0) ratios, respectively. The synergetic effect between Au and Pd tunes the adsorption of CO reactant and desorption of reaction product, which results in balancing between strong activity and durability.

The CO oxidation activity of our newly synthesized Au/Pd/gC$_3$N$_4$NFs is superior to various previously reported Au-based and Pd-based catalysts, such as AuPd/TiO$_2$ and AuPd/SiO$_2$ (Table 1, comparison of the catalytic activity of the inventive catalyst with previously reported catalysts):

TABLE 1

Comparison of Catalytic Activity

| Catalyst | Activity, T$_{100}$ | Reference |
|---|---|---|
| Au/Pd/gC$_3$N$_4$NFs | 144° C. | Invention |
| Pd-impeded nanohole structured 3D porous graphene | 190° C. | Ref |
| Au/Pd/TiO$_2$ | 190° C. | Ref |
| Co/CN/SBA-15 | 175° C. | Ref |
| Au/Pd/SiO$_2$ | 182° C. | Ref |

TABLE 1-continued

Comparison of Catalytic Activity

| Catalyst | Activity, $T_{100}$ | Reference |
|---|---|---|
| Pt/CNx/SBA-15 | 250° C. | Ref |
| $Cu_2O/C_3N_4$ | 200° C. | Ref |
| $Au/C_3N_4$/SBA-15 | 270° C. | Ref |
| $AuPd@Al_2O_3$ | 200° C. | Ref |

Figure 18D:
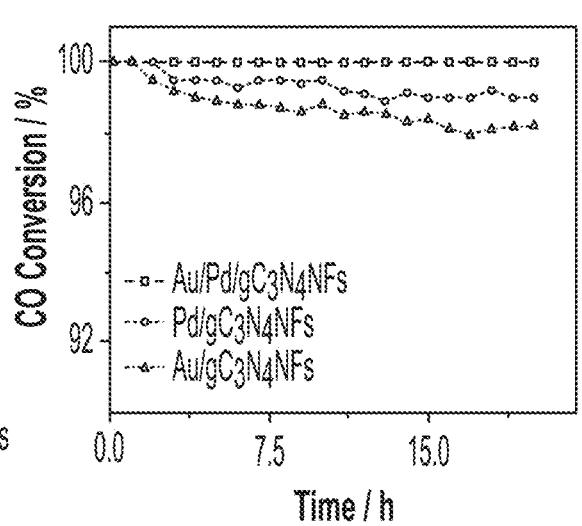
Figure 19A:
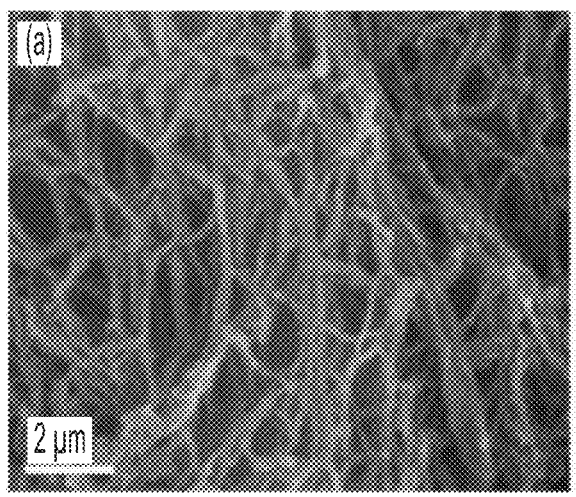
Figure 19B:
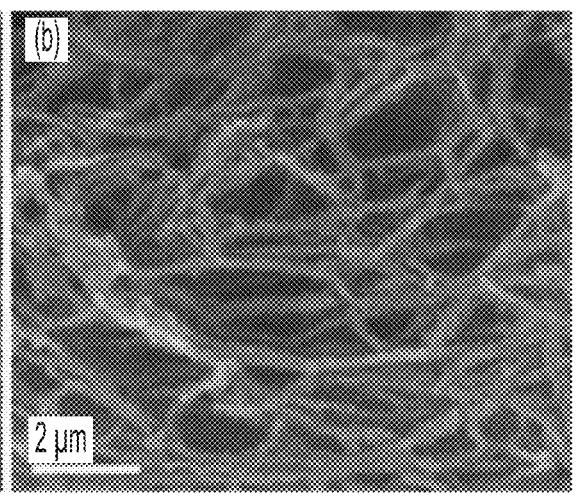

The CO oxidation stability tests of Au/Pd/$gC_3N_4$NFs, Pd/$gC_3N_4$NFs, and Au/$gC_3N_4$NFs were investigated for 48 hours at their $T_{100}$. Notably, Au/Pd/$gC_3N_4$NFs reserved their initial CO conversion efficiency without any significant loss after 48 hours. Meanwhile, Pd/$gC_3N_4$NFs and Au/$gC_3N_4$NFs lost around 10% and 1% of their initial activity, respectively (FIG. 18D). Their CO oxidation performance was measured after the durability test to further confirm the stability of the designed catalysts. The results reflected that Au/Pd/$gC_3N_4$NFs, Pd/$gC_3N_4$NFs, and Au/$gC_3N_4$NFs kept around 97.1, 91, and 87% of their initial CO oxidation activity. These results indicate the superior stability of Au/Pd/$gC_3N_4$NFs to Pd/$gC_3N_4$NFs and Au/$gC_3N_4$NFs originating from its stable active catalytic sites. The lower durability of Au/$gG_3N_4$NFs compared to Au/Pd/$gC_3N_4$NFs and Pd/$gC_3N_4$NFs is plausibly attributable to its poisoning by CO and $CO_2$ product during CO oxidation reaction, which blocks its active catalytic sites with time. This could not be occurred in case of Au/Pd/$gC_3N_4$NFs, ascribed to the combination between Au and Pd into the $gC_3N_4$NFs, which enriching the adsorption/activation of $O_2$ and CO along with weakening the adsorption of the $CO_2$ product. The SEM and EDX characterizations were carried out after the durability tests to confirm the structural and compositional stability of Au/Pd/$gC_3N_4$NFs. The results showed that Au/Pd/$gC_3N_4$NFs completely reserved their fiber-like shape without any agglomeration and degradation, indicating its morphological stability (FIGS. 19A and 19B). The EDX analysis of Au/Pd/$gCN_4$NFs showed its compositional stability without any significant changes after the accelerated durability cycles.

The CO oxidation mechanism on Au/Pd/$gC_3N_4$NFs can follow the Langmuir-Hinshelwood reaction. The quick adsorption of CO along with simultaneous activation of $O_2$ molecules accelerating and facilitating the CO oxidation at a lower reaction temperature.

These results demonstrated the significant CO oxidation activity and stability of Au/Pd/$gC_3N_4$NFs than that of Pd/$gC_3N_4$NFs, Au/$gC_3N_4$NFs, and $gC_3N_4$NFs. That originated from one-dimensional nanofiber morphology with a high surface area that provides various accessible active sites for CO-adsorption and $O_2$-activation. Meanwhile, the combination between Au and Pd and $gC_3N_4$NFs tuned the adsorption of the reactants along with retarding the adsorption of $CO_2$ product. The interaction among Au/Pd and N-atoms of $gC_3N_4$NFs balance strong CO activity and durability.

Example 3: Pt/Pd/CNs Nanorods

Chemicals and Materials: Potassium tetrachloroplatinate (II) ($K_2PtCl_4$, 99.99%), potassium tetrachloropallidate(II) ($K_2PdCl_4$, 99.99%), melamine (99%), ethylene glycol ($C_2H_6O_2$, 99.8%), sodium nitrate ($NaNO_3$, 99.99%), hydrochloric acid (HCl, 37%), and nitric acid ($HNO_3$, 70%) were obtained from Sigma-Aldrich Chemie GmbH (Munich, Germany). All the chemicals were of analytical grade and used as received.

Synthesis of Pt/Pd/CNs Nanorods: In a representative synthesis, 1 gram melamine was dispersed in an aqueous ethylene glycol solution (15 mL) and added to 15 mL ethylene glycol solution containing 0.5 ml $K_2PdCl_4$ (20 mM) and 0.5 mL $K_2PtCl_4$ (20 mM), which was followed by the addition of an aqueous solution of HCl (0.1 M) and $NaNO_3$ (0.1 M) under ultrasonic treatment at 30° C. for 1 hour. The resulting yellowish precipitate was washed with ethanol and dried at 100° C. for 8 hours before being annealed at 550° C. (10° $min^{-1}$) for 2 hours under nitrogen ($N_2$) and then cooled to room temperature to obtain the final product.

Materials Characterization: The morphology and composition of the as-obtained materials were determined using methods and instructions set forth in the general description above. In addition, the inductively coupled plasma optical emission spectrometry (ICP-OES) analysis was carried out on a Thermo Scientific iCAP6300 (Thermo Fisher Scientific, USA).

CO Oxidation Reaction: The electrochemical measurements were performed on a Gamry electrochemical analyzer (reference 3000, Gamry Co., USA), using a three-electrode cell involving a Pt wire, Ag/AgCl, and glassy carbon (GC, 5 mm) as a counter, reference, and working electrode, respectively. The GC electrodes were covered with 10 μg $cm^{-1}$ of each catalyst, followed by the addition of 5 μL Nafion (0.05%) and left to completely dry in an oven at 80° C. before the measurements. The gas mixture was composed of 4% CO, 20% $O_2$, and 76% argon. The electrochemical active surface area (ECSA) of the as-formed materials was calculated using the following equation:

$$ECSA = Q/(m \times 420)$$

wherein Q represents the charge in $H_{upd}$ adsorption/desorption area obtained after the double-layer correction of the cyclic voltamogram (CV) curves between −1 and −0.7 V, m is the catalyst loading on the electrode surfaces, and 420 μC $cm^{-1}$ represents the charge required for monolayer adsorption of hydrogen on Pt/Pd surface. For the photoelectrochemical CO oxidation activity, a fluorine-doped tin oxide sheet (0.5 cm) was used as the working electrode and was covered with 10 $cm^{-1}$ of Pt/Pd/CNs to which subsequently 5 μL Nafion (0.05%) was added. An ozone-free xenon lamp (100 mW $cm^{-2}$, Abet Technologies, USA) was used as the light source.

Figure 20:
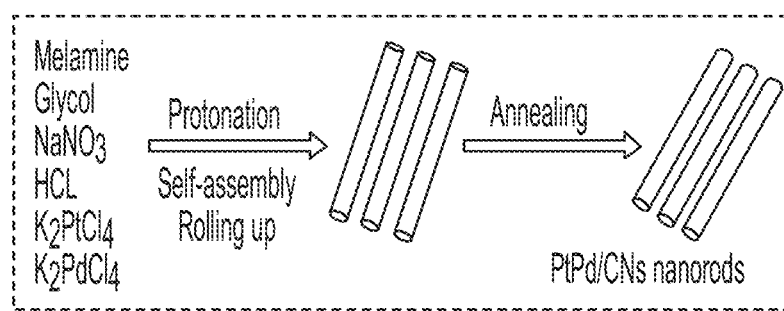

Results and Discussion: Pt/Pd/CNs nanorods were prepared via the cumbersome self-assembly of protonated melamine in an ethylene glycol solution containing Pt and Pd precursors, which subsequently sintered into CN nanorods through the rolling-up mechanism (Scheme 3, as shown in FIG. 20). In particular, melamine was initially dispersed slowly in an aqueous solution of ethylene glycol (solubility: nearly 22.67 g $L^{-1}$ at 20° C.) and then added sluggishly to an ethylene glycol solution containing Pt/Pd precursors. The slow dropwise addition of $NaNO_3$ and HCl solutions together promptly protonates the $NH_2$ bases of melamine. The existence of both $H^+$ and $NO_3^-$ changes the polarity of the ethylene glycol solution to facilitate the protonation of melamine as can be seen in the prompt formation of a yellowish precipitate. The protonation process stimulates the polymerization process of melamine to a polymeric network-like structure that simultaneously rolls up to form a rod-like carbon morphology upon pyrolysis at 550° C. Intriguingly, the structure evolution of Pt/Pd/CNs nanorods could be easily monitored through the naked eye, as reflected in the color change of the reaction solution from white to a yellowish color after the protonation of melamine, then to a brownish color after the polymerization process, and finally to deep brown after annealing.

Figure 22A:
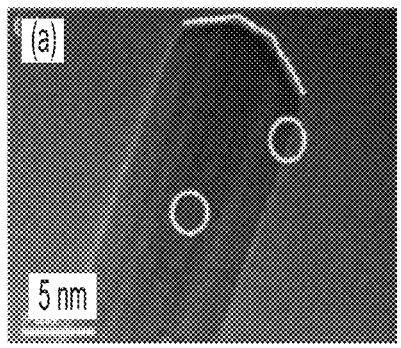
FIGS. 22A-22C show a high magnification TEM image of Pt/Pd/CNs (FIG. 22A) and HRTEM images of the marked area in the shell (FIG. 22B) and in the core (FIG. 22C); the insets in FIGS. 22B-22C show the FFT image.
Figure 22B:
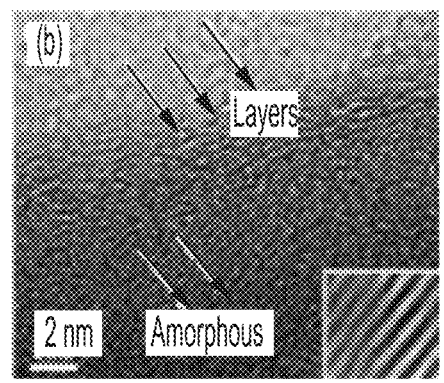
Figure 22C:
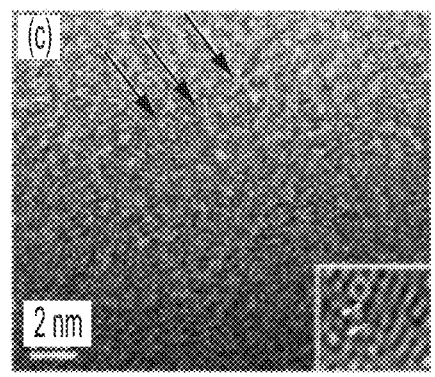

The SEM image shows the high-yield (nearly 100%) formation of the elegant ID nanorod morphology (FIG. 21A). The as-synthesized nanorods are uniformly distributed with an average longitude of 94±2 nm and an average width of 11±1 nm, which results in an aspect ratio of 8.5 (FIG. 21B). The TEM image displays the produced nanorod structures with rough surfaces (FIG. 21C). Intriguingly enough, the nanorods have twined ends as indicated by the arrows in FIG. 21C. The absence of any undesired nanostructures, such as sheets and/or spherical nanostructures, indicates the purity of thus obtained materials. The selected area electron diffraction pattern (SAED) reveals diffraction rings corresponding to the {002} and {100} facets of the graphitic CN nanostructure inferring the polycrystalline structure of the CN nanorods (FIG. 21D). The high-magnification TEM image of an individual nanorod clearly shows its 1D flat nanorod shape with a rough surface and a twined end (FIG. 22A). The HRTEM image of a randomly selected area from the shell area indicates that the shell is slightly twisted and composed of multiple graphitic layer structures with sub-amorphous layers, as indicated by the arrows in FIG. 22B. Meanwhile, the lattice fringes are continuous across the rod-shell, albeit the presence of some defects and lattice distortion as well, which might be ascribed to the codoping effect with Pt and Pd. The measured interplanar lattice spacing was nearly 0.336 nm, assigned to the {002} crystal plane of the graphitic CN structure. The Fourier filtered HRTEM (FFT) image of the marked area from the shell reveals its multiple layered structures, shown as the inset in FIG. 22B. The HRTEM image of a selected area from the core depicts the amorphous-crystalline structure of the graphitic CNs, although the presence of a distorted hexagonal carbon structure (FIG. 22C) is also observed. This was additionally proven by the FFT image, which displays the presence of hexagonal ring-like carbon of triazine along with various distorted rings (FIG. 22C). The HRTEM image also reflects the absence of any lattice fringes for Pt and Pd metals or their oxide phases. This indicates the atomic doping with Pt/Pd in the lattice structure of CNs, which accords with the previous reports on metal-doped supports such as Pd-doped $gC_3N_4$ nanosheets, Au/Pd-doped $gC_3N_4$, and Pt-doped $TiO_2$. The EDX analysis was carried out to investigate the composition of the materials thus obtained, which displayed the existence of C, N, Pt, and Pd with average contents of 38, 60.5, 0.8, and 0.7%, respectively, implying the formation of the $C_{38}N_{60.5}Pt_{0.8}Pd_{0.7}$ nanostructure. The ratio of Pt/Pd determined by ICP-OES was nearly 1.14/1, which was in line with the EDX analysis. Notably, the absence of any undesired byproducts such as metal oxides in the as-synthesized nanorods indicates their uniformity.

Figure 23A:
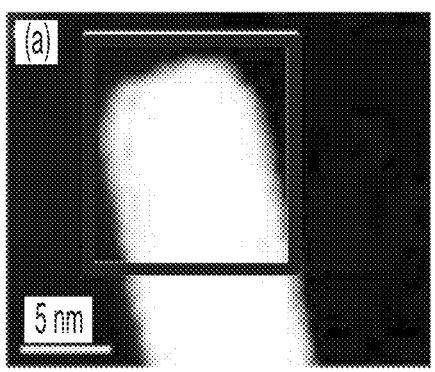
FIGS. 23A-23E show a HAADF-STEM image of Pt/Pd/CNs nanorods (FIG. 23A) and its elemental mapping for C (FIG. 23B), N (FIG. 23C), Pt (FIG. 23D), and Pd (FIG. 23E).
Figures 23B, 23C:
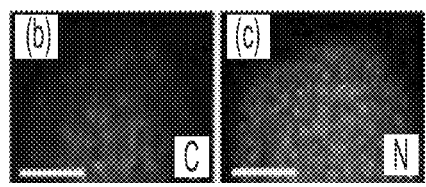
Figures 23D, 23E:
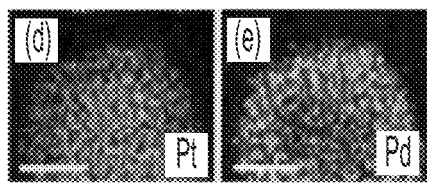

The fruitful formation of 1-D CN nanorods was further evidenced in the HAADF-STEM image, which depicts that the nanorod has a rough surface with a twined end, in line with the SEM and TEM images (FIG. 23A). The element mapping analysis shows the coherent distribution of C, N, Pt, and Pd in the as-formed nanorods (FIGS. 23B-23E). The homogenous distribution of Pt and Pd implies their successful atomic doping inside the CN structure. The determined ratios of C/N/Pt/Pd were about 39/59.2/0.7/0.8, respectively, in line with that obtained by the EDX and ICP-OES analysis, which infers the uniformity of the nanorods thus formed.

Hence, the detection of Pt and Pd in the EDX, element mapping, and ICP-OES analysis implies their atomic doping in CN nanorods rather than segregation and/or agglomeration.

As a reference, metal-free CN nanorods were fabricated by the same method of Pt/Pd/CNs by fixing all other reaction conditions and parameters but without using Pt and Pd precursors. The SEM and TEM images showed the formation of the nanorod morphology with an average longitude of 94±3 nm and an average width of 10±1 nm. This indicates the slight increase in the width of Pt/Pd/CNs nanorods relative to CNs that was attributed to the Pt and Pd dopants, which expand the lattice structure of CNs and coincides with the previous reports on metal-doped CNs. The measured ratio of C/N in metal-free CN nanorods was about 38/62, correspondingly.

Figure 24A:
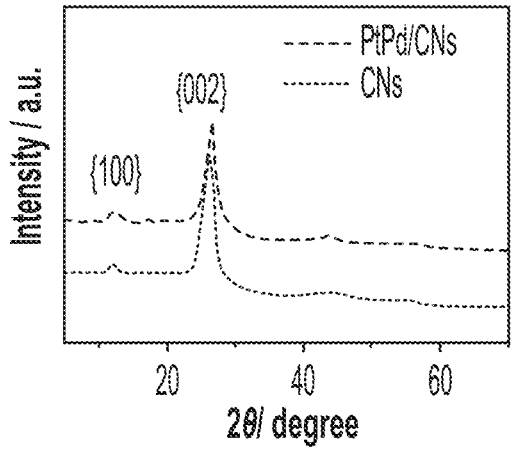
FIGS. 24A-24F show an XRD spectra (FIG. 24A) and XPS survey (FIG. 24B) of Pt/Pd/CNs nanorods and gCN nanorods, as well as high-resolution XPS spectra of C 1 s (FIG. 24C), N is (FIG. 24D), Pt 4f (FIG. 24E), and Pd 3d (FIG. 24F).

FIG. 24A shows the XRD spectra of the Pt/Pd/CNs nanorods compared to that of metal-free CN nanorods, both of which revealed a weak diffraction peak observed at 13.1° indexed as the (100) facet attributed to the in-plane structural packing motif of s-triazine-based graphitic CNs. Meanwhile, both materials exhibited a strong diffraction peak centered at 20 of 27.4° corresponding to the amorphous (002) facet that was assigned to the interplanar stacking peak of the conjugated aromatic segment of the graphitic CN structure (FIG. 24A). The observed XRD diffraction spectra of Pt/Pd/CNs nanorods were slightly shifted towards a higher angle value with a slight decrease in the overall intensity compared to their metal-free CN counterparts. This was plausibly ascribed to the co-doping effect with both Pt and Pd, which enlarged the crystalline domain size of CNs as could be seen in the broadening of the (002) peak compared to that of CNs. Also, owing to the lower content of Pt/Pd (1.5 wt %) and their atomic doping inside the CN lattice structure, no peaks were observed for Pt and Pd or their oxides, which was in line with previous reports on metal-doped CNs.

Figure 24B:
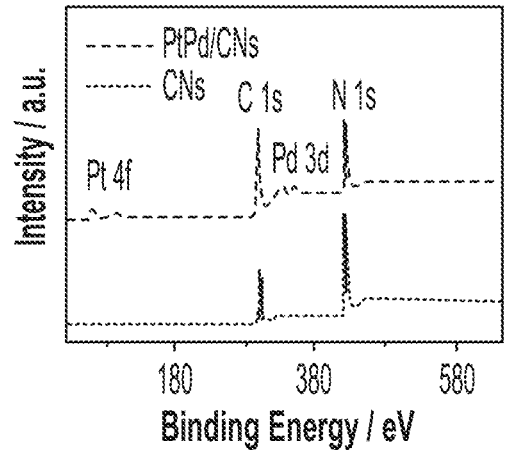

XPS was used for investigating the electronic configuration and the surface composition of the materials thus obtained. The XPS survey of Pt/Pd/CNs nanorods indicated the presence of C 1 s, N 1 s, Pt 4f, and Pd 3d spectra; meanwhile, the CN nanorods revealed only the C 1 s and N is spectra (FIG. 24B). The estimated ratio of C/N/Pt/Pd in Pt/Pd/CNs nanorods was about 38/60.5/0.6/0.9, while the ratio of C/N in CN nanorods was about 39/61, in line with the EDX and element mapping analysis. These results from the EDX and element mapping analysis demonstrate the doping of Pt and Pd inside and outside the CN nanorods.

Figure 24C:
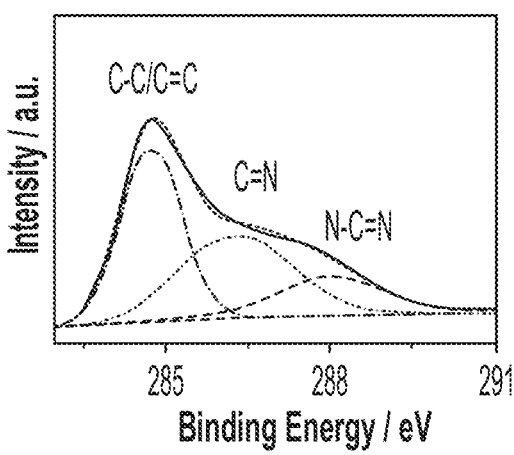
Figure 24D:
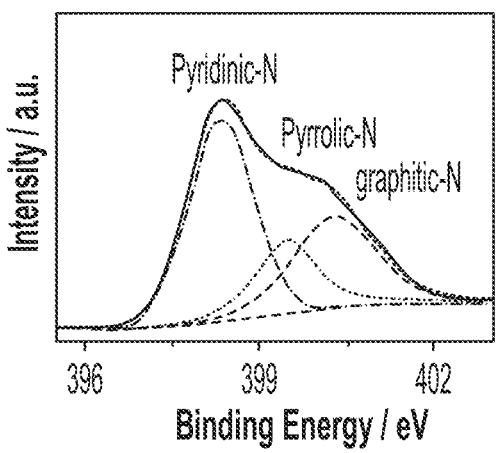
Figure 24E:
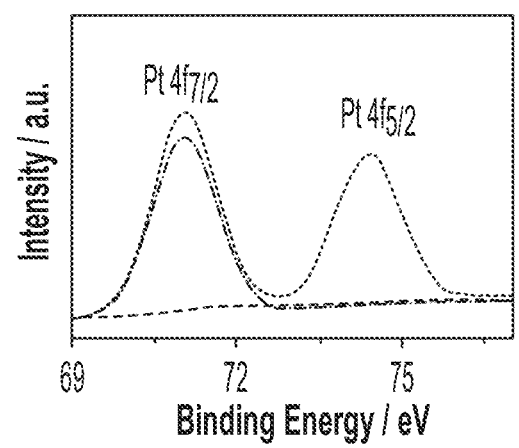
Figure 24F:
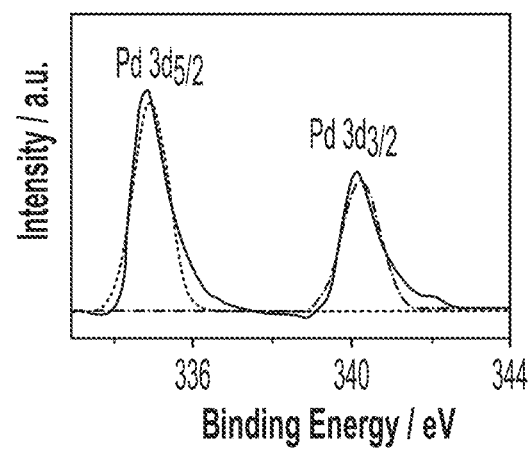

The high N-content in the thus formed nanorods originated from the polymerization of melamine, which contains ~65% N in its structure. The C 1 s and N 1 s of Pt/Pd/CNs were blue-shifted with a slight broadening and lower intensities compared to their counterparts in CN nanorods, due to the co-doping effect with Pt and Pd, which generates various defects inside the lattice structure of CNs. The C 1 s spectra of Pt/Pd/CNs were fitted into a major graphitic carbon (C—C or C=C) at 284.8 eV, $sp^a$-hybridized carbon-nitrogen (C—N) at 286.4, and (N—C=N) at 288.2 eV (FIG. 24C). Analogously, the N 1 s spectra were deconvoluted into pyridinic-N, pyrrolic-N, and graphitic N at 398.3, 399.1, and 401.4 eV, respectively, which are typical characteristics of graphitic CN-based materials (FIG. 24D). The Pt 4f displayed only Pt $4f_{7/2}$ at 71.22 eV and Pt $4f_{5/2}$ at 74.4 eV (FIG. 24E), whereas Pd 3d showed Pd $3d_{5/2}$ at 335.2 eV and Pd $3d_{3/2}$ at 340.6 eV without any kind of Pt oxide and/or Pd oxides (FIG. 24F), indicating their presence in the metallic state.

The FTIR spectra were obtained to confirm the molecular structure of the as-prepared Pt/Pd/CNs and CNs, both of which reveal strong absorption spectra at 810-870 cm$^{-1}$ and 1255-1480 cm$^{-1}$ ascribed to the stretching vibration mode of triazine and C—N heterocycles of the aromatic rings, respectively. Meanwhile, the observed bands at 1570-1634 cm$^{-1}$ were attributed to the presence of C=N bonds, whereas the resolved small and broad bands at 2900-3100 cm$^{-1}$ corresponded to the stretching of the C—H group. Interestingly, the noticed vibration band at 467 cm$^{-1}$ in Pt/Pd/CNs was plausibly ascribed to the N bonded to the Pt or Pd metal, due to their strong binding affinity. This indicates the formation of CNs codoped with both Pt and Pd, which matches with the EDX, element mapping, and XPS results. Raman spectroscopy analysis was conducted to get more insight into the formation of Pt/Pd/CNs nanorods and CN nanorods, both of which show a broad spectrum located at 1560 cm$^{-1}$ of the graphitic (G) band assigned to the crystalline graphite sp$^2$ carbon. This indicates the high degree of graphitization of the as-obtained materials as further seen in the absence of the D band at 1360 cm$^{-1}$. The spectrum observed at 2690 cm$^{-1}$ was attributed to the G' peak, originated from the disordered surface and the low alignment of the graphitic CN nanostructure, and was in concurrence with the HRTEM results. The surface areas of the as-synthesized Pt/Pd/CNs and CN nanorods were estimated using the Brunauer-Emmett-Teller (BET) method (FIG. 25). The results show that the calculated BET surface area of Pt/Pd/CNs (155.2 m$^2$ g$^{-1}$) was higher than that of the CN nanorods (149.2 m$^2$ g$^{-1}$) (FIG. 25). A high surface area of Pt/Pd/CNs nanorods is important for providing more active sites during the CO oxidation reaction. The surface area of the inventive Pt/Pd/CNs nanorods (155.2 m$^2$ g$^{-1}$) was significantly higher than that of C$_3$N$_4$-MU (50 m$^2$ g$^{-1}$), pristine CNs (20.21 m$^2$ g$^{-1}$) as well as other CN-based materials with different shapes.

Various approaches are currently available for the controlled synthesis of CNs with different morphologies; however, most previous reports focused on zero-dimensional nanostructures without much emphasis on 1-D nanostructures. In certain aspects and embodiments, the instant invention provides a versatile approach for the rational synthesis of 1-D CN nanotubes and nanowires, which exhibited outstanding catalytic activity towards CO conversion to CO$_2$. In certain aspects, the instant invention is tailored to the synthesis of 1-D Pt/Pd-doped CN nanorods with a twined end, e.g., through the protonation of melamine using NaNO$_3$ and HCl in a glycol-mediated solution in the presence of Pt and Pd precursors, followed by annealing into CN nanorods.

The obtained capacitance current density of Pt/Pd/CNs nanorods was higher than that of metal-free CNs and Pt/C catalyst, owing to the co-doping effect with Pt/Pd along with their synergetic effect. Interestingly, there were no resolved peaks of any kind for Pt/Pd oxides such as PdO and/or PtO, implying the stability of Pt and Pd against oxidation.

The ECSA of Pt/Pd/CNs nanorods (75 m$^2$ g$^{-1}$) was higher than that of CNs (68 m$^2$ g$^{-1}$) and Pt/C (64 m$^2$ g$^{-1}$), resulting from the combination between the co-doping effect of Pt/Pd and the unique structure/composition features of CN nanorods. FIG. 26A displays the CVs measured in a CO-saturated aqueous solution of 0.1 M KOH at 50 mV s$^{-1}$ at room temperature. All catalysts show the main voltammogram characteristics of the CO-oxidation reaction involving a sharp oxidation peak in the forward direction and a small plateau in the backward direction between −0.25 and −0.01 V (FIG. 26A). These voltammogram features could not be resolved when the CVs were measured without cleaning and/or CO striping. Obviously, Pt/Pd/CNs nanorods exhibited a higher oxidation current density than the commercial Pt/C catalyst and CN nanorods. FIG. 26B reveals the linear sweep voltammetry (LSV) measured in CO-saturated 0.1 M KOH at 50 mV s$^t$, which shows that PtPd/CNs nanorods consume a lower potential to oxidize CO and produce a greater current density at any potential point compared to Pt/C catalyst and CN nanorods, as indicated by the dashed lines in FIG. 26B.

This infers the quick CO oxidation kinetics on Pt/Pd/CNs nanorods compared with the commercial Pt/C catalyst and CN nanorods, which can be ascribed to the Pt/Pd electronic effect and the physicochemical properties of CN nanorods. The CO oxidation current density of Pt/Pd/CNs (14.75 mA cm$^{-2}$) was almost 2.01 and 23.41 times greater than that of Pt/C (7.32 mA cm$^{-1}$) and CNs (0.63 mA cm$^{-1}$), respectively (FIG. 26C). Meanwhile, the CO oxidation potential on Pt/Pd/CNs (−0.19 V) was inferior to that on Pt/C (−0.11 V) by 0.08 V and to that on CN nanorods (−0.03 V) by 0.16 V (FIG. 26C). Intriguingly, the obtained CO oxidation current density on our developed Pt/Pd/CNs (14.75 mA cm$^{-1}$) was significantly higher than that on the previously reported porous PtPdRu nanodendrites (12 mA cm$^{-2}$), Pt/Pd alloy nanoparticles (11.2 mA cm$^{-1}$), and Pt nanowires (0.12 mA cm$^{-1}$).

Figure 27A:
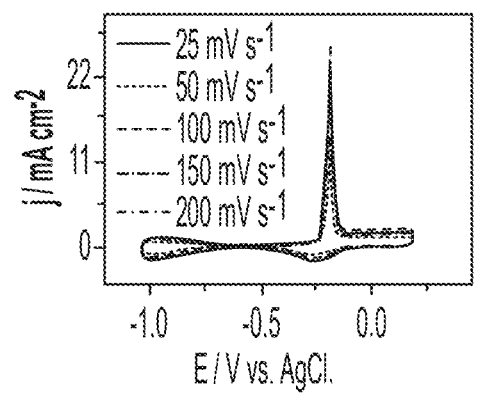
FIGS. 27A-27F show CVs measured at different scan rates in a CO-saturated aqueous solution of 0.1 M KOH at 50 mVs$^{-1}$ (FIGS. 27A, 27C, and 27E) and the corresponding plots of forward peak currents against the square root of the scan rates (FIGS. 27B, 27D, and 27F) of Pt/Pd/CNs nanorods (FIGS. 27A-27B), commercial Pt/C catalyst (FIGS. 27C-27D), and CN nanorods (FIGS. 27E-27F).
Figure 27B:
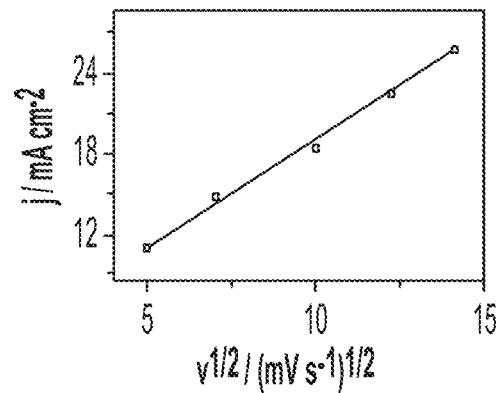
Figure 27C:
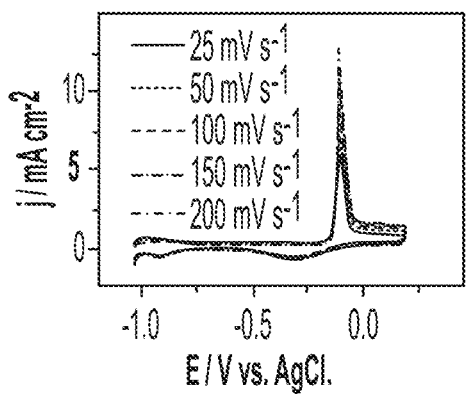
Figure 27D:
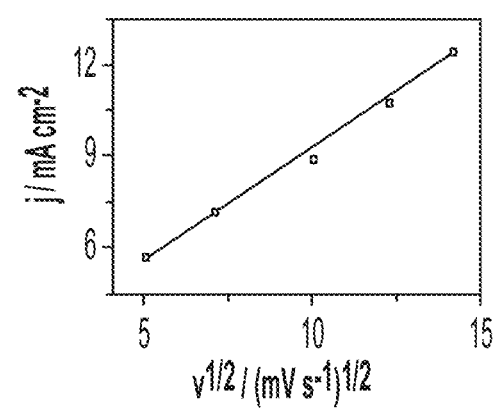
Figure 27E:
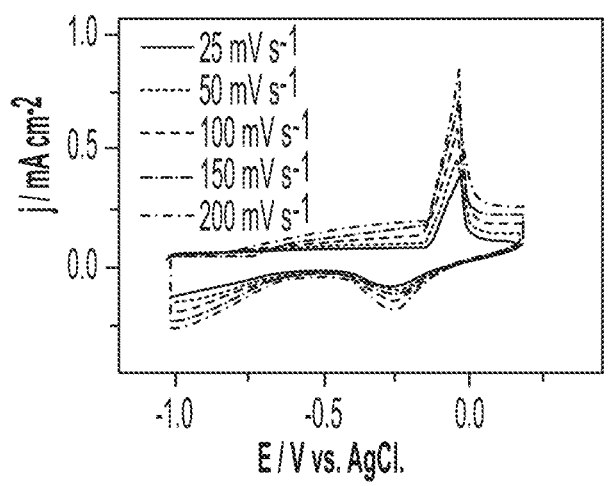
Figure 27F:
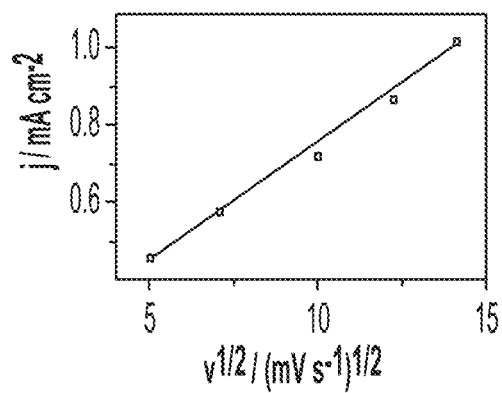

The CO oxidation activity was benchmarked at different scan rates to gain further insight on the electrocatalytic CO oxidation kinetics (FIGS. 27A-27F). The electrocatalytic CO oxidation currents on Pt/Pd/CNs (FIG. 27A), Pt/C catalyst (FIG. 27C), and CNs (FIG. 27E) increased with increase in the scan rates from 25-250 mV s$^{-1}$, correspondingly. Meanwhile, the plot of the obtained CO oxidation current densities against the square root of the scan rates depicts a linear relationship [i.e., Pt/Pd/CNs (FIG. 27B), Pt/C catalyst (FIG. 27D), and CNs (FIG. 27F)]. This shows that CO oxidation was controlled by the diffusion rates on the as-synthesized catalysts. From the Randles-Sevcik equation, the slope of Pt/Pd/CNs (0.08 mV dec$^{-1}$) was found to be significantly larger than that of Pt/C (0.038 mV dec$^{-1}$) and CN catalyst (0.003 mV dec$^{-1}$). This implies quicker transportation kinetics on Pt/Pd/CNs than on Pt/C and CN nanorods (FIGS. 27B, 27D, and 27F). To compare the CO oxidation performances of the as-synthesized materials, their mass activities were calculated via normalizing the obtained current densities to the loading amount of the catalyst at −0.19 V. The mass activity of PtPd/CNs (1.47 mA µg$^{-1}$) was about 23.3 and 2.03 times higher than that of CNs (0.063 mA µg$^{-1}$) and Pt/C (0.73 mA µg$^{-1}$), respectively, owing to the coupling of the unique physicochemical properties of CN nanorods with the outstanding catalytic properties of Pt/Pd, which results in their maximized utilization in the CO oxidation reaction.

The chronoamperometry (I-T) tests were conducted in a CO-saturated aqueous solution of 0.1 M KOH at 50 mV s$^{-1}$ to confirm the durability of the materials thus formed (FIG. 28A). Interestingly, Pt/Pd/CNs nanorods reveal a sluggish current attenuation with much higher retention of the current after 1000 s compared to Pt/C catalyst and CN nanorods, respectively, demonstrating the greater durability of PtPd/CNs (FIG. 28A). Following the I-T measurements, the CVs were measured again in deoxygenated 0.1 M KOH solution at 50 mV s$^{-1}$ to recalculate the ECSA. The ECSA of Pt/Pd/CNs nanorods, CN nanorods, and Pt/C catalysts deteriorated by around 10, 30, and 28%, respectively, implying the greater stability of Pt/Pd/CNs nanorods (FIG. 26D). Moreover, after the durability cycles Pt/Pd/CNs reserved around 93% of its initial CO oxidation current density, which showed that it was substantially more durable than Pt/C catalyst (74%) and CN nanorods (68%) (FIGS. 28B-28D).

Figure 29:
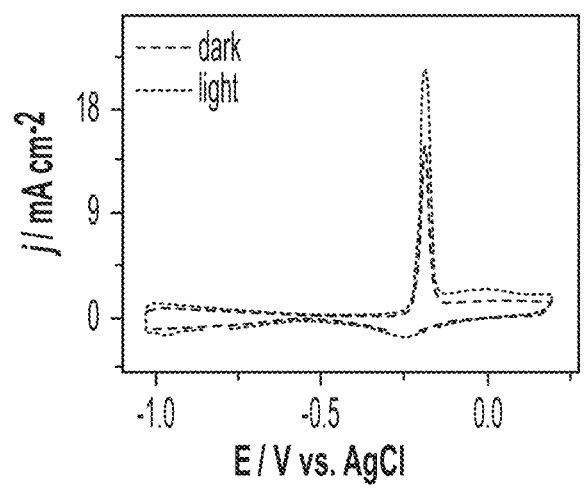
Figure 30:
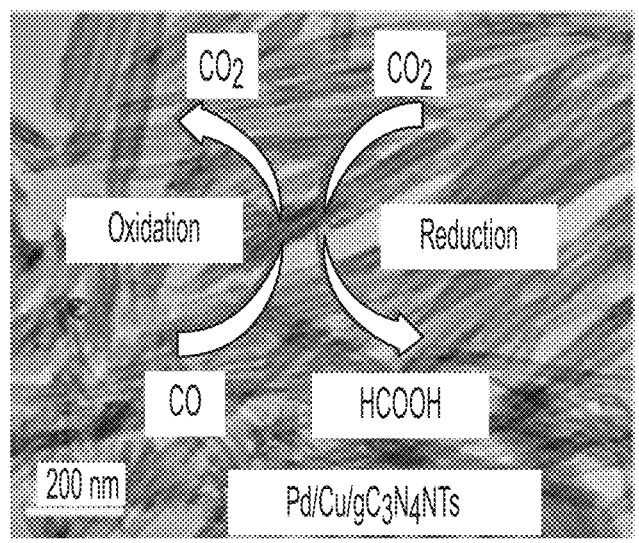

The photoelectrochemical CO oxidation activity of Pt/Pd/CNs nanorods was tested under UV-visible light irradiation. Intriguingly, the obtained CO oxidation current on Pt/Pd/CNs under light illumination (21.9 mA cm$^{-1}$) was increased 1.48 times than that in dark (14.7 mA cm$^{-1}$) (FIG. 29). This was owing to the outstanding photocatalytic merits of CNs with a mid bandgap (~2.7 eV). Additionally, the combination between Pt/Pd and CNs may maximize the visible-light absorption and delay the recombination rate of the generated charge carriers during the photoelectrochemical CO oxidation reaction. Interestingly, the 1-D nanorod shape of Pt/Pd/CNs was fully maintained without any significant changes after the durability cycles, while the commercial Pt/C catalyst suffered from an obvious detachment and aggregation, as shown in the TEM images measured after the durability tests.

These results demonstrate the CO oxidation activity and durability of Pt/Pd/CNs as compared to that of Pt/C and CNs. Without being bound by theory, the main reasons behind the superior catalytic performance of Pt/Pd/CNs nanorods include the advantageous catalytic properties of Pt/Pd, including the electronic effect, strong adsorption affinity for CO, high tolerance for reaction intermediates/products, and the generation of oxygenated species accelerating the reaction kinetics. This is coupled with the advantageous physicochemical properties of CNs, such as electron-rich density, high surface area, abundant active sites, and great conductivity. These merits combine to provide both good CO oxidation activity and durability.

Conclusion: In certain aspects and embodiments as exemplified above, the inventive method provides a facile controlled fabrication of CN nanorods codoped with Pt and Pd (Pt/Pd/CNs) via protonation of melamine in an ethylene glycol solution containing Pt precursor and Pd precursor with the assistance of NaNO$_3$ and HCl solutions through a rolling-up mechanism. The designed Pt/Pd/CNs were formed in a high yield of uniform 1D CN nanorods (~50 nm) codoped with Pt and Pd (1.5 wt %) without a template and/or multiple complicated steps. The electrocatalytic CO oxidation activity of PtPd/CNs was 2.01 and 23.41 times higher than that of the commercial Pt/C catalyst and metal-free CN nanorods, respectively. Meanwhile, Pt/Pd/CNs nanorods retained around 93% of their CO oxidation activity after the durability tests in addition to their morphological stability that was fully maintained without any changes. Furthermore, under UV-vis light irradiation, the CO oxidation activity of Pt/Pd/CNs nanorods was enhanced 1.4 times compared to that in the dark, owing to the unique photocatalytic properties of CNs. In certain aspects, the method could be scaled up for tailored fabrication of CN-based materials for catalytic CO oxidation.

Example 4: Pd/Cu/gC$_3$N$_4$NTs

Chemicals and Materials: K$_2$PdCl$_4$, CuCl$_2$6H$_2$O (99%), melamine (99%), ethylene glycol, and nitric acid (HNO$_3$ (70%)) were purchased from Sigma-Aldrich Chemie GmbH (Munich, Germany).

Synthesis of Porous Pd/Cu/C$_3$N$_4$NTs: Pd/Cu/C$_3$N$_4$NTs were synthesized according to the method of Example 1, with slight modifications. The method included the sluggish mixing 1 gram of melamine in 30 mL of ethylene glycol solution containing 20 mM of K$_2$PdCl$_4$ and 20 mM of CuCl$_2$ for 20 min; 60 mL of HNO$_3$ (0.1 M) was then added under stirring for 30 min. The obtained yellowish precipitate was washed with ethanol and dried at 80° C. for 12 hours, followed by annealing of the dried product at 550° C. (5° C./min) for 2 hours under nitrogen. Metal-free gC$_3$N$_4$NTs were prepared by the same method but without the addition of Pd and/or Cu precursors.

Materials Characterization: The morphology and composition of the as-prepared materials were determined using methods and instructions set forth in the examples and general description above.

Results and Discussion: Pd/Cu/C$_3$N$_4$NTs were fabricated by the polymerization of melamine in an ethylene glycol solution containing Pd- and Cu-precursors by nitric acid followed by subsequent carbonization. FIG. 31A displays the SEM image of Pd/Cu/C$_3$N$_4$NTs that had been obtained for a high yield of the nanotube morphology. The TEM image also confirmed the formation of nanotube structure with a well-defined porous interior (FIG. 31B). The nanotubes were monodispersed with an average length of 1.5 μm and a width of 82±4 nm. The histogram for the particle size destruction showed that the average width of nanotubes is about 80 nm. The TEM of a single nanotube Pd/Cu/C$_3$N$_4$ showed its smooth surface, hollow interior of about 60±2 nm and thick wall of 10±1 nm (FIG. 31C). The HRTEM of randomly selected areas from the outer wall of Pd/Cu/C$_3$N$_4$ nanotube revealed its graphitic-like layered structure with an inner space of 2 nm as indicated by the arrows in (FIG. 31D). The estimated spacing between the adjacent graphite fringes was about 0.337 nm, attributing to the {002} facet of carbon. Meanwhile, the lattice fringes resolved from the core area were amorphous with multiple curvatures and randomly oriented in different directions (FIG. 31E). This could be plausibly attributed to the merging of both Pd and Cu inside the lattice structure of gC$_3$N$_4$NTs. The selected-area electron diffraction (SAED) pattern revealed the presence of {002} and {100} facets of graphitic-like carbon structure (FIG. 31F). The metal-free C$_3$N$_4$NTs were formed in a porous nanotube structure with an average length of 1.4 μm and a width of 79±2 nm.

The HAADF-STEM image further reflected the formation of a porous nanotube morphology with a smooth surface and thick walls (FIG. 32A). The element mapping analysis of Pd/Cu/gC$_3$N$_4$NTs depicted the homogenous distribution of Pd, Cu, C, and N with atomic ratios of 0.6, 0.4, 58, and 41, respectively (FIGS. 32B-32E). These atomic ratios were in line with those determined by the EDX, which indicated the formation of Pd/Cu/gC$_3$N$_4$NTs and metal-free gC$_3$N$_4$NTs (FIG. 32F).

Figure 33B:
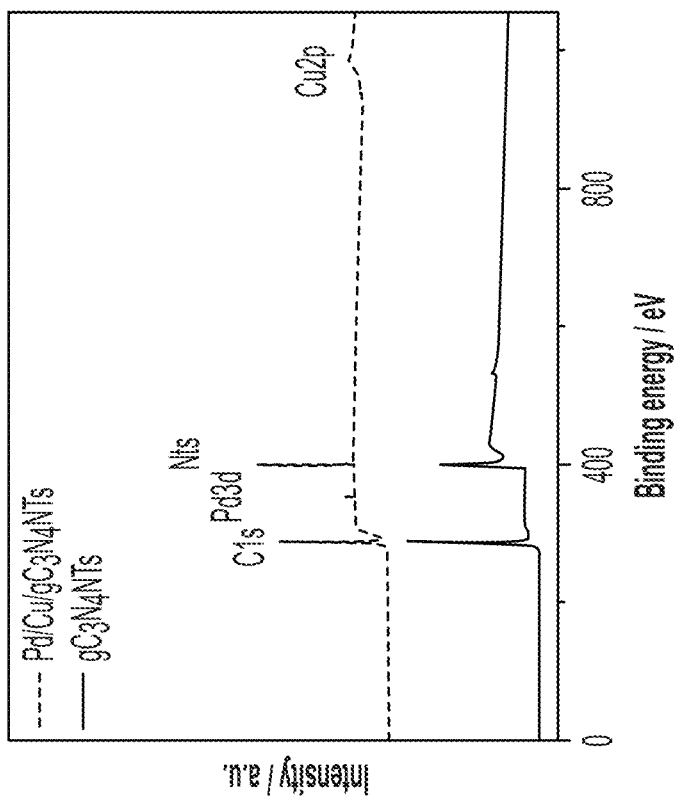
FIGS. 33A-33F show a wide-angle XRD pattern (FIG. 33A), an XPS survey of Pd/Cu/gC$_3$N$_4$NTs and gC$_3$N$_4$NTs (FIG. 33B), and high-resolution XPS spectra of C is (FIG. 33C), N is (FIG. 33D), Pd 3d (FIG. 33E), and Cu 2p (FIG. 33F).
Figure 33A:
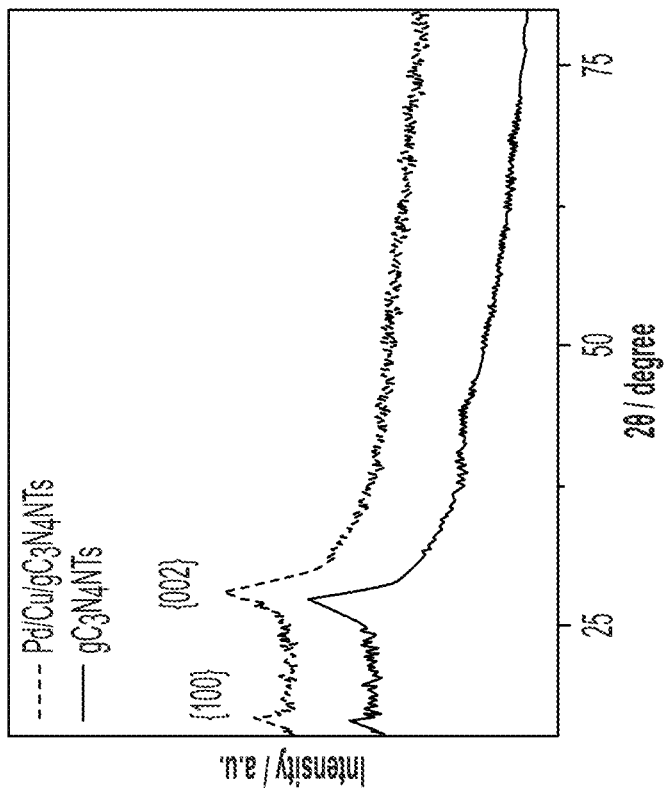

The XRD of Pd/Cu/gC$_3$N$_4$NTs and gC$_3$N$_4$NTs displayed two diffraction peaks at 27° and 13.2° assigned to the {002} and {100} facets of gC$_3$N$_4$, indicating the polymerization of melamine (FIG. 33A). The diffraction peaks of Pd/Cu/gC$_3$N$_4$NTs were slightly shifted to higher angle values relative to pure gC$_3$N$_4$NTs, which emanated from the Pd and Cu dopants. Meanwhile, the diffraction peaks for Pd or Cu and their oxides in the as-synthesized Pd/Cu/gC$_3$N$_4$NTs could not be resolved because of their low dopant content. Such behavior agrees with previous reports on metal-doped carbon nitrides.

Figure 33D:
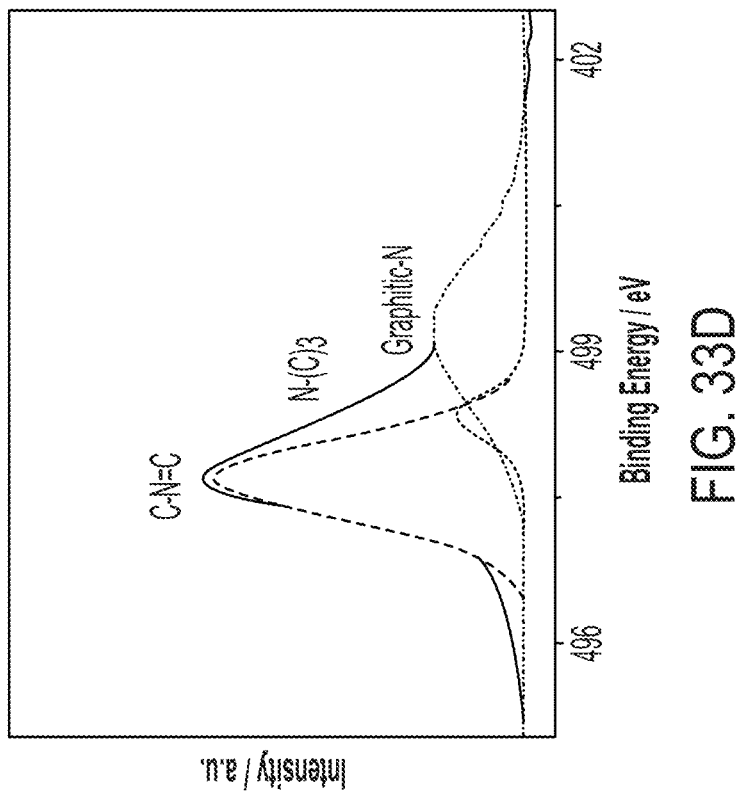
Figure 33C:
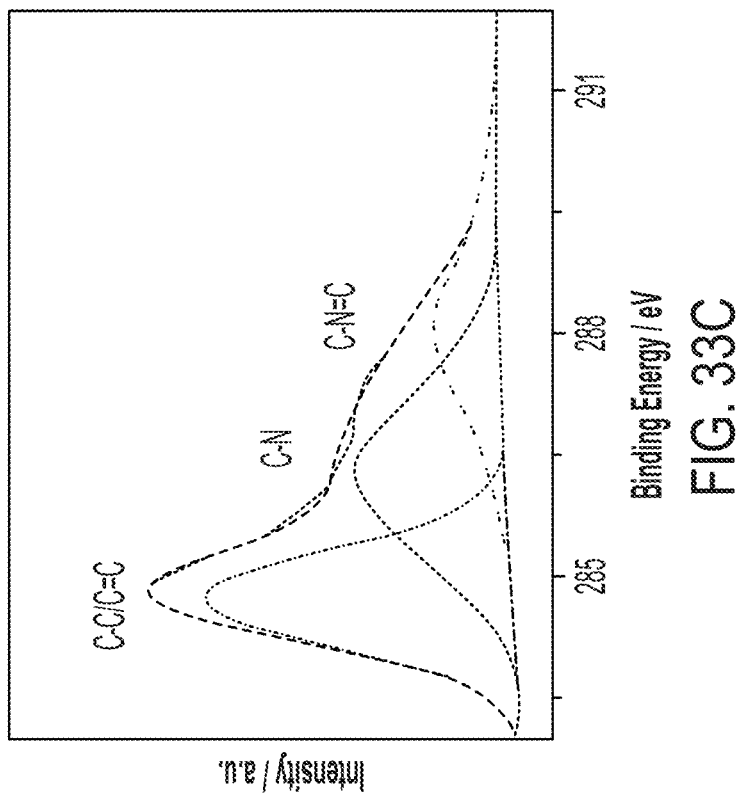
Figure 33E:
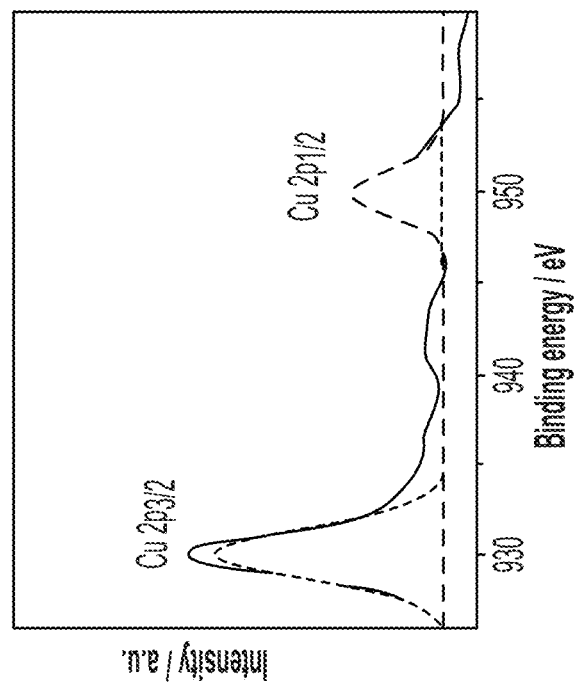
Figure 33F:
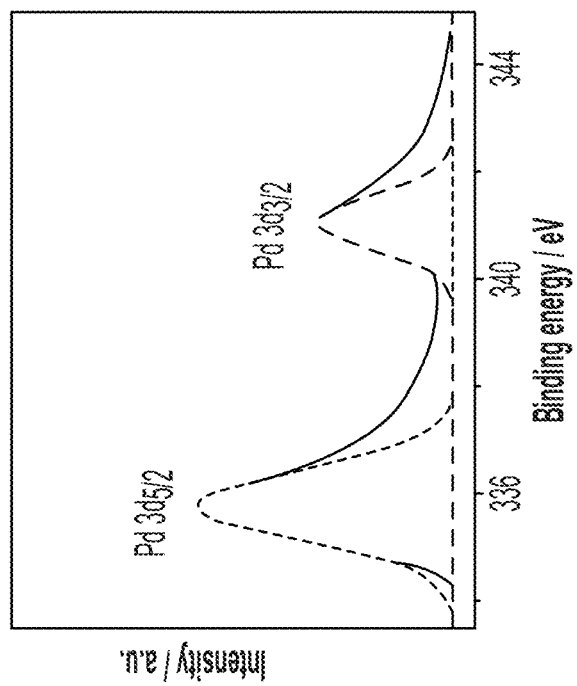

The XPS full scan revealed the presence of C 1 s, N 1 s, Pd 3d, and Cu 2p in Pd/Cu/gC$_3$N$_4$NTs, whereas gC$_3$N$_4$NTs showed only C 1 s and N 1 s (FIG. 33B). The fitted XPS spectra of C 1 s showed three peaks assigned to graphite C—C/C=C (284.5), sp$^3$C—N (286.1 eV), and sp$^2$ N—C—N=N (288.5 eV) (FIG. 33C). The N is spectra displayed three nitrogen-species peaks attributed to C—N=C (397.6 eV), tertiary nitrogen N—(C)$_3$ (398.4 eV), and graphitic-N (400.7 eV) (FIG. 33D), which are usually observed in the $gC_3N_4$-based materials. The Pd 4f showed two peaks corresponding to Pd $3d_{5/2}$ (335.2 eV) and Pd $3d_{3/2}$ (340.7 eV) (FIG. 33E), whereas, Cu 2p revealed Cu $2p_{3/2}$ (932.3 eV) and $Cu_2p_{1/2}$(951.2 eV) (FIG. 33F), implied the successful doping of $gC_3N_4$ with both Pd and Cu. The surface atomic ratios of C/N/Pd/Cu in Pd/Cu/$gC_3N_4$NTs were about 58/40.9/0.5/0.6, respectively. The determined atomic ratio of Pd/Cu was almost 1/1, which is in line with the EDX and element mapping analysis, showing the uniformity of the thus-formed materials.

FIG. 34 shows the nitrogen-adsorption/desorption isotherms of Pd/Cu/$gC_3N_4$NTs and $gC_3N_4$NTs, which both displayed the isotherms feature close to the type I curve. The major adsorption occurred for the hysteresis loop at 0.45<P/Po<0.9 that could serve as a clear sign of the large void volume of the nanotubes. The surface areas determined using a Brunauer-Emmett-Teller (BET) method are (240 m² g⁻¹) for Pd/Cu/$gC_3N_4$NTs (FIG. 34A) and (230 m² g⁻¹) for $gC_3N_4$NTs (FIG. 34B). Pd/Cu/$gC_3N_4$NTs with its outstanding surface area can facilitate the adsorption of reactant molecules and providing more active sites for the gas conversion reactions. The pore-size distribution calculated using the Barrett-Joyner-Halenda (BJH) method was about 30-90 nm for Pd/Cu/$gC_3N_4$NTs (FIG. 34C) and 40-75 nm for $gC_3N_4$NTs (FIG. 34D). The large pore sizes of Pd/Cu/$gC_3N_4$NTs can lead to the maximization of the utilization of both Pd and Cu in catalytic reactions.

FIG. 35A shows the CO conversion percentage of the as-prepared materials as a function of temperature. The results confirmed the superior catalytic performance of Pd/Cu/$gC_3N_4$NTs than their counterpart nanocatalysts. Notably, $gC_3N_4$NTs showed no significant CO conversion event at 400° C., whereas after the incorporation of Pd and Cu into the $gC_3N_4$NTs, the CO conversion percentage showed a steady increase with an increase in the reaction temperatures until complete conversion occurred. The complete CO conversion occurred at temperatures on Pd/Cu/$gC_3N_4$NTs relative to Pd/$gC_3N_4$NTs and Cu/$gC_3N_4$NTs, which shows the significant effect of doping with Pd/Cu on the enhancement of the CO oxidation activity (FIG. 35A). Meanwhile, the CO oxidation activity on Pd/Cu/$gC_3N_4$NTs was superior to $gC_3N_4$NTs at any reaction temperature as shown by the dashed lines, implying fast CO oxidation kinetics on Pd/Cu/$gC_3N_4$NTs (FIG. 34B).

Further evidence was provided by observing a lower complete conversion temperature ($T_{100}$) of Pd/Cu/$gC_3N_4$NTs (154° C.) when compared to 210° C. for Pd/$gC_3N_4$NTs and (250° C.) Cu/$gC_3N_4$NTs (FIGS. 35A and 35B). The catalytic activity of the newly designed Pd/Cu/$gC_3N_4$NTs was significantly greater than those for previously reported Pd-based and Cu-based catalysts, such as $Cu_2O/C_3N_4$ and Pd-impeded 3D porous graphene, as well as $CuO_x$ and $CuMn_2O_4$ catalysts. The durability tests were measured for 10 consecutive cycles at the $T_{100}$ for each catalyst. The results showed superior durability of the Pd/Cu/$gC_3N_4$NTs when compared to Pd/$gC_3N_4$NTs and Cu/$gC_3N_4$NTs. Interestingly, there was no noticeable deterioration in the CO oxidation activity on Pd/Cu/$gC_3N_4$NTs even after the accelerated 10 durability cycles; meanwhile, Pd/$gC_3N_4$NTs and Cu/$gC_3N_4$NTs lost around 5 and 10% of their activity, respectively. The TEM image of Pd/Cu/$gC_3N_4$NTs preserved its porous nanotube morphology with no significant changes observed after the stability tests serves as a clear which is a sign of the structural stability.

The XRD of Pd/Cu/$gC_3N_4$NTs after the stability tests revealed the main diffraction peaks at 27° and 13.2° that are assigned to the {002} and {100} facets of $gC_3N_4$, implying the structural stability in line with the TEM image. No diffraction peaks for Pd, Cu, and their oxides were detected, showing that their stability inside Pd/Cu/$gC_3N_4$NTs is primarily attributed to the atomic level nature of their doping. To obtain further insight into the stability of Pd/Cu/$gC_3N_4$NTs, an EDX analysis was conducted after the durability tests. The EDX result displayed the presence of Pd, Cu, C, and N with atomic ratios of 0.6, 0.4, 59, and 40, respectively. These atomic ratios are almost in line with those determined before the durability tests with no substantial changes; thus showing their compositional stability.

Figure 36A:
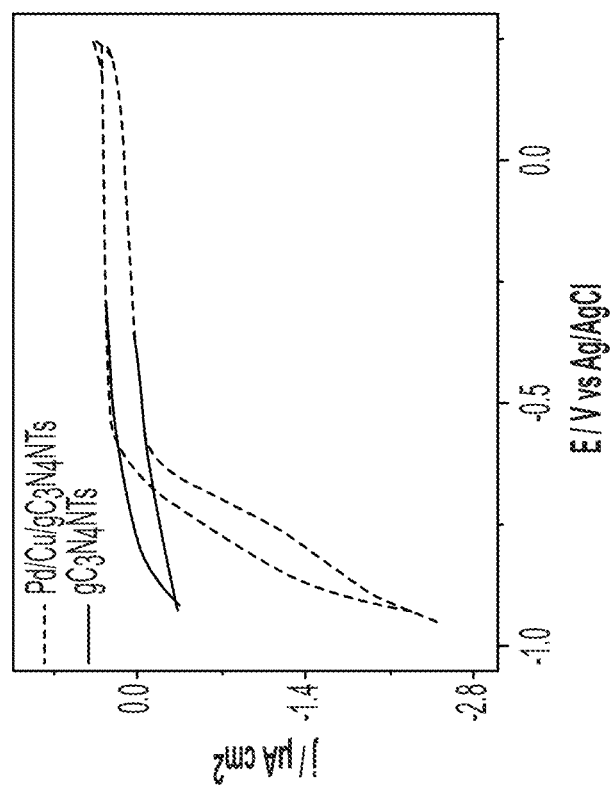
Figure 36B:
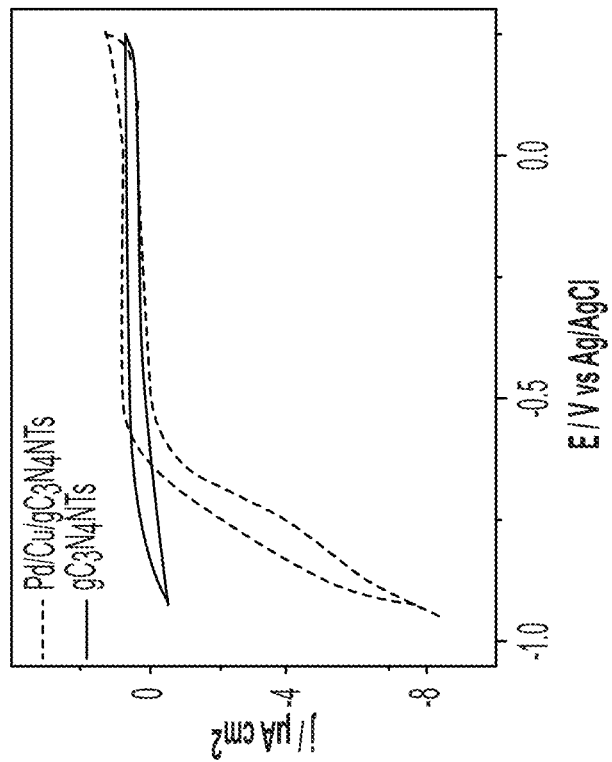
Figure 36D:
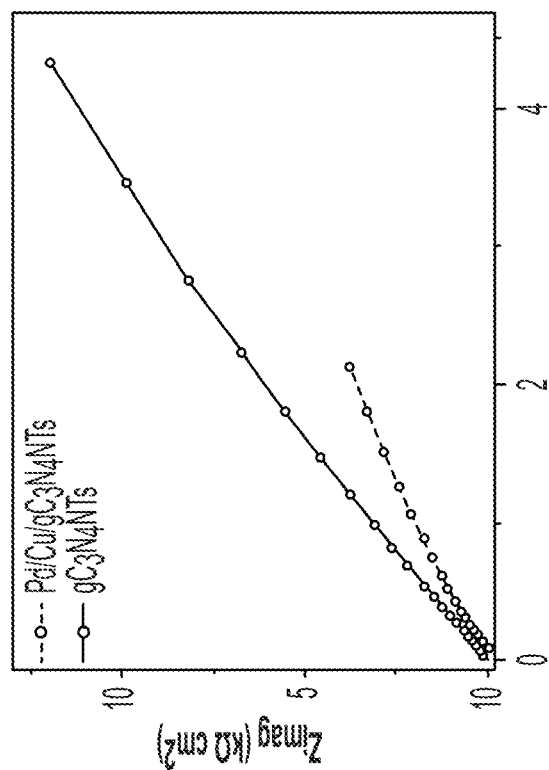
Figure 36C:
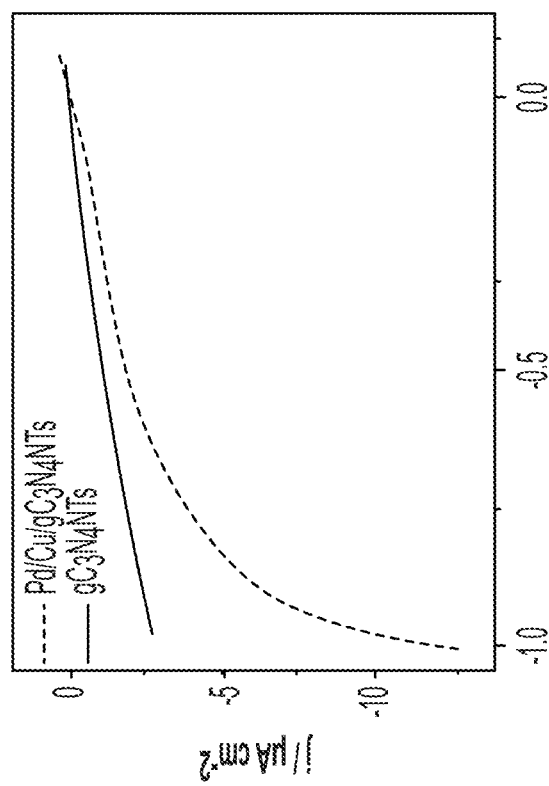

The electrochemical $CO_2$ reduction activity of Pd/Cu/$gC_3N_4$NTs had been tested relative to metal-free $gC_3N_4$NTs. The cyclic voltammogram (CVs) curve of Pd/Cu/$gC_3N_4$NTs revealed quasi-rectangular voltammogram features that are commonly seen in carbon-based materials that indicates a higher capacitance current. On the other hand, the $gC_3N_4$NTs displayed no obvious capacitance current (FIG. 36A). FIG. 36B shows the CVs measured in $CO_2$-saturated 0.5 M NaHCO3 at 50 mV s⁻¹, which displayed the superior electrochemical $CO_2$ reduction activity of Pd/Cu/gC3N4NTs than those for the $gC_3N_4$NTs. The linear sweep voltammogram (LSVs) displayed the superior produced reduction currents for Pd/Cu/$gC_3N_4$NTs at any applied potential relative to those for $gC_3N_4$NTs that depicts its quick reduction kinetics (FIG. 36C). The $CO_2$ reduction current on Pd/Cu/$gC_3N_4$NTs (8.31 µA cm⁻¹) is 4 times higher than that for $gC_3N_4$NTs (2.1 µA cm⁻¹). This originated from the higher conductivity and quick charge transfer on Pd/Cu/$gC_3N_4$NTs than with $gC_3N_4$NTs. Further proof was provided by the electrochemical impedance spectroscopy (EIS) (FIG. 36D).

Figure 36E:
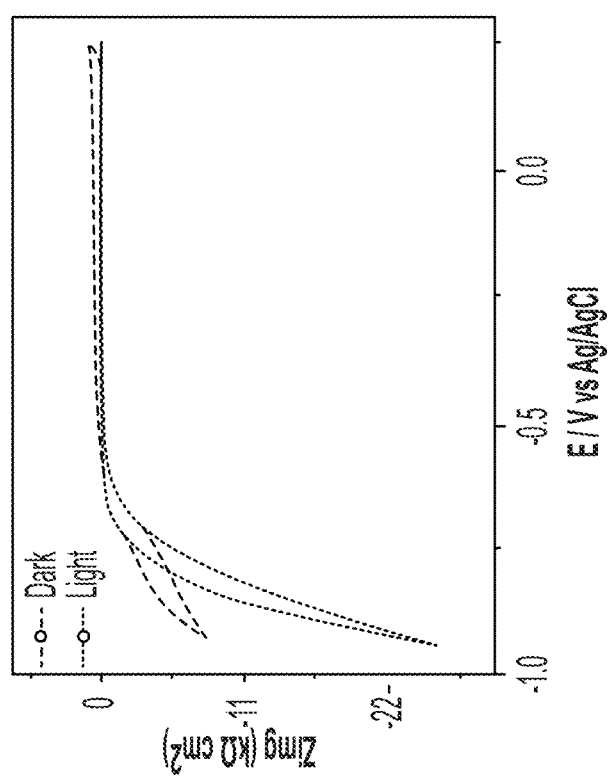

UV-light irradiation enhanced the $CO_2$ reduction activity of Pd/Cu/$gC_3N_4$NTs substantially relative to $gC_3N_4$NTs (FIG. 36E). The photo-electrochemical current obtained for Pd/Cu/$gC_3N_4$NTs was 24.5 µA cm⁻² under light is 2.92 fold higher than that in the dark of 8.31 µA cm⁻². This is owing to the combination of semiconducting properties of $gC_3N_4$NTs with the catalytic merits of Pd/Cu. The CVs on Pd/Cu/$gC_3N_4$NTs were measured with different scan rates, which showed that the current density increased continuously with increasing the scan rates. Meanwhile, the Randles-Sevcik equation, showed a linear plot on Pd/Cu/$gC_3N_4$NTs that infers to the quick transportation kinetics. The durability tests showed that the Pd/Cu/$gC_3N_4$NTs preserved its $CO_2$ electrochemical reduction performance with no significant changes. The photo-electrochemical $CO_2$ reduction durability test showed that Pd/Cu/$gC_3N_4$NTs preserved its catalytic activity with no significant loss. The quantitative analysis for the $CO_2$ reduction products using gas chromatography analyzer displayed that, Pd/Cu/$gC_3N_4$NTs successfully reduced $CO_2$ to mainly formic acid (~90%) and methanol (10%).

These results demonstrated the superior CO oxidation and $CO_2$ reduction performances of Pd/Cu/$gC_3N_4$NTs. This is plausibly attributed to the combination between the unique physicochemical properties of $gC_3N_4$NTs (i.e., high surface area, active sites, low density, abundant electron density, and chemical/thermal stability) as well as the superior catalytic features of Pd/Cu, such as high $O_2$/CO adsorption affinity and vigorous adsorption/dissociation activities of $O_2$. Moreover, porous nanotube morphology not only speeds up the molecular mobilities, but also maximizes the utilization of both Pd and Cu during the catalytic reactions. Meanwhile, the presence of Pd and Cu along with abundant N-atoms in the skeleton structure of Pd/Cu/$gC_3N_4$NTs tunes the intense binding energies of the reactants along with exhibiting a demonstrated high tolerance for the reaction products.

Conclusions: In brief, provided herein is a versatile approach for the rational fabrication of porous $gC_3N_4$ nanotubes doped at the atomic level with Pd and Cu (Pd/Cu/$gC_3N_4$NTs) upon polymerization of melamine in ethylene glycol solution that contains the metal precursors in the presence of nitric acid followed by pyrolysis under nitrogen. The as-formed Pd/Cu/$gC_3N_4$NTs have well-defined porous nanotube structure with high surface area and doped with Pd and Cu. The gas phase CO oxidation activity and durability of Pd/Cu/$gC_3N_4$NTs were superior to Pd/$gC_3N_4$NTs, Cu/$gC_3N_4$NTs, and $gC_3N_4$NTs, respectively. The electrochemical $CO_2$ reduction activity of Pd/Cu/$gC_3N_4$NTs was 4 times higher than that of $gC_3N_4$NTs. Meanwhile, the UV-light irradiation enhanced the $CO_2$ reduction performance of Pd/Cu/$gC_3N_4$NTs by 2.92-fold as compared to the case of under dark. In certain aspects, the instant application provides new routes for the rational design of $C_3N_4$NTs doped with multiple metal-based catalysts for multifarious applications.

The citations herein are incorporated in their entirety for all purposes, except insofar as their incorporation would create an inconsistency, the text of the present application shall control.

What is claimed is:

1. A method of reducing $CO_2$, comprising
providing a $CO_2$ gas mixture comprising at least 1% CO;
providing a catalyst to contact the $CO_2$ gas mixture, wherein the catalyst comprises a graphitic-like carbon nitride nanostructure; and
performing a $CO_2$ reduction reaction;
wherein the nanostructure is doped atomically with one or more metal elements, wherein the one or more metal elements comprise a metal element selected from the group consisting of gold (Au), palladium (Pd), and platinum (Pt);
wherein the nanostructure comprises at least one of nanotubes, nanorods, or nanofibers;
wherein the nanostructure is additionally characterized by at least one of the following features:
(i) wherein the nanostructure is doped with 1-1.2 wt. % Au/Pd or 1-1.2 wt. % Pt/Pd; or
(ii) wherein the nanostructure is selected from the group consisting of a carbon nitride nanotube doped with Au and Pd (Au/Pd/$gC_3N_4$NT), a carbon nitride nanofiber doped with Au and Pd (Au/Pd/$gC_3N_4$NF), and a carbon nitride nanorod doped with Pt and Pd (Pt/Pd/CN nanorod).

2. The method of claim 1, wherein $CO_2$ is reduced to $HCO_2H$ and CO is oxidized to $CO_2$.

3. The method of claim 1, wherein the CO oxidation or the $CO_2$ reduction is performed under a condition wherein a UV-light is on the catalyst.

4. The method of claim 1, comprising converting CO or $CO_2$ to a hydrocarbon.

5. The method of claim 1, wherein the nanostructure is porous, having surface area ranging from 300 $m^2g^{-1}$ to 350 $m^2g^{-1}$, an average pore size/diameter ranging from 45 nm to 65 nm, and a pore volume ranging from 0.45 cc/g to 0.65 cc/g.

* * * * *